US012715175B2

(12) United States Patent
Volberg

(10) Patent No.: US 12,715,175 B2
(45) Date of Patent: Aug. 25, 2026

(54) SCALABLE ADDITIVE MANUFACTURING SYSTEMS FOR HANDLING COMPLEX FEED MATERIALS

(71) Applicant: MULTIPHASIC CORPORATION, Pasadena, CA (US)

(72) Inventor: Randall Volberg, Kelowna BC (CA)

(73) Assignee: Multiphasic Corporation, Pasadena, CA (US)

( * ) Notice: Subject to any disclaimer, the term of this patent is extended or adjusted under 35 U.S.C. 154(b) by 0 days.

(21) Appl. No.: 19/348,454

(22) Filed: Oct. 2, 2025

(65) Prior Publication Data

US 2026/0097560 A1 Apr. 9, 2026

Related U.S. Application Data

(60) Provisional application No. 63/816,983, filed on Jun. 3, 2025, provisional application No. 63/725,291, filed (Continued)

(51) Int. Cl.
*H05B 6/12* (2006.01)
*B29C 64/209* (2017.01)

(Continued)

(52) U.S. Cl.
CPC .......... *B29C 64/336* (2017.08); *B29C 64/209* (2017.08); *B29C 64/314* (2017.08);

(Continued)

(58) Field of Classification Search
CPC ... B29C 64/336; B29C 64/314; B29C 64/364; B29C 64/209; B33Y 10/00; B33Y 30/00; B33Y 40/10

(Continued)

(56) References Cited

U.S. PATENT DOCUMENTS 5,785,923 A * 7/1998 Surma ..................... C03B 5/031 110/211
6,987,792 B2 * 1/2006 Do ............................ C10J 3/18 219/121.36

(Continued)

FOREIGN PATENT DOCUMENTS

CN 109387076 A * 2/2019 .............. F27B 3/205
EP 3271123 B1 5/2021

(Continued)

OTHER PUBLICATIONS

[Author Unknown] "Sensors." Analog Devices. [website] [date unknown]. Retrieved from the Internet. Retrieved on Oct. 30, 2025, <URL: https://www.analog.com/en/product-category/sensors.html#category-detail>, 4 pages.

(Continued)

*Primary Examiner* — Quang T Van
(74) *Attorney, Agent, or Firm* — COOLEY LLP

(57) ABSTRACT

A scalable additive manufacturing system for handling complex feed materials which includes a feed assembly including a drive assembly configured to receive a feed material and selectively displace the feed material along a length thereof, an annealer configured to selectively heat a portion of the feed material to an annealing temperature to increase workability of the wire, and an end effector. The end effector includes a chuck configured to accept the feed material, a directed energy source configured to selectively melt at least a portion of the feed material, and a nozzle operably coupled to the chuck, the nozzle configured to selectively deposit the melted portion of the feed material onto a substrate to form a melt pool. The feed material may be a core-wire that can include a core formed of a first material, and a sheath formed from a second material different from the first material.

36 Claims, 14 Drawing Sheets

Related U.S. Application Data on Nov. 26, 2024, provisional application No. 63/704,451, filed on Oct. 7, 2024.

(51) Int. Cl.

| | |
|---|---|
| ***B29C 64/314*** | (2017.01) |
| ***B29C 64/336*** | (2017.01) |
| ***B29C 64/364*** | (2017.01) |
| ***H05B 6/04*** | (2006.01) |
| *B33Y 10/00* | (2015.01) |
| *B33Y 30/00* | (2015.01) |
| *B33Y 40/10* | (2020.01) |

(52) U.S. Cl.

CPC ............ *B29C 64/364* (2017.08); *B33Y 10/00* (2014.12); *B33Y 30/00* (2014.12); *B33Y 40/10* (2020.01)

(58) Field of Classification Search

USPC .......................................................... 219/624

See application file for complete search history.

(56) References Cited

U.S. PATENT DOCUMENTS

| | | | |
|---|---|---|---|
| 7,807,948 | B2 | 10/2010 | Katiyar |
| 9,327,366 | B2 | 5/2016 | Karogal |
| 9,751,715 | B2 | 9/2017 | Cooper |
| 10,500,670 | B2 | 12/2019 | Cooper et al. |
| 10,507,638 | B2 | 12/2019 | Nuechterlein et al. |
| 10,661,343 | B2 | 5/2020 | Matthews et al. |
| 11,045,875 | B2 | 6/2021 | Nuechterlein et al. |
| 11,084,275 | B2 | 8/2021 | Narayanan et al. |
| 11,198,192 | B2 | 12/2021 | Peters et al. |
| 11,203,067 | B2 | 12/2021 | Nuechterlein et al. |
| 11,426,813 | B2 | 8/2022 | Petot et al. |
| 11,504,787 | B2 | 11/2022 | Bombardier et al. |
| 11,802,321 | B2 | 10/2023 | Nuechterlein et al. |
| 2006/0207984 | A1 | 9/2006 | Karogal |
| 2006/0255027 | A1 | 11/2006 | Katiyar |
| 2008/0015692 | A1 | 1/2008 | Heinz |
| 2008/0093350 | A1 | 4/2008 | Ma et al. |
| 2011/0042355 | A1 | 2/2011 | Gelmetti |
| 2019/0388968 | A1 | 12/2019 | Narayanan |
| 2021/0060589 | A1 | 3/2021 | Holverson et al. |
| 2021/0213562 | A1 | 7/2021 | Dogru et al. |
| 2022/0274202 | A1 | 9/2022 | Wilson et al. |
| 2023/0127550 | A1 | 4/2023 | Nuechterlein et al. |
| 2023/0131125 | A1 | 4/2023 | Morita et al. |
| 2023/0173601 | A1 | 6/2023 | Gruber et al. |
| 2023/0373037 | A1 | 11/2023 | Manjon Fernandez et al. |
| 2023/0415267 | A1 | 12/2023 | Sweeney |

FOREIGN PATENT DOCUMENTS

| | | | |
|---|---|---|---|
| WO | WO-2018166555 | A1 | 9/2018 |
| WO | WO-2022084720 | A1 | 4/2022 |
| WO | WO-2022164869 | A1 | 8/2022 |
| WO | WO-2026078501 | A1 | 4/2026 |

OTHER PUBLICATIONS

Ginzburg et al. "Addition of nanoparticles to flux cored wires for the nucleation of acicular ferrite microstructure in weld metals of the high-strength low-alloy steel." Welding and Cutting. Jul. 2020;19(1):48-53.

PCT Application No. PCT/IB2025/059951, International Search Report and Written Opinion mailed Mar. 13, 2026; Applicant Multiphasic Corporation; 24 pages.

PCT Application No. PCT/IB2025/059951, Invitation to Pay Additional Fees mailed Jan. 20, 2026; Applicant Multiphasic Corporation; 20 pages.

* cited by examiner

100
Feed Material Source 1100
Feed Material 1110
Controller 170
Communication Network 180
Feed Assembly 1000
End Effector 1700
Melt Pool M
Substrate 190

FIG. 1B

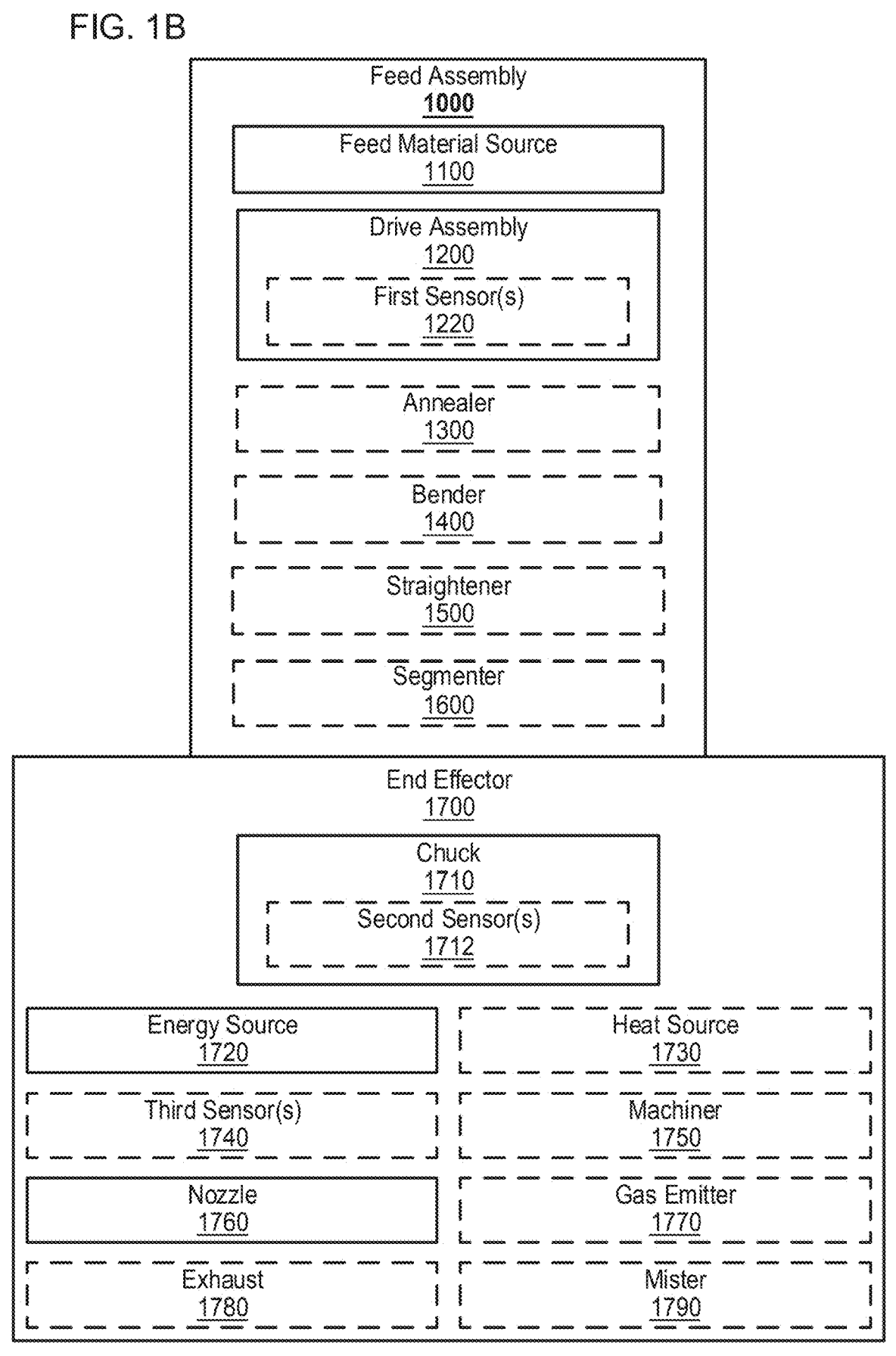

Feed Assembly
1000

Feed Material Source
1100

Drive Assembly
1200

First Sensor(s)
1220

Annealer
1300

Bender
1400

Straightener
1500

Segmenter
1600

End Effector
1700

Chuck
1710

Second Sensor(s)
1712

Energy Source
1720

Heat Source
1730

Third Sensor(s)
1740

Machiner
1750

Nozzle
1760

Gas Emitter
1770

Exhaust
1780

Mister
1790

FIG. 8

8000
Receive a feed material in a drive assembly from a feed material source
8002
Communicate the feed material to an annealer via the drive assembly
8004
Anneal the feed material to an annealing temperature via the annealer
8006
Bend the feed material via a bender
8008
Straighten the feed material via a straightener
8010
Segment and/or crimp the feed material via a segmenter
8012
Communicate the feed material to an end effector including a chuck and a energy source
8014
Heat the feed material in the end effector via a heat source
8016
Melt at least a portion of the feed material via the energy source
8018
Dispense the melted portion of the feed material onto a substrate to form a melt pool
8020

SCALABLE ADDITIVE MANUFACTURING SYSTEMS FOR HANDLING COMPLEX FEED MATERIALS

CROSS-REFERENCE TO RELATED APPLICATIONS

This application claims priority to and benefit of U.S. Provisional Application No. 63/704,451, filed Oct. 7, 2024, and entitled "Scalable Additive Manufacturing Systems for Handling Complex Feed Materials," U.S. Provisional Application No. 63/725,291, filed Nov. 26, 2024, and entitled "Scalable Additive Manufacturing Systems for Handling Complex Feed Materials," and U.S. Provisional Application No. 63/816,983, filed Jun. 3, 2025, and entitled "Scalable Additive Manufacturing Systems for Handling Complex Feed Materials," the entire disclosures of which are hereby incorporated by reference herein.

TECHNICAL FIELD

The embodiments described herein relate generally to additive manufacturing systems and methods of additive manufacturing.

BACKGROUND

Additive manufacturing, also known as "3D Printing," is a manufacturing technique in which three-dimensional ("3D") objects are created, generally, through the addition of successive layers of material. In this way, additive manufacturing differs from traditional manufacturing methods, such as subtractive manufacturing methods which generally involve cutting material from a solid block of material, and enables rapid prototyping and manufacturing of complex geometries for use across various industries, including aerospace, automotive, and medical. Typically, additive manufacturing materials are energized, melted, deposited as a thin layer, and solidified into a shape corresponding to a desired three-dimensional shape. Successive layers of material may be deposited, bonded, or solidified on top of the preceding layers, thereby building an object layer-by-layer having the desired three-dimensional shape. Additive manufacturing techniques are diverse and currently exist in many specific implementations and embodiments, generally for the creation of small parts with a high level of resolution. For example, some additive manufacturing techniques generate fully dense, net shape parts, while others may require additional steps, such as binding, sintering, heat treatment, and machining to obtain the desired part specifications. However, traditional manufacturing techniques are typically favored for the manufacturing of large parts because additive manufacturing techniques suffer from lower throughput due to low deposition rates, which may be limited, for example, by small feed material size or diameter.

SUMMARY

Embodiments described herein relate generally to additive manufacturing systems and methods of additive manufacturing. In particular, embodiments described herein relate to additive manufacturing systems including a feed assembly and an end effector, which are configured to accept and process a wide range of feed material compositions, configurations, and geometries, such as a wide range of diameters and/or complex blends of feed material(s). This may, for example, enable additive manufacturing of large components with high throughput and/or enable the printing of a vast array of compositions for the production of complex printed articles that are easy and economical to develop and deploy. In some embodiments, the system may be configured to use core-wires as the feed material.

In some embodiments, an additive manufacturing system includes a feed assembly and an end effector. The feed assembly includes a drive assembly configured to receive a feed material and displace the feed material along a length of the feed assembly. The feed assembly further includes an annealer configured to heat a portion of the feed material to an annealing temperature to increase workability of the feed material. The end effector includes a chuck configured to accept the feed material. The end effector further includes an energy source configured to melt at least a portion of the feed material to form a melted portion of the feed material. The end effector further includes a nozzle operably coupled to the chuck, and the nozzle is configured to deposit the melted portion of the feed material onto a substrate to form a melt pool. In some embodiments, the feed material is a core-wire including a core and a sheath disposed around the core. In some embodiments, the core is formed of a first material, and the sheath is formed of a second material different form the first material.

In some embodiments, a feed assembly for an additive manufacturing system, includes a drive assembly configured to receive a feed material and displace the feed material along a length thereof. The feed assembly includes an annealer configured to heat a portion of the feed material to an annealing temperature to increase workability of the wire. An end effector is operably coupled to the feed assembly. The end effector includes a chuck configured to accept the feed material and a directed energy source configured to melt at least a portion of the feed material to form a melted portion of the feed material. The end effector further includes a nozzle operably coupled to the chuck. The nozzle is configured to deposit the melted portion of the feed material onto a substrate to form a melt pool. In some embodiments, the feed material includes a core-wire. The core-wire includes a core and a sheath disposed around the core. The core is formed of a first material, and the sheath is formed from a second material. In some embodiments, the first material is different from the second material.

In some embodiments, a feed material includes: a core-wire, including: a core including a first material having a melting point, and a sheath defining a channel in which the core is disposed, the sheath including a second material different from the first material, the second material having a phase change temperature at which the sheath evaporates or sublimates that is equal to or less than a melting point of the first material.

In some embodiments, a system for additive manufacturing, includes: a feed assembly, the feed assembly including: a drive assembly configured to receive a feed material and displace the feed material along a length thereof; and an annealer configured to heat a portion of the feed material to an annealing temperature to increase workability of the feed material; and an end effector, the end effector including: a chuck configured to accept the feed material; an energy source configured to melt at least a portion of the feed material to form a melted portion of the feed material; and a nozzle operably coupled to the chuck, the nozzle configured to deposit the melted portion of the feed material onto a substrate to form a melt pool.

In some embodiments, a system for additive manufacturing includes: a magazine including a feed material, the feed material including: a sheath formed of a material configured to transition from a solid phase to a gaseous phase when exposed to energy, the sheath defining a channel therethrough, and a particulate material disposed within the channel; an end effector configured to receive the feed material and direct the feed material towards a substrate; a feed assembly operably coupled to the magazine and the end effector, the feed assembly configured to communicate the feed material from the magazine to the end effector; and an energy source configured to direct energy to the feed material, the energy configured to cause: the particulate material to melt to form a melt pool on the substrate, and the sheath to transition from the solid phase to the gaseous phase such that the sheath is inhibited from entering the melt pool.

In some embodiments, a method of additive manufacturing includes: communicating a feed material to an end effector, the feed material including: a sheath formed of a first material configured to transition from a solid phase to a gaseous phase when exposed to energy, the sheath defining a channel therethrough, and a core disposed within the channel, the core including a second material different from the first material; communicating, via the end effector, energy to the feed material, the energy configured to: cause at least a portion of the core to melt, and cause at least a portion of the sheath to transition from the solid phase to the gaseous phase; and depositing, via the end effector, the molten portion of the core on a substrate to form a melt pool, the melt pool substantially free of the first material.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 1B is a schematic illustration the system of FIG. 1A including a feed assembly and an end effector, according to an embodiment.

FIG. 8 is a schematic flow chart of a method for additive manufacturing, according to an embodiment.

FIGS. 10A-C are schematic illustrations of various end effector configurations, according to various embodiments.

FIG. 10D is a side view schematic illustration of an end effector, according to an embodiment.

Figure 1A:
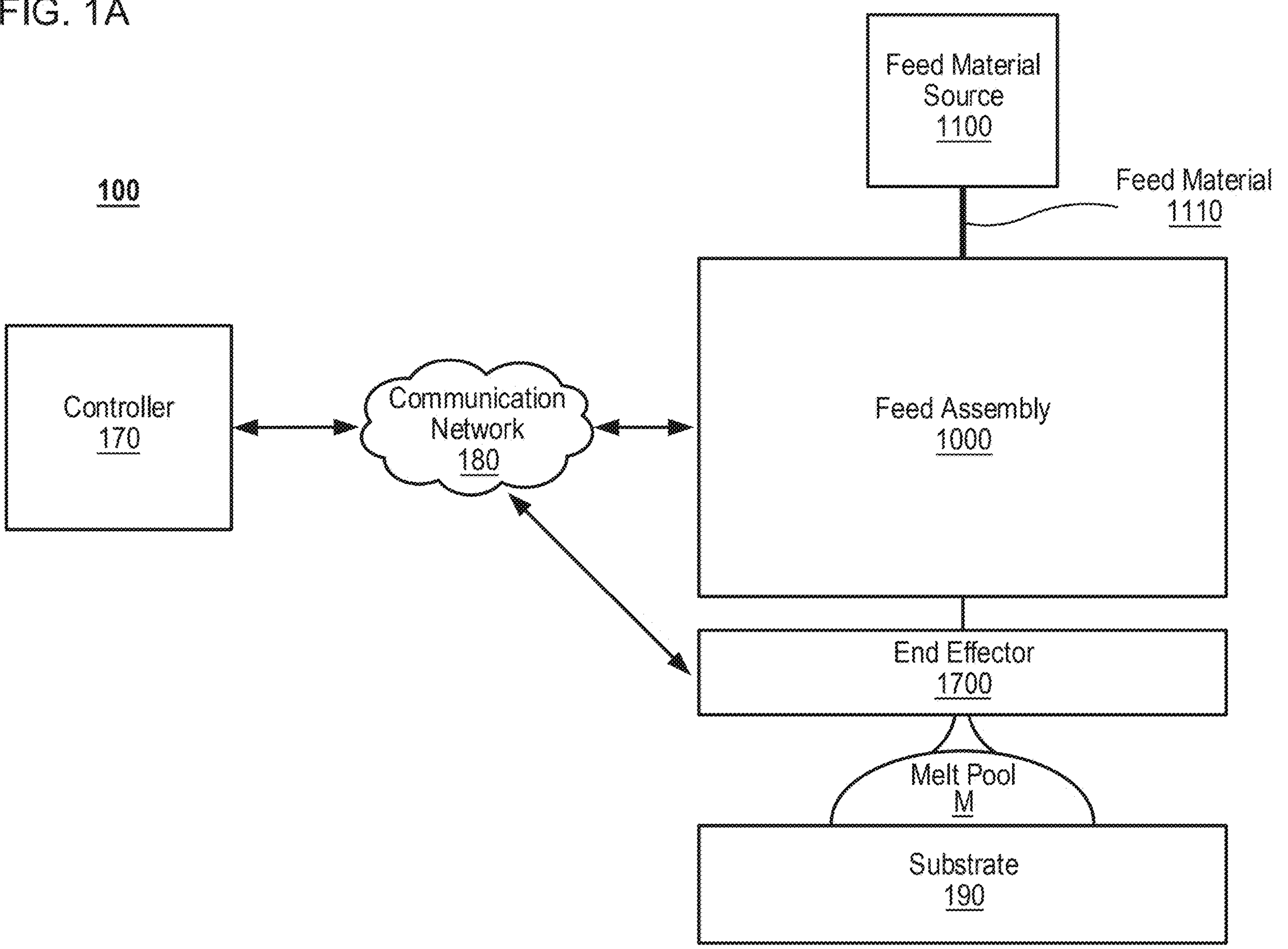
FIG. 1A is a schematic illustration of an additive manufacturing system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to a feed assembly apparatus for additive manufacturing systems and methods of additive manufacturing. In particular, embodiments described herein related to feed assemblies for additive manufacturing systems, which are configured to accept and process a relatively thick feed material, thereby allowing for additive manufacturing of large articles with high throughput. In some embodiments, the relatively thick feed material can include a core-wire as a source material.

Additive manufacturing (AM) has quickly become a widespread and important manufacturing technique for various technology sectors, including aerospace, energy industry, healthcare, and transportation sectors. This is due to a number of significant advantages additive manufacturing has over traditional manufacturing approaches, such as subtractive manufacturing. Such advantages may include rapid prototyping, reduced costs of producing prototypes, increased complexity of the article (may also be referred to as "component," "part," or "object") and designs, weight minimization through the ability to hollow out portions of internal volumes, improved accuracy and resolution, waste material reduction, reduction in pollution, higher energy efficiency, inventory reduction, aggressive part consolidation to improve functionality, flexible and customizable designs, reduction in supply chain complications, and removal of the welding process and welds, which may be costly, defect prone, less structurally sound, and/or unfeasible due to structural properties of the material. For example, the ability to additively manufacture an article, a component, a part, or a prototype in-house reduces the reliance on outside parties for this purpose and eliminates a shipping step (i.e., prototyping and printing done internally) thereby reducing packaging materials, greenhouse gases associated with shipping, and time from concept to prototype. Additive manufacturing also enables the tailoring of objects made with advanced compositions (e.g., functionally graded materials) and features that are difficult or nearly impossible to achieve with conventional manufacturing methods (e.g., casting).

Accordingly, several additive manufacturing techniques are currently available, such as: material extrusion techniques, fused deposition modeling (FDM), powder bed fusion techniques, direct metal laser sintering (DMLS), selective laser sintering (SLS), selective laser melting (SLM), electron beam melting (EMB), selective heat sintering (SHS), directed energy deposition techniques, direct metal deposition (DMD), electron beam additive manufacturing (EBAM), laser metal deposition (LDM), sheet lamination, laminated object manufacturing (LOM), ultrasonic additive manufacturing (UAM), drop-on-demand techniques, material jetting techniques, binder jetting techniques, vat photopolymerization techniques, stereolithography (SLA), digital light processing (DLP), and continuous liquid interface printing (CLIP). In general, consecutive layers of material are deposited and fused together to build an object based on 3D computer-aided design (CAD) data.

However, traditional additive manufacturing techniques have several drawbacks, including constraints on size and composition of feed materials usable for 3D printing (i.e., lack of composite materials, structural properties of certain materials that are not amenable to additive manufacturing, and/or a source material having large diameters), which limits the complexity of the printed items and materials properties that can be formed with such source materials, and low throughput. Furthermore, for 3D printing of larger articles, directed energy deposition (DED) techniques using solid wires are preferable over powder bed fusion techniques as they are able to obtain faster deposition rates with lower cost feedstock and achieve build envelopes unconstrained by the size of the powder bed, such as with open atmosphere printing. However, the production process for the solid wires used in traditional DED techniques involving casting and drawing of specific chemistry, is only economically viable when large volumes are involved. Many highly alloyed and tailored composite chemical compositions are challenging to draw into solid wire. Moreover, traditional DED techniques using solid wire can typically only process small wire diameters, such as diameters of about 1.6 mm or less, due to issues created by increased flexural rigidity (i.e., resistance to bending and/or twisting) and brittleness above such diameters (e.g., issues include wire breakage or brittle fracture during processing). Such limitations prevent DED systems from printing larger diameter wires (e.g., diameters greater than 1.6 mm in diameter) which drastically reduces throughput and consequently minimizes the technique's suitability for the manufacturing of large-scale articles and operations (e.g., printed articles or components having large volume or size). Therefore, traditional additive manufacturing techniques and traditional DED techniques in particular, are less suitable for the efficient manufacture of large articles or components, especially those made from hard alloys, those having complex materials properties, or parts having intricate geometries.

In contrast, systems, apparatuses, and methods described herein relate to additive manufacturing systems which overcome the limitations of traditional directed energy deposition (DED) additive manufacturing techniques. In some embodiments, the systems, apparatuses, and methods described herein may be configured to accommodate feed material, such as core-wire, of a much wider range of diameters relative to conventional systems to provide an unprecedented range of material compositions and phases using core-wire and with a wide range of print resolutions and deposition speeds. Core-wire feed materials may include a sheath and a core, which may include or be filled with various powders or other ingredients. Core-wire feed materials may enable a near unlimited range of desired chemistries by tailoring the constituent ingredients inside the core of the sheath, i.e., a hollow tubular wire, as well as tailoring the ingredients of the sheath itself. Powders included in the core of the core-wire may also be more economical and less energy intensive to produce than powders used by powder-based 3D printers, as they typically require high grade powders of uniform particle size and shape.

Various embodiments of the systems, apparatuses, and methods described herein, which may include a feed assembly including a drive assembly, a feed material (may also be referred as "feedstock," "wire," "feedstock wire," "core-wire," or "core-wire feedstock"), an annealer, and/or an end effector, may provide one or more benefits including, for example: 1) ability to utilize larger size or diameter feed materials than traditional additive manufacturing techniques; 2) faster deposition rates and higher throughput than traditional additive manufacturing techniques; 3) ability to use a wider range of wire diameters; 4) ability to increase malleability of feed material during operation thereby enabling selective bending, twisting, and/or straightening of the feed material; 5) better control over deposition, microstructure, and mechanical properties of printed article; 6) wider range of compositions useable for forming a printed article (i.e., article of manufacture); 7) ability to print larger scale articles at faster rates than realized with traditional additive manufacturing techniques; 8) ability to use a variety or a combination of feed materials through the use of core-wires as an alternative to solid wire; 9) ability to print articles having complex materials properties, such as functional gradients in compositions or materials properties of the printed articles; 10) enable processing of thick wires through use of annealing, benders, straighteners, rollers, or a combination thereof; 11) ability to customize material properties of a printed article through the combination and/or interaction of materials in the core of core-wires; 12) facilitate unique material compositions only possible with larger diameter core-wires; 13) enable high deposition rates from a single wire; 14) enable hassle free changeover from one wire diameter/composition to another; 15) reducing cost and providing easy-to-manufacture solution for producing highly-tailored, custom core-wire formulations for low quantity prototyping or high volume feedstock production; and 16) compared to conventional feedstock, enabling use of highly-tailorable core-wire as the feed material in the additive manufacturing system described herein, thereby enabling a much lower cost and easy-to-manufacture solution for small batch prototyping or high volume production.

While the feed materials, apparatuses, systems, and methods described herein are generally described herein as being applicable to additive manufacturing (e.g., 3D printing) applications, the concepts described herein are equally applicable to welding applications such as laser welding, arc welding, tungsten inert gas (TIG) welding, gas tungsten arc welding, metal arc welding, flux cored arc welding, submerged arc welding, plasma arc welding, metal inert gas (MIG) welding, oxyacetylene welding, atomic hydrogen welding, or any other suitable process. All such welding implementations are envisioned and should be construed to be within the scope of this disclosure.

FIG. 1A is a schematic illustration of an additive manufacturing system 100, according to an embodiment. The additive manufacturing system 100 includes a feed assembly 1000 configured to selectively communicate a feed material 1110 from a feed material source 1100 to an end effector 1700. The end effector 1700 is configured to melt the feed material 1110 and selectively deposit the melted feed material 1110 onto a substrate 190 to form a melt pool M. A controller 170 may be configured to communicate with the additive manufacturing system 100 via a communication network 180.

FIG. 1B is a schematic illustration of the feed assembly 1000 and the end effector 1700 of FIG. 1A. The feed assembly 1000 includes the feed material source 1100, a drive assembly 1200, and an annealer 1300. The annealer 1300 is configured to heat (e.g., selectively heat) a portion of the feed material 1110 to an annealing temperature to increase workability of the feed material 1110. In some embodiments, the end effector 1700 includes a chuck 1710, an energy source 1720 configured to selectively melt the feed material 1110, and a nozzle 1760 configured to selectively deposit the melted feed material onto a substrate to form the melt pool M. In some embodiments, the feed assembly 1000 may optionally include a bender 1400, a straightener 1500, a segmenter 1600, or any suitable combination thereof. In some embodiments, the drive assembly 1200 may optionally include a first sensor 1220 configured to measure a rate of speed of the feed material 1110. In some embodiments, the chuck 1710 may optionally include a second sensor 1712. In some embodiments, the end effector 1700 may optionally include a heat source 1730, a sensor 1740, a machiner 1750, a gas emitter 1770, an exhaust 1780, a mister 1790, or a combination thereof. In some embodiments, the feed assembly 1000 is a collection of components, which, in combination, houses the feed material 1110 and feeds the feed material 1110 to the end effector 1700 for melting and printing.

In some embodiments, the additive manufacturing system 100 of FIG. 1A may include the feed assembly 1000 and/or the end effector 1700 as described relative to FIG. 1A or FIG. 1B. Accordingly, the feed assembly 1000, the end effector 1700, and all components thereof as described relative to FIG. 1B may be incorporated into the system 100 as described relative to FIG. 1A. Hence, FIG. 1A and FIG. 1B may be collectively referred to as "FIG. 1." The system 100 and/or feed assembly 1000 may include a drive assembly 1200 configured to receive the feed material 1110 and selectively displace the feed material 1110 along a length thereof (e.g., feed the feed material 1110). The annealer 1300 may be configured to selectively heat a portion of the feed material 1110 to an annealing temperature to increase workability of the feed material 1110, for example, to facilitate bending thereof. In some embodiments, the end effector 1700 includes the chuck 1710 that is configured to accept the feed material 1110 and communicate the feed material 1110 towards the substrate 190. The chuck 1710 may include or be associated with an energy source 1720 configured to selectively melt at least a portion of the feed material 1110 being communicated through the chuck 1710. The chuck 1710 may also include a nozzle 1760 operably coupled to the chuck 1710. The nozzle 1760 can be configured to deposit the melted portion of the feed material 1110 onto the substrate 190 to form the melt pool M.

In some embodiments, the feed material 1110 may be a wire. In some embodiments, the feed material 1110 may be a solid wire. In some embodiments, the feed material 1110 may also be referred to herein as "feedstock 1110," "wire 1110," or "feedstock wire 1110." In some embodiments, the feed material 1110 may have any suitable cross-sectional shape, such as, for example, a rectangular shape, a circular shape, or a polygonal shape, or any other cross-sectional shape suitable for wires. In some embodiments, the cross-sectional shape of the feed material 1110 includes a width, a thickness (e.g., a gauge of a wire), and/or a diameter, each of which may be referred to as a "largest cross-sectional length," and may be in a range of about 0.3 mm to about 75.0 mm, inclusive.

In some embodiments, the largest cross-sectional length of the feed material 1110 may be about 0.3 mm, about 0.4 mm, about 0.5 mm, about 0.6 mm, about 0.7 mm, about 0.8 mm, about 0.9 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8.0 mm, about 8.5 mm, about 9.0 mm, about 9.5 mm, about 10.0 mm, about 10.5 mm, about 11.0 mm, about 11.5 mm, about 12 mm, about 12.5 mm, about 13.0 mm, about 13.5 mm, about 14.0 mm, about 14.5 mm, about 15.0 mm, about 16.0 mm, about 17.0 mm, about 18.0 mm, about 19.0 mm, about 20.0 mm, about 25.0 mm, about 30.0 mm, about 35.0 mm, about 40.0 mm, about 45.0 mm, about 50.0 mm, about 55.0 mm, about 60.0 mm, about 65.0 mm, about 70.0 mm, or about 75.0 mm, inclusive of all values and ranges therebetween.

In some embodiments, the largest cross sectional length may be at least about 0.3 mm, at least about 0.4 mm, at least about 0.5 mm, at least about 0.6 mm, at least about 0.7 mm, at least about 0.8 mm, at least about 0.9 mm, at least about 1.0 mm, at least about 1.5 mm, at least about 2.0 mm, at least about 2.5 mm, at least about 3.0 mm, at least about 3.5 mm, at least about 4.0 mm, at least about 4.5 mm, at least about 5.0 mm, at least about 5.5 mm, at least about 6.0 mm, at least about 6.5 mm, at least about 7.0 mm, at least about 7.5 mm, at least about 8.0 mm, at least about 8.5 mm, at least about 9.0 mm, at least about 9.5 mm, at least about 10.0 mm, at least about 10.5 mm, at least about 11.0 mm, at least about 11.5 mm, at least about 12 mm, at least about 12.5 mm, at least about 13.0 mm, at least about 13.5 mm, at least about 14.0 mm, at least about 14.5 mm, at least about 15.0 mm, at least about 16.0 mm, at least about 17.0 mm, at least about 18.0 mm, at least about 19.0 mm, at least about 20.0 mm, at least about 25.0 mm, at least about 30.0 mm, at least about 35.0 mm, at least about 40.0 mm, at least about 45.0 mm, at least about 50.0 mm, at least about 55.0 mm, at least about 60.0 mm, at least about 65.0 mm, at least about 70.0 mm, or at least about 75.0 mm, inclusive of all values and ranges therebetween.

In some embodiments, the largest cross sectional length may be no more than about 75.0 mm, no more than about 70.0 mm, no more than about 65.0 mm, no more than about 60.0 mm, no more than about 55.0 mm, no more than about 50.0 mm, no more than about 45.0 mm, no more than about 40.0 mm, no more than about 35.0 mm, no more than about 30.0 mm, no more than about 25.0 mm, no more than about 20.0 mm, no more than about 19.0 mm, no more than about 18.0 mm, no more than about 17.0 mm, no more than about 16.0 mm, no more than about 15.0 mm, no more than about 14.5 mm, no more than about 14.0 mm, no more than about 13.5 mm, no more than about 13.0 mm, no more than about 12.5 mm, no more than about 12.0 mm, no more than about 11.5 mm, no more than about 11.0 mm, no more than about 10.5 mm, no more than about 10.0 mm, no more than about 9.5 mm, no more than about 9.0 mm, no more than about 8.5 mm, no more than about 8.0 mm, no more than about 7.5 mm, no more than about 7.0 mm, no more than about 6.5 mm, no more than about 6.0 mm, no more than about 5.5 mm, no more than about 5.0 mm, no more than about 4.5 mm, no more than about 4.0 mm, no more than about 3.5 mm, no more than about 3.0, no more than about 2.5, no more than about 2.0, no more than about 1.5, no more than about 1.0, no more than about 0.9 mm, no more than about 0.8 mm, no more than about 0.7 mm, no more than about 0.6 mm, no more than about 0.5 mm, no more than about 0.4 mm, or no more than about 0.3 mm, inclusive of all values and ranges therebetween. Combinations of the aforementioned values and ranges for the largest cross-sectional length of the feed material 1110 are also possible (e.g., largest cross-sectional length of at least about 0.3 mm and no more than about 75.0 mm, or at least about 1.0 mm and no more than about 10.0 mm), inclusive of all values and ranges therebetween.

Figure 2:
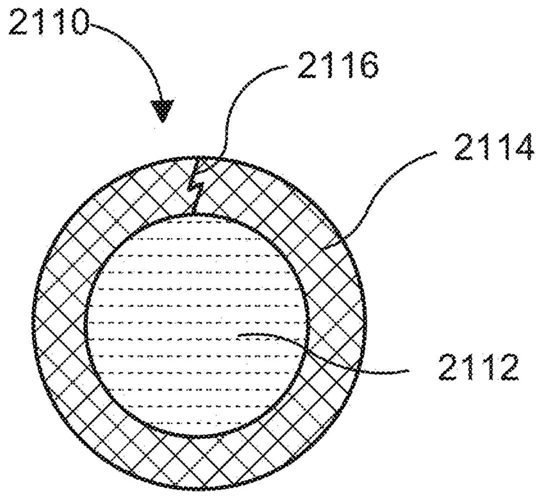
FIG. 2 is front cross-sectional view of a core-wire, according to an embodiment.

In some embodiments, the feed material 1110 may be a core-wire. As described herein, the term "core-wire" refers to a wire that includes a sheath with a material (i.e., a "core") disposed in a hollow channel defined by the sheath. In other words, the core-wire may include the sheath defining the hollow channel, and the core disposed in the sheath (e.g., the hollow channel of sheath). Said another way, the core-wire may include the core and the sheath disposed around the core. For example, FIG. 2 is a schematic illustration of a core-wire 2110, the core-wire 2110 including a core 2112, and a sheath 2114 disposed around the core 2112, according to an embodiment. In some embodiments, the sheath 2114 may define a hollow channel, and the material forming the core 2112 may be disposed in the sheath 2114 (e.g., disposed in the hollow channel of the sheath 2114). In some embodiments, the sheath 2114 may include a seam 2116.

In some embodiments, the core 2112 may be formed from a first material (also referred to as "core material") and the sheath 2114 may be formed of a second material (also referred to as "sheath material"). In some embodiments, the second material may be substantially the same as the first material. In some embodiments, the second material may be different from the first material. For example, the first material may have a first melting temperature, and the second material may have a second melting temperature different from the first melting temperature. In some embodiments, the first material, i.e., the core material, may include a particulate material. In some embodiments, the particulate material may include powders, flakes, grains, filaments, or a combination thereof. In some embodiments, the first material may include wires or rods which may be solid or hollow, the wires or rods disposed in the core 2112. In some embodiments, the first material or the second material may be a single material or a combination of different materials. In some embodiments, at least a portion of the particulate material may be encapsulated in a material shell or matrix, the material shell or matrix configured to protect, isolate, and/or control the release of the particulate material.

In some embodiments, the first material, i.e., the core material, may include, for example, metals, ceramics, polymers, cermets, nano-crystalline and polycrystalline metal alloys and ceramics, glass-ceramics, composites, magnetic materials, hydrides, aerogels, pre-formed crystals for nucleation seeding, swarf, 2D nanomaterials (e.g., graphene), thermoelectric materials, photopolymeric materials, soluble materials, aggregate materials, fuel materials, susceptor materials (e.g., metallic, ceramic-based, composite, cermets, organics), reduced activation materials, curing materials, continuous or short fiber materials, filaments, nanotextured powders, shape alloys, smart materials, encapsulated materials, microelectromechanical materials, heat-shielded microelectromechanical materials, encapsulated microelectromechanical materials, encapsulated printed/implanted microelectromechanical materials, any other suitable material, or any suitable combination thereof. In some embodiments, the first material may include liquids, gels, emulsions, pastes, semi-solid materials, slurries, or a combination thereof. In some embodiments, at least a portion of the first material may be encapsulated in a material shell or matrix that is configured to protect, isolate, and/or control the release of the first material. In some embodiments, the first material may include common ingredients used in self-shielded welding wire flux cores, such as fluxing agents, deoxidizers, stabilizers, alloying elements, binders, or a combination thereof, which may be incorporated, for example, to create a protective atmosphere around the melt pool without the need for an external shielding gas. In some embodiments, the core-wire 2110 may include multiple materials to form a hybrid core-wire, in which the sheath 2114 has a similar composition to the core 2112 to accommodate wire diameters in conventional equipment while having the desired composition for printing.

In some embodiments, the core-wire 2110, the core 2112, and/or the sheath 2114 may include functional additives (e.g., "modifiers") to, for example, modify behavior of the core-wire 2110 and/or the melt pool M. For example, in some embodiments, the modifiers may enhance the microstructure, improve the mechanical properties, and/or avoid defects in the printed article. Such modifiers may include grain refiners, deoxidizers, and desulfurizers, susceptor materials or modifiers, solidification modifiers, oxide dispersoids, carbides and nitrides, rare earth elements, nanoparticles, reinforcement fibers, alloying elements, polymer binders, lubricants, sintering aids, ceramic additives, and surface-active elements. Modifiers may also be included as coatings of the feed material 1110, for example, as a thin layer of a secondary material disposed on the inner or outer surface of the sheath 2114. Such modifier coatings may, for example, include a ceramic or a metal with a lower melting point than the material of the core 2112 or the sheath 2114, to promote better fusion and/or reduce porosity during the additive manufacturing and/or DED printing process.

In some embodiments, the feed material 1110 and/or the core-wire 2110 may include susceptor material(s) configured to be heated via an external induction heater (e.g., an external inductor). In some embodiments, the core-wire 2110, and/or the material(s) forming the core-wire 2110, may be doped with the susceptor material, e.g., by incorporating the susceptor material into a crystal lattice of the materials forming the core-wire 2110. In some embodiments, the core-wire 2110 may include susceptor materials in the core 2112 and/or the sheath 2114. For example, in some embodiments, the susceptor materials may be configured to be heated via induction heating and may be included as a component, such as a primary component, in the core 2112 or the sheath 2114 and/or the materials forming the core 2112 or the sheath 2114. In some embodiments, the susceptor material may be used to form a coating disposed on or around the sheath 2114. In some embodiments, the susceptor material may be configured to coat one or more of the materials or ingredients forming the core 2112. Including susceptor materials configured to be heated via induction heating may enable internal heating of the core-wire 2110, as opposed to the direct external heating from the directed energy source. Induction induced endogenous heating may, for example, be useful for controlling, directing, and tailoring the level and distribution of heat imparted to the feed material 1110 and to maintain the desired heat profile throughout the feed material 1110 as it passes through various operations of the feed assembly 1000 and/or the end effector 1700, such as in one or more of the feeding, melting, and/or deposition operations.

In some embodiments, the feed material 1110 may contain susceptor materials (i.e., "susceptors," not shown). In some embodiments, the susceptors may be configured to interact with electromagnetic energy, for example, to generate heat in the feed material 1110. In some embodiments, the susceptors may be configured to heat up due to their interaction with an electromagnetic field, for example, produced by the annealer 1300 via induction (e.g., eddy current formation or magnetic hysteresis, for example, in ferromagnetic materials) and/or an electromagnetic (EM) field emitter included in annealer 1300. In some embodiments, the susceptors may be tunable based on their electrical and magnetic properties (i.e., "tuned susceptors"), for example, to optimize their response to the electromagnetic field and/or desired thermal behavior in the feed material 1110. This form of tuned endogenous thermal control may be useful for controlling, directing, and/or tailoring the level, distribution, and differential of heat imparted to the feed material 1110 (particularly those with thick cross-sections), and to maintain the desired thermal profile during the annealing process. For example, for the core-wire 2110, in some embodiments, it may be beneficial to have the core 2112 at a first temperature and the sheath 2114 a second temperature. In some embodiments, the second temperature may be different than the first temperature. In some embodiments, the second temperature may be substantially similar to the first temperature. For example, in some embodiments, the feed material 1110 include susceptors tuned to electromagnetic induction for endogenously heating the feed material 1110 for deposition purposes. In some embodiments, the feed material 1110 includes susceptors for depositing conductive circuits in a printed object so as to make the printed object responsive to absorbing an electromagnetic energy and generating heat or electric currents that may be used for powering one or more internal devices in the printed object.

In some embodiments, the core-wire 2110 may include tuned susceptors as ingredients in the core 2112, for example, as one of the core materials (e.g., first material forming the core 2112) and/or as a coating on the core materials (e.g., first material). In some embodiments, the core-wire 2110 may include susceptors as coatings on the sheath 2114. In some embodiments, the susceptors may form at least a portion of the composition of at least one of the core-wire 2110, the sheath 2114, the core 2112, and/or the feed material 1110 (e.g., solid wire). In some embodiments, the susceptors may form substantially all of the composition of at least one of the core-wire 2110, the sheath 2114, the core 2112, and/or the feed material 1110 (e.g., solid wire).

In some embodiments, where the feed material 1110 is formed of a non-conductive material, the feed assembly 1000 may include one or more magnetic couplings (not shown) for conveyance of the feed material 1110 through feed assembly 1000. In some embodiments, the feed material 1110 may include susceptors configured to enable engagement with the one or more magnetic couplings, for example, to facilitate magnetic displacement through the feed assembly 1000. In some embodiments, the feed material 1110 may include a plurality of polymer systems comprising one or more polymers, where the plurality of polymer systems may be configured to be formed in parallel from the same feed material or multiple feed materials.

In some embodiments, feed material 1110 including susceptors may be used to print conductive geometric paths to serve as inductive elements in the printed article. In some embodiments, the bulk (or majority) of the printed article may be formed from a non-conductive material configured to not interfere with electromagnetic fields and include one or more conductive geometric paths formed of susceptors to serve as embedded inductive elements in the printed article. The embedded inductive elements may be used to support wireless and remote heating of the object, or wireless remote powering of or communication with, embedded Internet of Things (IoT) and/or Micro-Electro-Mechanical-Systems (MEMs) devices in the printed article. This approach may, for example, enable advanced and highly integrated electromagnetic components directly into 3D-printed devices, opening possibilities for compact, multifunctional, and/or smart electronics.

In some embodiments, liquid ingredients may be sprayed to coat or wet the first material, the core 2112, or an interior surface of the sheath 2114. In some embodiments, the core 2112 or the sheath 2114 may selectively vary in composition along at least a portion of the length of the core-wire 2110. In some embodiments, the core 2112 or the sheath 2114 may include a composition gradient disposed along at least a portion of the length of the core-wire 2110. In some embodiments, use of powders as the first material in the core-wire 2110 may enable the additive manufacturing of high-performance articles with tailored multi-material properties made from advanced materials that include metal and ceramic matrix composites, high entropy alloys, oxide-dispersion strengthened alloys, nano-coated powders, nano-textured powders, core-shell materials, encapsulated materials (e.g., solid, gas, liquid) and advanced material structures such as functionally graded materials, or any suitable combination thereof. The core-wire 2110 may also be filled with special catalysts and reactive materials that undergo chemical reactions when heated or deposited during additive manufacturing. This may, for example, allow for the printing of complex components having selective variations in composition, such as a compositional gradient, or selective variations in materials properties. In some embodiments, the special catalysts and reactive material(s) may be configured to facilitate, catalyze, accelerate, inhibit, suppress, polymerize, cure, or otherwise modify a formation of the polymer system and/or printed article. In some embodiments, the reactive material(s) may be encapsulated and configured to protect, isolate, and/or control release of the reactive material(s).

In some embodiments, the core-wire 2110 may contain a fluid (e.g., a liquid or gas), such as a fluid suspension or suspension, a liquid solution or suspension, or a suspension of solids or particles (e.g., nanoparticles) disposed in a fluid and/or liquid. In some embodiments, the fluid suspension is configured to transfer the fluid and/or the liquid to a tip of the core-wire 2110 at some defined distance from the substrate 190 and/or where the energy source 1720 is directed. In some embodiments at least a portion of the fluid and/or the liquid may be vaporized by a directed energy (e.g., from the energy source 1720) while the solids and/or particles suspended within the fluid and/or the liquid may be deposited onto the surface of the substrate 190, for example, along with the molten sheath 2114. In some embodiments, the core-wire 2110 may include a fluid suspension, for example disposed in the core 2112 or disposed within the sheath 2114. The fluid suspension may include a suspension of solids disposed in a fluid. The fluid suspension may be configured to emerge from an exposed tip of the core-wire 2110, and at least a portion of the fluid configured to be vaporized by a directed energy from the energy source 1720 while the solids, or particles, are transferred to the substrate

190. In some embodiments, the core-wire 2110 contains a fluid suspension of particles disposed in a fluid whereby the suspension emerges from the exposed tip of the core-wire, and the sheath 2114 and fluid portion is vaporized by directed energy while the suspended particles are transferred to the substrate 190. In some embodiments, substantially all of the fluid is vaporized by the directed energy. In some embodiments where the sheath 2114 is configured to be consumed (e.g., the sacrificial sheath 2114 as described in further detail herein), only the suspended particles will be deposited upon vaporization of the liquid and sheath 2114.

In some embodiments, the sheath 2114 may be formed of metals, ceramics, polymers, or biodegradable materials. In other words, the second material, or the "sheath material" may include metals, ceramics, polymers, or biodegradable materials. In some embodiments, the sheath 2114 may be configured to vaporize, sublimate, evaporate, combust, pyrolyze, ablate, or otherwise be consumed (e.g., at a predetermined temperature) in response to being exposed to energy from the energy source 1720, for example, such that the sheath 2114 may be inhibited or substantially prevented from entering the melt pool M. In such a manner, the sheath material may be substantially excluded from the melt pool formed by the core 2112 during additive manufacturing. In such embodiments, the sheath 2114 may be referred to herein as "sacrificial sheath 2114." In some embodiments, the sacrificial sheath 2114 may be formed of a material capable of being vaporized, sublimated, evaporated, combusted, pyrolyzed, ablated, or otherwise consumed from the heat and/or energy of the energy source 1720 such that the sacrificial sheath 2114, or the second material, is not incorporated into the melt pool or otherwise is not deposited on the substrate 190. Accordingly, in some embodiments, the sacrificial sheath 2114 may be substantially excluded from the composition of the printed article. For example, the sacrificial sheath 2114 may be configured to vaporize, sublimate, evaporate, combust, pyrolyze, ablate, or otherwise be consumed in response to being energized and/or heated by an energy source (e.g., a directed energy source), for example, the energy source 1720 of the end effector 1700.

In some embodiments, the sacrificial sheath 2114 may be formed of a thermoset, a thermoplastic, an elastomer, a biodegradable polymer, or other tailored polymer or heat volatile materials. In some embodiments, the sacrificial sheath material may be flexible for ease of feeding of the core-wire 2110 through the system 100 for additive manufacturing.

In some embodiments, the sheath 2114, or the sacrificial sheath 2114 may have a phase change temperature (i.e., the temperature at which the sacrificial sheath evaporates, sublimates, combusts, pyrolyzes, ablates, or is otherwise consumed) that is lower than or substantially similar (e.g., in a range of ±10%) to a melting temperature of the core 2112. In other words, in some embodiments, the core 2112 may be configured to have a melting temperature higher than the phase change temperature (e.g., pyrolysis or volatilization temperature) of the sacrificial sheath 2114, for example, to enable the sacrificial sheath 2114 to be removed (e.g., evaporated, sublimated, combusted, pyrolyzed, ablated, or otherwise consumed) prior to melting and/or deposition of the core 2112. For example, in some embodiments the melting temperature of the core 2112 may be at least about 50° C. (e.g., in a range of about 50° C. to about 250° C., inclusive of all values and ranges therebetween, or greater) greater than the phase change temperature of the sacrificial sheath 2114.

In some embodiments, the sacrificial sheath 2114 may include non-absorptive material that is transparent to an energy (e.g., a directed energy beam) transmitted by an energy source, e.g., the energy source 1720 (e.g., directed energy source), which allows the energy to pass through the sheath to energize and/or heat the core 2112. In some embodiments, the sacrificial sheath 2114 may include material that allows the energy to be absorbed by the sacrificial sheath to energize and/or heat the sacrificial sheath to ablation, pyrolysis, vaporization, or sublimation.

In some embodiments, the core-wire 2110 including the sacrificial sheath 2114 may be particularly suitable for use in welding applications, for example, in any of the welding applications described herein (e.g., laser welding). For example, instead of building an article on the substrate 190, the melt pool M generated by the feed assembly 1000 may be used to weld articles (e.g., metal plates, joints, etc.) together. The sacrificial sheath 2114 may be particularly beneficial for such welding applications where the sacrificial sheath 2114 enables formation of higher quality and/or finer welds via the material forming the core 2112, while evaporating or sublimating itself such that it does not become part of the weld, thus avoiding contamination resulting in high quality welds.

In some embodiments, the core 2112 of the core-wire 2110, for example, including the sacrificial sheath 2114 may include one or more getter and/or deoxidizing agents formulated to reduce the concentration of a chemical species, such as oxygen, hydrogen, or nitrogen within the feedstock (i.e., core-wire 2110) and/or resulting deposited material (i.e., melt pool M). In some embodiments, the getter may include metallic, intermetallic, or ceramic species, such as titanium, zirconium, aluminum, yttrium, rare-earth metals (e.g., cerium, lanthanum, mischmetal), or compounds thereof. The getter may be incorporated in an amount in a range of about 0.005 wt % to about 1.0 wt % relative to a total weight of the core 2112 (e.g., total powder mixture of the core 2112), inclusive of all values and ranges therebetween. In some embodiments, the getter material may be spatially configured in different ways within the core 2112 (e.g., core 2112 including powders). For example, the getter particles may be homogeneously intermixed with the structural alloy powders or the getter may be concentrated as a concentric annular stratum adjacent to the inner surface of the sacrificial sheath 2114 forming a reactive barrier that intercepts oxygen or moisture diffusing inward from the exterior. In some embodiments, the getter may be provided as discrete pellets or agglomerates arranged along the wire axis at a controlled pitch spacing, enabling staged release and activation as the wire advances. In some embodiments, getter activation may be facilitated by a pre-heating or conditioning step upstream of the melt pool M. For example, in some embodiments, the energy source 1720 may include an ultrafast laser or other photonic source configured to irradiate the core-wire 2110, optionally in conjunction with a radiofrequency or ultraviolet excitation field, to desorb volatile species and activate the getter surface prior to melting. In some embodiments, such conditioning steps may promote removal of absorbed gases and enable the getter to react with oxygen and hydrogen before they can dissolve into the melt pool M or melt zone. In some embodiments, the inclusion of getters in the core 2112 may be configured to reduce dissolved oxygen by an amount in a range of about 50 ppm to about 150 ppm, inclusive of all values and ranges therebetween, or greater, relative to comparable wires without getters. In some embodiments, the getters may be configured to reduce a porosity of the core-wire 2110 (e.g., core 2112) such that pore volume fraction is less than about 0.02%, for example, with a 99th-percentile pore size below about 20 μm. In some embodiments, analytical verification may be conducted through LECO O/N/H analysis, X-ray photoelectron spectroscopy (XPS), or time-of-flight secondary ion mass spectrometry (ToF-SIMS).

In some embodiments, the getter material is selected to thermally decompose, volatilize, or otherwise burn off during pre-heating or heating of the core-wire 2110 (e.g., in the early stages of melting of the core-wire 2110), such that the getter substantially eliminates oxygen and hydrogen without contributing residual alloying elements to the final deposited material. In some embodiments, the getters may include hydrides (e.g., $TiH_2$, $ZrH_2$, $CaH_2$), carbonates (e.g., $CaCO_3$, $MgCO_3$), oxalates, borohydrides, other reactive compounds that release $H_2$, $CO_2$, or other volatile species upon heating, and/or a combination thereof. In some embodiments, the getters may be employed in quantities ranging from about 0.005 wt % to about 0.1 wt % relative to the total weight of the core 2112, inclusive of all values and ranges therebetween. In some embodiments, such quantities of the getters may be sufficient to scavenge absorbed oxygen or moisture while volatilizing, expelling, or otherwise eliminating residual elements (e.g., oxygen) along with the sacrificial sheath and/or byproducts thereof.

In some embodiments, the core-wire 2110 may be subjected to induction heating upstream of the melt pool M (e.g., via the annealer 1300 and/or heat source 1730 as described with respect to FIG. 1B), for example, to desorb moisture and activate getter species prior to melting. In other words, in some embodiments, the annealer 1300 and/or the heat source 1730 may be configured to heat the core-wire 2110 via induction heating. In some embodiments, the annealer 1300 and/or the heat source 1730 may include an induction module (not shown). In some embodiments, the induction module may include a power supply (e.g., configured to have induction frequencies in a range of about 10 kHz to about 5 MHz), impedance-matching network, and one or more coils (e.g., solenoid, pancake, split-core C-yoke, or E-core) arranged around the wire path.

In some embodiments, the one or more coils may have an inner diameter, which may exceed the wire outer diameter (e.g., of the core-wire 2110) by an amount in a range of about 0.2 mm to about 3.0 mm, for example, to maintain a non-contact annular gap between the core-wire 2110 and the coil. In some embodiments, induction frequency may be selected to preferentially couple to the sacrificial sheath 2114, producing eddy-current and, where applicable, hysteretic heating while maintaining the powder core below incipient sintering. In some embodiments, typical pre-heat surface temperatures (e.g., on the sheath 2114 of the core-wire 2110 generated by the annealer 1300 and/or heat source 1730) may be in a range of about 120° C. to about 450° C., inclusive of all values and ranges therebetween, (e.g., for desorption), and optionally up to a maximum temperature in a range of about 600° C. to about 700° C., inclusive of all values and ranges therebetween, for example, to activate Ti/Zr-based getters. In some embodiments, the induction module may be configured to generate energy (e.g., eddy currents in the core-wire 2110) within a residence time in a range of about 5 ms to about 300 ms, inclusive of all values and ranges therebetween, which may vary depending on line speed (also referred to as "feed rate") of the core-wire 2110 through the feed assembly 1000 and/or end effector 1700 (e.g., line speeds and/or feed rates in a range of about 50 mm/s to about 1,500 mm/s, inclusive of all values and ranges therebetween). In some embodiments in which the sheath 2114 includes ferromagnetic materials, operation below the Curie temperature may lead to additional hysteretic losses, while operating above the Curie temperature may enable eddy-current heating of the sheath 2114 to predominate.

In some embodiments, the sheath 2114 may be low-loss (e.g., formed of high-resistivity or polymeric materials). In some embodiments, the sheath 2114 may include susceptor materials (e.g., ferromagnetic materials) configured to respond (e.g., generate heat) to induction heating (e.g., eddy currents), or other electromagnetic forms of heating. In some embodiments, the sheath 2114 may include a thin ferromagnetic susceptor layer (e.g., having a layer thickness of less than about 50 μm). In some embodiments, the sheath 2114 may include discrete susceptor rings at a pitch of about 5 mm to about 50 mm, inclusive of all values and ranges therebetween. In some embodiments, the susceptor layer or rings may be applied to the outer surface of the sheath 2114 or embedded at an interface between the sheath 2114 and the core 2112, for example, to concentrate induction heating and conduct heat inward. Alternatively, susceptor powders (e.g., particles of Fe, Ni, ferrites) may be included in the core 2112 in an amount in a range of about 0.1 wt % to about 5 wt % based on a total weight of the core 2112, inclusive of all values and ranges therebetween. In some embodiments, the susceptor powders may be disposed in an annular stratum of the core 2112 to localize heating adjacent to the sheath 2114.

In some embodiments, the additive manufacturing system includes a polymeric core-wire 2110 with a sheath 2114 formed of a non-reactive polymer and a core containing at least one layer of reactive precursors or additive agents. In some embodiments, the polymeric core-wire 2110 includes a second sheath 2114 disposed within a first sheath 2114, the second sheath formed of a non-reactive polymer. In some embodiments, the polymeric core-wire 2110 includes a first core 2112 disposed within the first sheath 2114 with at least one layer of precursors or additive agents and a second core 2112 disposed within the second sheath 2114 with at least one layer of precursors or additive agents. In some embodiments, the at least one layer of precursors or additives of the first and second core 2112 may be compositionally identical and/or distinct from one another depending on the desired functional properties of the core-wire 2110. In some embodiments, the polymeric core-wire 2110 may include a plurality of layers disposed within the first sheath 2114, each layer including a sheath 2114 and corresponding core 2112. The plurality of sheaths and corresponding cores may be configured to be placed towards the center of a core-wire 2110 cross-section.

In some embodiments, the annealer 1300 and/or the heat source 1730 (e.g., induction module) may include multi-turn coils or segmented coils, which may be driven with phase-shifted currents to generate an axial thermal gradient to promote directional out-gassing away from the deposition zone. In some embodiments, the induction module may include a pre-cooling collar downstream of the coil, which may establish a controlled quench to arrest diffusion while preserving getter reaction products within the core 2112. In some embodiments, the induction zone may be enclosed within a dry inert shroud (e.g., Ar, $N_2$ and/or other inert or low-reactive gases and/or environments, such as those having a dew point of less than or equal to about 60° C.) or a low-vacuum plenum (e.g., having a pressure of less than or equal to about 50 mbar) with counter-flow sweep gas configured to remove desorbed species. In some embodiments, the sheath 2114 may optionally include micro-vent channels and/or materials in the core 2112 may be porosity-graded to facilitate gas egress away from the melt pool M.

In some embodiments, the induction module may be configured to use closed-loop control, which may use IR pyrometry, coil current and/or voltage, and/or pickup-coil mutual inductance to infer temperature and/or magnetic state (e.g., Curie crossing) of the sheath 2114, core 2112, and/or core-wire 2110. In some embodiments, power may be modulated to maintain a target pre-heat window at the line speed. In some embodiments, synchronization with wire feed rate and/or motion control may enable the pre-heated segment of the core-wire 2110 to arrive at the melt pool M within a time in a range of about 50 ms to about 2 seconds, inclusive of all values and ranges therebetween, which may in turn inhibit or otherwise prevent re-adsorption (e.g., of oxygen).

In some embodiments, the induction pre-heat may be combined with photonic conditioning (e.g., ultrafast laser or UV) and/or a phase-locked RF field for surface cleaning while induction provides bulk-directed thermal activation. In such embodiments, the combination of induction heating and photonic conditioning and/or exposure to RF fields may promote oxygen and/or hydrogen scavenging in the core 2112 before metal transfer, thereby reducing dissolved gases and subsequent porosity. In some embodiments, the coil may include electrostatic and magnetic shielding to prevent coupling into the deposition head (e.g., nozzle 1760) of the end effector 1700. In some embodiments, the coil may include fixtures including ceramic stand-offs and/or cooling channels to manage coil temperature. In some embodiments, a matching network may be configured to tune for Q-factor stability across alloy variations of the sheath 2114 and/or speed of the core-wire 2110.

In some embodiments, the sheath 2114 may include multiple layers. For example, in some embodiments, the sheath 2114 may include an inner layer, an outer layer disposed around the inner layer, and, optionally, one or more intermediate layers disposed therebetween. In some embodiments, the outer layer of the sheath 2114 may include a polymer. In some embodiments, the outer layer (e.g., formed of a polymer) configured to provide mechanical containment, smooth feeding, and/or burn vaporize, pyrolyze, or otherwise be consumed cleanly (e.g., substantially without formation of byproducts on the core 2112 and/or in the melt pool M) when exposed to energy from the energy source 1720 (e.g., laser beam, arc) or the melt pool M. In some embodiments, the inner layer of the sheath 2114 may be configured to behave like flux-cored welding wire, and, hence, may be referred to as “inner flux layer.” For example, in some embodiments, when the inner flux layer burns off, it may release protective gases or fluxing agents (e.g., fluorides, carbonates, silicates). In some embodiments, the inner flux layer may include a sacrificial chemistry layer incorporated into the sheath 2114, and the sacrificial chemistry layer may be configured to help control the metallurgy of the core 2112 during deposition. In some embodiments the inner flux layer may serve to reduce oxidation in the melt pool M, scavenge impurities, stabilize the arc and/or laser interaction, and/or improve wetting and bead quality.

In some embodiments, the core-wire 2110 and/or the core 2112 may contain or include Micro-Electro-Mechanical-Systems (MEMS), devices, or sensors. In some embodiments, the MEMS may be encapsulated in a protective shell configured to protects an internal MEMS device(s), for example, disposed within the protective shell (e.g., also referred to herein as “encapsulated micro electro mechanical systems” or “encapsulated MEMs”), during the melting and deposition process that may be via directed energy deposition, heated nozzle deposition, or crucible-based deposition. In some embodiments, the core-wire 2110 and/or feed material 1110 can be utilized to print paths of susceptors to absorb electromagnetic energy and induce a current to wirelessly power internal MEMS.

In some embodiments, the MEMs incorporated into the core-wire 2110 can include microsensors having a representative dimension (e.g., diameter, length, width, height, etc.) in a range of about 0.01 mm to about 5 mm, inclusive of all values and ranges therebetween. In some embodiments, the microsensors may be configured to measure temperature, pressure, torque, acceleration, rotational velocity, sound, magnetic fields, radiation, other parameters, and/or a combination thereof. In some embodiments, MEMs may be encapsulated (e.g., microencapsulated) within an encapsulating material (e.g., refractory material) configured to serve as protection from excessive heat, damage, and/or undesired interactions. In some embodiments, the encapsulating material surrounding the MEMS may be configured to remain intact or act as a sacrificial heat shield, in which the encapsulating material surrounding the MEM ablates or melts in response to a stimuli (e.g., directed energy source, immersion, etc.). In some embodiments, parameters of the printing process (e.g., temperature profiles) may be adjusted to optimize the deposition process when MEMs are present within the core-wire 2110.

In some embodiments, both surface printed and embedded MEMs can be powered by a battery, wired power source, energy harvesting (e.g., vibration, thermal, solar, RF, etc.), electrostatic actuators, piezoelectric actuators, capacitive and/or conductive couplings, and/or a combination thereof. In some embodiments, MEMs may be configured to gather specified data and transfer information on the data through the communication network 180 (e.g., WI-FI®, BLUETOOTH®, internet), for example, to the controller 170 and/or a computational engineering system (CES) configured to generate a tripartite digital twin. In some embodiments, the tripartite digital twin may include a digital architecture configured to receive and/or use computational information, experimental information, sensor-based information [e.g., from sensor(s) 1220, 1712, and/or 1740, and/or from the MEMs], and/or a combination thereof to generate one or more models of a real-world physical system (e.g., mirroring the physical system in a computational environment). In some embodiments, the tripartite digital twin may be configured to model the system 100, the deposition of the core-wire 2110, and/or the printing of the article being additively manufactured, for example, by merging computational, experimental, and/or sensor-based information (e.g., data, models) to generate the model. In some embodiments, the tripartite digital twin may be configured to form a self-improving feedback loop configured to become more accurate over time to predict and optimize the performance of the real-world physical system, for example, by modeling the real-world physical system, receiving information from the sensors [e.g., sensor(s) 1220, 1712, and/or 1740], comparing the model to the received information, modifying the model to reduce a difference between the model and the received information (i.e., optimizing the model), and/or storing information on the real-world physical system, model, and/or modifications for future additive manufacturing process runs. In some embodiments, the information may then be aggregated with data from identical and/or related parts in service to perform simulation, AI analysis, optimizations of performance, predictive maintenance, other such operations, and/or a combination thereof. Without being bound by theory, in some embodiments, the MEMs described herein may broaden the application of metal, ceramic, and polymer 3D printing techniques as the MEMs may be configured to provide real-time feedback to the controller 170 (e.g., via the communication network 180), thereby enabling real-time adjustments to the additive manufacturing process.

In some embodiments, the core 2112 may be formed of metal, ceramic, polymer powders, mixing agents, and/or any suitable combinations thereof. In some embodiments, the sheath 2114 may be formed substantially of polymer. In such embodiments, the core-wire 2110 may be referred to herein as "polymer core-wire (PCW)". In some embodiments, the sheath 2114 may include a polymer matrix (e.g., temperature-activated thermoset) configured to cure when heat is applied by the extruder print head and combine with the core material(s). In some embodiments, the sheath 2114 and the core 2112 may include a thermoplastic and/or thermoset, each of which may be similar to, substantially the same as, or different from a polymer matrix composite (PMC). In some embodiments, the PMC may include one or more curing agents in the core 2112. In some embodiments, the PMC may include gels, liquids, and/or encapsulated liquids.

In some embodiments, the sheath 2114 of the PCT may include fibers (e.g., carbon, boron, aramid, glass, etc.), which may be wound (e.g., helically wound around the core 2112). In some embodiments, the core 2112 may include a two-part polymer matrix powder (e.g., epoxy). In some embodiments, the two-part polymer matrix powder may be activated by heat from the extruder print head and cured to bind the fibers of the sheath 2114 and materials of the core 2112 together to make a continuous fiber composite. In some embodiments, the core 2112 may include additional functional powders or particulates (e.g., graphene) designed to enhance properties of the continuous fiber composite. In some embodiments, the PCW may be printed with low amounts of energy as compared to conventional additive systems and/or feed materials.

In some embodiments, the core 2112 may be formed of a polymer, or combination of polymers, and the sheath 2114 may be formed of another polymer (i.e., a "polymer-polymer core-wire"). In some embodiments, each of the polymers for the core 2112 and the sheath 2114 may be the same or different. For example, in some embodiments, the sheath 2114 is formed of a polymer, and the core 2112 is formed of polymer particulates. In some embodiments, at least a portion of the polymer particulate may be encapsulated in a material shell or matrix, the material shell or matrix configured to protect, isolate, and/or control the release of the polymer particulate. In some embodiments, the sheath 2114 may be formed of a first polymer and the core 2112 may be formed of a second polymer, or vice versa. In some embodiments, the core 2112 may be formed of one or more continuous or chopped fibers, e.g., polymer fibers.

In some embodiments, the core 2112 may include one or more curing agents. In some embodiments, the curing agents are configured to enable curing of one or more polymers disposed in the core 2112, for example, via EM radiation. Melting and deposition of polymer-polymer core-wire(s) can be utilized via standard heated nozzle methods commonly used with fused deposition modeling (FDM) or similar extrusion processes. The polymer-polymer core-wire(s) may also include a percentage of additives, such as metal powders. Polymer-polymer core-wires are distinct from feedstock presently used with FDM, which do not contain a sheath and core structure. FDM feedstock are thermoplastic filaments (e.g., filaments of PLA, PET, etc.) with a homogeneous composition. Some may contain functional additives (e.g., carbon, metal powders) that are mixed into the molten thermoplastic and extruded into filaments, cooled, and spooled. In some embodiments, the powder additives can range from about 30% to about 60% by weight, inclusive. In some embodiments, the functional additive(s) may be encapsulated and configured to protect, isolate, and/or control release of the functional additive(s).

In some embodiments, the core 2112 may be formed of a monomer, prepolymer, polymer, a combination thereof, or multiple combinations thereof, and the sheath 2114 may be formed of a prepolymer, polymer, a combination thereof, or multiple combinations thereof, such that when utilized as core-wire feedstock may produce an additive manufactured part, in whole or in part, including a single-component polymer system or mixed polymer system (e.g., polymer alloys, polymer composites, graft polymers, block polymer complexes, polymer foams, thermoplastic elastomers, thermoset-thermoplastic hybrids, polymer nanocomposites, polymer blends, co-polymers, interpenetrating polymer networks, etc.).

In some embodiments, the core-wire 2110 may be configured to produce a synthesis reaction (also referred to as "reaction synthesis") when subjected to energy (e.g., from the annealer 1300, energy source 1720, and/or heat source 1730). In other words, in some embodiments, the core-wire 2110 may include one or more materials configured to combine to form a compound material when subjected to energy. In such embodiments, the core-wire 2110 may be referred to as "reaction synthesis core-wire." In some embodiments, reaction synthesis core-wire may be subjected to directed energy to facilitate reaction synthesis. In some embodiments, the reaction synthesis core-wire may include a variety of material types, including but not limited to ceramics, metals, intermetallics, polymers, composites, and/or a combination thereof. In some embodiments, the reaction synthesis core-wire may include two or more reactants of dissimilar composition mixed in powder form within the core-wire 2110, in which heat from the energy source 1720 melts the sheath 2114 and initiates a chemical reaction among the core materials in the core 2112. In some embodiments, the reaction synthesis can be exothermic, resulting in generation of heat and/or formation of one or more new phases. In some embodiments, the reaction synthesis core-wire may include one or more inert species configured to absorb heat and control propagation of the reaction synthesis to the remaining reactants within the core 2112. In some embodiments, the reaction synthesis core-wire may enable active material transformation during additive manufacturing, tunable microstructural control, and/or reduced synthesis steps. All such variations are envisioned herein and should be considered as part of the present disclosure.

In some embodiments, the feed material 1110 or the core-wire 2110 may include interpenetrating polymer networks (IPNs) and/or may be configured to generate IPNs upon melting and/or solidification. Interpenetrating polymer networks can typically include two or more polymers that are at least partially interlaced or physically entangled with one another. In some embodiments, the two or more polymers or polymer networks included in the IPN may include minimal, or substantially zero, chemical bonding (e.g., minimal or zero covalent bonding) with one another. In some embodiments, the two or more polymers or polymer networks in the IPN are not covalently bonded to one another. The networks are interpenetrated on a molecular scale, making them inseparable without breaking chemical bonds, for example, of each individual polymer in the IPN. IPNs are typically created by sequentially polymerizing one network within the presence of an existing network or by simultaneously polymerizing two networks. IPNs are distinct from polymer blends, which are physical mixtures of two or more polymers without any chemical bonding between them (e.g. cross-linking or covalent bonding), so the polymers maintain their original molecular structures. IPNs are also distinct from co-polymers which are single-network polymers made from two or more different types of monomers covalently bonded into a single chain. In some embodiments, IPNs may be incorporated (e.g., included) in the core 2112, the sheath 2114, or a combination thereof. In some embodiments, IPNs may be formed before, during, or after deposition of the core-wire 2110, for example, via one or more polymers within the core 2112, one or more polymers in the sheath 2114, and/or a combination thereof.

For applications demanding exceptional performance, IPNs may outperform both blended polymers and co-polymers due to their highly synergistic properties that combine the full strength of both networks, as opposed to the averaged capabilities generally delivered by blends and co-polymers. Integrating IPNs into additive manufacturing via tailored prepolymer core-wire formulations represents a frontier in material innovation and presents new opportunities for high-performance and multifunctional designs. 3D-printing IPNs with pre-polymer core wire can impart unique properties across multiple dimensions, such as enhanced mechanical features (e.g., strength, elasticity, toughness, crack resistance, etc.), shape memory, self-healing, thermal stability, chemical and environmental resistance, tailored degradation, and others. Additive manufacturing with IPN core-wire (e.g., core-wire 2110 including IPNs in the core 2112, the sheath 2114, or a combination thereof) also allows for gradual property transitions across or along layers (e.g., from stiff to flexible), and enhanced bonding between layers, reducing delamination issues commonly seen in additive manufacturing.

Placing uncompounded polymers, polymer precursors, and additives in the core 2112 of the polymeric core-wire feed material may remove the limitations of current polymer additive manufacturing using fully compounded polymer feedstock usually in the form of wires (commonly referred to as filaments), pellets, or granules. This conventional feedstock provides for the standard processing of plastic parts with all their component ingredients thoroughly mixed and processed into a solid, stable form prior to use. Without being bound by theory, this blending and processing may lock in the material properties of the polymer, which may, for example, greatly reduce the availability of reactive sites within the polymer matrix and make the feedstock (e.g., feed material 1110, core-wire 2110) resistant to additional reactions. This makes it unsuitable for IPNs and other advanced polymer systems that require reactive extrusion and other in-situ formation methods during the additive manufacturing process.

Core-wire is ideally suited for making IPN-based 3D-printed parts due to the "raw" nature of the precursor formulations possible with core-wire and the ability to preserve, protect, and deliver these reactive ingredients to the point of activation during deposition. In addition, core 2112 ingredients, such as powders and other particulates, have a much larger surface area compared to solid filaments, making them more responsive to chemical reactions in some embodiments. Polymers in powder form also tend to contain higher concentrations of reactive groups, residual catalysts, or unreacted monomers. In a polymer-precursor core-wire configuration, the stable polymer sheath (e.g., sheath 2114 including polymer materials) protects the reactive ingredients from environmental factors (e.g. oxidation, moisture absorption, contamination, friction, light etc.), and inside the core 2112, additives can be incorporated to suppress reactivity until a curing initiator (e.g., heat, UV light, chemical catalyst) is applied.

Additively manufactured parts made from IPN using core-wire are highly customizable with synergistic properties (e.g., one may provide high tensile and/or compressive strength while another may impart flexibility). During part formation, properties can be strategically deposited where needed and to the desired levels, by tailoring the type and ratio of the polymeric ingredients, modifying the monomer, prepolymer, and/or polymer chemistry and curing conditions, modifying the crosslink densities and network structures, modifying the additive manufacturing process parameters in the pre-deposition, deposition, and post-deposition phases, and other spatial, temporal, mechanical, chemical and environmental factors.

In addition to Full-IPNs, in some embodiments, the core-wire 2110, (e.g., polymeric core-wire including IPNs) may be utilized to form simultaneous IPNs, semi-IPNs, homo-IPNs, sequential IPNs, sequential semi-IPNs, gradient IPNs, or other IPN variants. For example, homo-IPNs may be formed of a plurality of polymers where at least one of the plurality of polymers include the same, substantially the same, or closely related monomers. In some embodiments, the core-wire 2110 may incorporate initiators (e.g., photo-initiators), crosslinkers, curing agents, chain transfer agents, solvents, plasticizers, or stabilizers, to facilitate the polymerization and or curing of a network, or multiple networks. In some embodiments, the sheath 2114 may serve to protect the ingredients in the core 2112, some of which may be sensitive to friction or impact. In some embodiments, the IPN core-wire (e.g., core-wire 2110 including one or more IPNs) may incorporate additives (e.g., graphene, nanoparticles, oxides, fillers, colorants, etc.) to modify the properties of one or more of the polymer networks, which in turn, can modify the performance, function, or appearance of the resultant printed part.

In some embodiments, the core 2112 may include, or may be, a suspension of polymer particles contained in a fluid, which may serve as an inert carrier or encapsulator and/or may participate in a reaction process of the IPN. In some embodiments, the IPN core-wire may contain monomer and or prepolymers in a liquid, semi-liquid, paste, gel, or soft-solid form, or a combination thereof. Formation of the IPNs from the feedstock material may be initiated, accelerated, suppressed, inhibited, cured, or otherwise modified by methods involving heat, light, radiation, ultrasound, chemical (e.g. redox reactions, solvent evaporation, pH), self-assembly, phase separation, environmental factors (e.g. pressure, moisture humidity), or other methods. In some embodiments, the polymer system(s) may be configured to form or cured via at least one of post-synthesis functionalization, hydrolytic or oxidative modifications, pH-sensitive functional groups, thermal- or photo-responsive modification, hybridization with inorganic components, or interfacial compatibilization. In some embodiments, the core-wire 2110 may include one or more nested sheaths (e.g., sheaths 2114) that isolate and separate particulate core (e.g., core 2112) material present on the interior and exterior of the nested sheaths.

In one embodiment, the core-wire 2110 includes or is formed of a polymer sheath (e.g., sheath 2114 including or formed of a polymer) with a monomer and/or prepolymer particulate core (e.g., core 2112 including monomer and/or prepolymer particulate core). In some embodiments, the core-wire 2110 may be extruded through a heated nozzle that melts the polymer into a viscous medium. In some embodiments, the monomer or prepolymer in the core 2112 may diffuse into the molten polymer and may undergo heat-initiated polymerization, forming an interpenetrated structure that is deposited in-situ as a 3D-printed layer where it may fully cure. To support rapid curing of the printed IPN part, in some embodiments, free radical polymerizations may be chosen due to their fast curing rate(s).

In some embodiments, ultrasonic waves may be emitted onto the polymer system to generate localized heat or cavitation, supporting polymerization or enhancing mixing. UV light may be emitted onto the polymer system to initiate further crosslinking in the second polymer network and enhance interfacial bonding between the networks provided that the second polymer network formed from the monomer or prepolymer contains UV-curable functional groups. The feed material may contain thermal and/or photo-initiators to accelerate the curing process. X-rays from an EM emitter may be directed at the deposited material (e.g., the melt pool M) to create free radicals that initiate polymerization or crosslinking.

In some embodiments, the polymer feedstock may deposit one molten polymer layer (e.g. host network) followed by a second monomer or prepolymer layer, which may interpenetrate the first polymer layer and cure to form a sequential IPN between two layers. In some embodiments, the host network may be configured to crosslink. In some embodiments, multiple extruders may be utilized to produce a combined deposition with other feedstock types or other IPN core-wire feedstocks to form an IPN or IPN composite layer. In some embodiments, a second feed material source (e.g., feed material source 1100) may be employed to provide control over the interaction between the networks (e.g., alter the timing and order over crosslinking reactions). In some embodiments, the second feed material source (e.g., feed material source 1100) may be configured to interpenetrate the host network to form a sequential semi-IPN.

In some embodiments, the polymeric core-wire feed material may include two or more monomers, each having have a distinct polymerization mechanism to avoid unwanted cross-reactions. The miscible feed material may be fed through a nozzle (e.g., nozzle 1760). Inside the nozzle 1760, the feed material 1110 may be subjected to heat, UV light and vibrational waves (e.g. ultrasonic) that melts and mixes both monomers forming a molten homogenous mixture. In some embodiments, the heat and/or ultrasonic waves may initiate both polymerization reactions at the same time as the mixture is extruded and/or deposited as a printed layer. In some embodiments, as the two polymer networks form, they may physically entangle to create the IPN structure. UV light may be applied to the layer to accelerate or regulate the rate of final curing. In some embodiments, the printing environment, (e.g., the build plate, and/or the forming object) may be kept at a specific temperature to control the rate of final curing. Both thermal-initiator and photo-initiator powders, that are responsive to the heat and UV light, may be included in the core to support the curing process. In some embodiments, monomers may be chosen over prepolymers due to their higher reactivity, faster reaction kinetics, and controlled crosslinking. In some embodiments, monomers may be substituted with prepolymers. In some embodiments, the sheath 2114 may include or be formed of a polymer that serves as a non-reactive matrix and/or does not participate in the formation of an IPN. In some embodiments, only the core ingredients (e.g., polymers, monomers, prepolymers, initiators, etc., i.e., materials incorporated in, included in, or forming the core 2112) participate in the formation of an IPN. In some embodiments, the polymer sheath (e.g., materials incorporated in, included in, or forming the sheath 2114) may participate in the formation of an IPN. In some embodiments, a monomer or pre-polymer system contained within the core 2112 may selectively polymerize upon exposure to external initiators, curing agents, light, or other suitable physical or chemical mechanism, after being deposited to form a 3D printed layer.

In some embodiments, the IPN may have a degree of interpenetration. In some embodiments, the degree of interpenetration may be spatially tailored within, between, or across layers of the printed polymer networks to impart a gradual variation or transition in mechanical, thermal, and/or chemical properties and performance along a dimension or multiple dimensions of the object (i.e., a gradient-IPN). In some embodiments, this gradient-IPN can be achieved, for example, through sequential polymerization, spatial, or temporal variation of polymerization conditions, or, in some embodiments, via controlled diffusion of one polymer into another by adjusting the core-wire 2110 formulation, print process, and/or environmental parameters. For instance, by adjusting a temperature of the nozzle 1760 during extrusion, a temperature gradient may be formed that controls where and when each polymer network forms in the deposition, allowing for differing degrees of polymerization in the object (e.g., printed article). A concentration gradient of the monomer, prepolymer, and/or polymer may also be implemented, where a second polymer network may gradually become more concentrated and/or polymerize more deeply into a first polymer network. In some embodiments, creating graded transitions from an IPN material into other deposited materials (e.g. ceramics, metals, etc.) may also be realized with the use of in-situ or sequential use of different feedstocks (e.g., feed material 1110 or core-wire 2110).

While described with respect to the additive manufacturing system 100 as shown in FIG. 1A and/or FIG. 1B, in some embodiments, the feed material 1110 and/or core-wire 2110 may be used as the feedstock in other additive manufacturing systems. For example, in some embodiments, the feed material 1110 and/or the core-wire 2110 may be utilized in a friction stir additive manufacturing system as an alternative to the standard rod or bar feedstock employed by such systems.

In some embodiments, the core 2112, or the first material, may include particulates. For example, in some embodiments, the core 2112, or the first material, may include nanoparticles (may also be referred to as "nano-particulates"), microparticles (may also be referred to as "micro-particulates"), macroparticles (may also be referred to as "macro-particulates"), or a combination thereof. For example, the first material, may include nanoparticles, such as particles having a diameter in a range from about 1 nm to about 100 nm, inclusive. In some embodiments, the core 2112 may include microparticles or macroparticles, which may, for example, be coated with functional nanoparticles. In some embodiments, the core 2112 may include microparticles or macroparticles coated with encapsulated functional nanoparticles. The integration of nanoparticles into core-wires may advantageously allow production of high-quality, and structurally sound additive manufactured components. The nanoparticles may help in achieving a more homogeneous microstructure, or in reducing defects like porosity or cracking, which are common in some additive manufacturing processes. This may be particularly beneficial for fabricating large-scale metallic components with high deposition rates and low production costs. For example, the use of nanoparticle-enhanced core-wires, such as metal core-wires containing nanoparticles used to produce medium carbon steel deposits, may result in improved tensile strength and/or a more uniform hardness distribution. Accordingly, in some embodiments, the nanoparticle-enhanced core-wires may be particularly advantageous in high-load environments (e.g., aerospace, structural beams, construction, marine, etc.). Inclusion of nanoparticles may advantageously preserve or facilitate a desired distribution of the particles in the final part formed via the additive manufacturing process.

In some embodiments, functional nanoparticles may be used to coat other particles in the core 2112 to impart beneficial properties that improve the performance of a nanostructured alloy or composite. In some embodiments, nanoparticle coatings may be configured to stabilize the melting process by improving the deposition quality and/or improve dispersion of the core-wire 2110 during the printing process. In some embodiments, metallic and/or ceramic powders may be coated with functional nanoparticles to develop metal and/or ceramic matrix composites including oxide-dispersion strengthened (ODS) alloys. For example, alloys with ODS properties may include, but are not limited to, a base matrix of Nickel-Cobalt-Chromium oxides (e.g., Ni—Co—Cr oxide powders). In some embodiments, the ODS alloys may further include tungsten (W). In some embodiments, the ODS alloys may include a coating. In some embodiments, the coating may include about 1 wt % of yttrium oxide. In some embodiments, the ODS alloy may include GRX-810.

The oxide component of ODS alloy may make traditional manufacturing methods difficult by dissolving in the cast molten metal, having a non-uniform distribution, and/or segregating to grain boundaries, all of which reduce performance. However, using nano-coated powders in core-wires 2110 may overcome these challenges and achieve the desired alloy with ODS properties using a wire-based 3D printer (e.g., the system 100 as described herein). In some embodiments, hollow powders incorporating nano-powders may be utilized in a similar manner to nano-coated solid powders. In some embodiments, the composition of the sheath 2114 and the core 2112 may be combined to produce the desired alloy with ODS properties. In some embodiments, the sheath 2114 may be the sacrificial sheath 2114 as described herein, and the core 2112 and/or materials therein may form the alloys having ODS properties during printing.

In some embodiments, filling of the core-wire 2110 may include electrostatic mixing to promote homogenous dispersion of particulates (e.g., nanoparticles) within the core 2112 and/or core material(s). In some embodiments, electrostatic mixing may include electrostatic milling or mixing. In some embodiments, electrostatic mixing may be configured to use electrostatic forces to charge nanoparticles by contacting the nanoparticles with a charged surface or using a corona discharge. After the charged nanoparticles are attracted to the surface and/or another charged body, electrostatic separators separate the charged nanoparticles based on electrostatic properties (e.g., size, shape, composition, etc.) and collectors gather and refine the milled nanoparticles. In some embodiments, charging the nanoparticles just prior to filling the sheath causes the nanoparticles to repel each other to maintain dispersion and finer distribution of ingredients within the core-wire. In some embodiments, conditions imparted on the nanoparticles (e.g., charge, temperature, humidity, etc.) may be modified based on the electrical properties or resistive nature of the nanoparticles to obtain optimal dispersion properties and efficiency of electrostatic mixing. In some embodiments, the electrostatic mixing and milling can reduce cohesion between nanoparticles to improve the flow of nanoparticles filling the core-wire and minimize contact with other materials to reduce contamination risks. Moreover, the electrostatic processes described herein may improve the consistency of nanoparticle shapes and/or sizes, while providing a gentler non-mechanical process to protect the nanoparticles from damage or structural alteration.

In some embodiments, the core-wire 2110 may have an outer diameter defining an outer surface of the sheath 2114. In some embodiments, the outer diameter may be in a range of about 0.3 mm to about 75.0 mm, inclusive of all values and ranges therebetween. In some embodiments, the outer diameter may be about 0.3 mm, about 0.4 mm, about 0.5 mm, about 0.6 mm, about 0.7 mm, about 0.8 mm, about 0.9 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8.0 mm, about 8.5 mm, about 9.0 mm, about 9.5 mm, about 10.0 mm, about 10.5 mm, about 11.0 mm, about 11.5 mm, about 12 mm, about 12.5 mm, about 13.0 mm, about 13.5 mm, about 14.0 mm, about 14.5 mm, about 15.0 mm, about 16.0 mm, about 17.0 mm, about 18.0 mm, about 19.0 mm, about 20.0 mm, about 25.0 mm, about 30.0 mm, about 35.0 mm, about 40.0 mm, about 45.0 mm, about 50.0 mm, about 55.0 mm, about 60.0 mm, about 65.0 mm, about 70.0 mm, or about 75.0 mm, inclusive of all values and ranges therebetween. In some embodiments, the outer diameter may be at least about 0.3 mm, at least about 0.4 mm, at least about 0.5 mm, at least about 0.6 mm, at least about 0.7 mm, at least about 0.8 mm, at least about 0.9 mm, at least about 1.0 mm, at least about 1.5 mm, at least about 2.0 mm, at least about 2.5 mm, at least about 3.0 mm, at least about 3.5 mm, at least about 4.0 mm, at least about 4.5 mm, at least about 5.0 mm, at least about 5.5 mm, at least about 6.0 mm, at least about 6.5 mm, at least about 7.0 mm, at least about 7.5 mm, at least about 8.0 mm, at least about 8.5 mm, at least about 9.0 mm, at least about 9.5 mm, at least about 10.0 mm, at least about 10.5 mm, at least about 11.0 mm, at least about 11.5 mm, at least about 12 mm, at least about 12.5 mm, at least about 13.0 mm, at least about 13.5 mm, at least about 14.0 mm, at least about 14.5 mm, at least about 15.0 mm, at least about 16.0 mm, at least about 17.0 mm, at least about 18.0 mm, at least about 19.0 mm, at least about 20.0 mm, at least about 25.0 mm, at least about 30.0 mm, at least about 35.0 mm, at least about 40.0 mm, at least about 45.0 mm, at least about 50.0 mm, at least about 55.0 mm, at least about 60.0 mm, at least about 65.0 mm, at least about 70.0 mm, or at least about 75.0 mm, inclusive of all values and ranges therebetween. In some embodiments, the outer diameter may be no more than about 75.0 mm, no more than about 70.0 mm, no more than about 65.0 mm, no more than about 60.0 mm, no more than about 55.0 mm, no more than about 50.0 mm, no more than about 45.0 mm, no more than about 40.0 mm, no more than about 35.0 mm, no more than about 30.0 mm, no more than about 25.0 mm, no more than about 20.0 mm, no more than about 19.0 mm, no more than about 18.0 mm, no more than about 17.0 mm, no more than about 16.0 mm, no more than about 15.0 mm, no more than about 14.5 mm, no more than about 14.0 mm, no more than about 13.5 mm, no more than about 13.0 mm, no more than about 12.5 mm, no more than about 12.0 mm, no more than about 11.5 mm, no more than about 11.0 mm, no more than about 10.5 mm, no more than about 10.0 mm, no more than about 9.5 mm, no more than about 9.0 mm, no more than about 8.5 mm, no more than about 8.0 mm, no more than about 7.5 mm, no more than about 7.0 mm, no more than about 6.5 mm, no more than about 6.0 mm, no more than about 5.5 mm, no more than about 5.0 mm, no more than about 4.5 mm, no more than about 4.0 mm, no more than about 3.5 mm, no more than about 3.0, no more than about 2.5, no more than about 2.0, no more than about 1.5, no more than about 1.0, no more than about 0.9 mm, no more than about 0.8 mm, no more than about 0.7 mm, no more than about 0.6 mm, no more than about 0.5 mm, no more than about 0.4 mm, or no more than about 0.3 mm, inclusive of all values and ranges therebetween. Combinations of the aforementioned values and ranges for the outer diameter of the core-wire 2110 are also possible (e.g., outer diameter of at least about 0.3 mm and no more than about 75.0 mm, or at least about 1.0 mm and no more than about 10.0 mm), inclusive of all values and ranges therebetween.

In some embodiments, the core-wire 2110 may include an inner diameter defining an inner surface of the sheath 2114 (or defining an outer surface of the core 2112). In some embodiments, the inner diameter may be in a range of about 0.1 mm to about 74 mm, inclusive of all values and ranges therebetween. In some embodiments, the inner diameter may be about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8.0 mm, about 8.5 mm, about 9.0 mm, about 9.5 mm, about 10.0 mm, about 10.5 mm, about 11.0 mm, about 11.5 mm, about 12 mm, about 12.5 mm, about 13.0 mm, about 13.5 mm, about 14.0 mm, about 14.5 mm, about 15.0 mm, about 16.0 mm, about 17.0 mm, about 18.0 mm, about 19.0 mm, about 20.0 mm, about 25.0 mm, about 30.0 mm, about 35.0 mm, about 40.0 mm, about 45.0 mm, about 50.0 mm, about 55.0 mm, about 60.0 mm, about 65.0 mm, about 70.0 mm, or about 74.0 mm, inclusive of all values and ranges therebetween.

In some embodiments, the inner diameter may be at least about 0.1 mm, at least about 0.2 mm, at least about 0.3 mm, at least at least about 0.4 mm, at least about 0.5 mm, at least about 0.6 mm, at least about 0.7 mm, at least about 0.8 mm, at least about 0.9 mm, at least about 1.0 mm, at least about 1.5 mm, at least about 2.0 mm, at least about 2.5 mm, at least about 3.0 mm, at least about 3.5 mm, at least about 4.0 mm, at least about 4.5 mm, at least about 5.0 mm, at least about 5.5 mm, at least about 6.0 mm, at least about 6.5 mm, at least about 7.0 mm, at least about 7.5 mm, at least about 8.0 mm, at least about 8.5 mm, at least about 9.0 mm, at least about 9.5 mm, at least about 10.0 mm, at least about 10.5 mm, at least about 11.0 mm, at least about 11.5 mm, at least about 12 mm, at least about 12.5 mm, at least about 13.0 mm, at least about 13.5 mm, at least about 14.0 mm, at least about 14.5 mm, at least about 15.0 mm, at least about 16.0 mm, at least about 17.0 mm, at least about 18.0 mm, at least about 19.0 mm, at least about 20.0 mm, at least about 25.0 mm, at least about 30.0 mm, at least about 35.0 mm, at least about 40.0 mm, at least about 45.0 mm, at least about 50.0 mm, at least about 55.0 mm, at least about 60.0 mm, at least about 65.0 mm, at least about 70.0 mm, or at least about 74.0 mm, inclusive of all values and ranges therebetween.

In some embodiments, the inner diameter may be no more than about 74.0 mm, no more than about 70.0 mm, no more than about 65.0 mm, no more than about 60.0 mm, no more than about 55.0 mm, no more than about 50.0 mm, no more than about 45.0 mm, no more than about 40.0 mm, no more than about 35.0 mm, no more than about 30.0 mm, no more than about 25.0 mm, no more than about 20.0 mm, no more than about 19.0 mm, no more than about 18.0 mm, no more than about 17.0 mm, no more than about 16.0 mm, no more than about 15.0 mm, no more than about 14.5 mm, no more than about 14.0 mm, no more than about 13.5 mm, no more than about 13.0 mm, no more than about 12.5 mm, no more than about 12.0 mm, no more than about 11.5 mm, no more than about 11.0 mm, no more than about 10.5 mm, no more than about 10.0 mm, no more than about 9.5 mm, no more than about 9.0 mm, no more than about 8.5 mm, no more than about 8.0 mm, no more than about 7.5 mm, no more than about 7.0 mm, no more than about 6.5 mm, no more than about 6.0 mm, no more than about 5.5 mm, no more than about 5.0 mm, no more than about 4.5 mm, no more than about 4.0 mm, no more than about 3.5 mm, no more than about 3.0, no more than about 2.5, no more than about 2.0, no more than about 1.5, no more than about 1.0, no more than about 0.9 mm, no more than about 0.8 mm, no more than about 0.7 mm, no more than about 0.6 mm, no more than about 0.5 mm, no more than about 0.4 mm, no more than about 0.3 mm, no more than about 0.2 mm, or no more than about 0.1 mm, inclusive of all values and ranges therebetween. Combinations of the aforementioned values and ranges for the inner diameter of the core-wire 2110 are also possible (e.g., inner diameter of at least about 0.1 mm and no more than about 74.0 mm, or at least about 1.0 mm and no more than about 10.0 mm), inclusive of all values and ranges therebetween.

In some embodiments, the sheath 2114 may have a thickness in a range of about 0.01 mm to about 25 mm, inclusive of all values and ranges therebetween. In some embodiments, the thickness of the sheath 2114 may be about 0.01 mm, about 0.02 mm, about 0.03 mm, about 0.04 mm, about 0.05 mm, about 0.06 mm, about 0.07 mm, about 0.08 mm, about 0.09 mm, about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8.0 mm, about 8.5 mm, about 9.0 mm, about 9.5 mm, about 10.0 mm, about 10.5 mm, about 11.0 mm, about 11.5 mm, about 12 mm, about 12.5 mm, about 13.0 mm, about 13.5 mm, about 14.0 mm, about 14.5 mm, about 15.0 mm, about 16.0 mm, about 17.0 mm, about 18.0 mm, about 19.0 mm, about 20.0 mm, or about 25.0 mm, inclusive of all values and ranges therebetween.

In some embodiments, the thickness may be at least about 0.01 mm, at least about 0.02 mm, at least about 0.03 mm, at least about 0.04 mm, at least about 0.05 mm, at least about 0.06 mm, at least about 0.07 mm, at least about 0.08 mm, at least about 0.09 mm, at least about 0.1 mm, at least about 0.2 mm, at least about 0.3 mm, at least about 0.4 mm, at least about 0.5 mm, at least about 0.6 mm, at least at least about 0.7 mm, at least about 0.8 mm, at least about 0.9 mm, at least about 0.1 mm, at least about 0.2 mm, at least about 0.3 mm, at least at least about 0.4 mm, at least about 0.5 mm, at least about 0.6 mm, at least about 0.7 mm, at least about 0.8 mm, at least about 0.9 mm, at least about 1.0 mm, at least about 1.5 mm, at least about 2.0 mm, at least about 2.5 mm, at least about 3.0 mm, at least about 3.5 mm, at least about 4.0 mm, at least about 4.5 mm, at least about 5.0 mm, at least about 5.5 mm, at least about 6.0 mm, at least about 6.5 mm, at least about 7.0 mm, at least about 7.5 mm, at least about 8.0 mm, at least about 8.5 mm, at least about 9.0 mm, at least about 9.5 mm, at least about 10.0 mm, at least about 10.5 mm, at least about 11.0 mm, at least about 11.5 mm, at least about 12 mm, at least about 12.5 mm, at least about 13.0 mm, at least about 13.5 mm, at least about 14.0 mm, at least about 14.5 mm, at least about 15.0 mm, at least about 16.0 mm, at least about 17.0 mm, at least about 18.0 mm, at least about 19.0 mm, at least about 20.0 mm, or at least about 25.0 mm, inclusive of all values and ranges therebetween.

In some embodiments, the thickness may be no more than about 25.0 mm, no more than about 20.0 mm, no more than about 19.0 mm, no more than about 18.0 mm, no more than about 17.0 mm, no more than about 16.0 mm, no more than about 15.0 mm, no more than about 14.5 mm, no more than about 14.0 mm, no more than about 13.5 mm, no more than about 13.0 mm, no more than about 12.5 mm, no more than about 12.0 mm, no more than about 11.5 mm, no more than about 11.0 mm, no more than about 10.5 mm, no more than about 10.0 mm, no more than about 9.5 mm, no more than about 9.0 mm, no more than about 8.5 mm, no more than about 8.0 mm, no more than about 7.5 mm, no more than about 7.0 mm, no more than about 6.5 mm, no more than about 6.0 mm, no more than about 5.5 mm, no more than about 5.0 mm, no more than about 4.5 mm, no more than about 4.0 mm, no more than about 3.5 mm, no more than about 3.0, no more than about 2.5, no more than about 2.0, no more than about 1.5, no more than about 1.0, no more than about 0.9 mm, no more than about 0.8 mm, no more than about 0.7 mm, no more than about 0.6 mm, no more than about 0.5 mm, no more than about 0.4 mm, no more than about 0.3 mm, no more than about 0.2 mm, no more than about 0.1 mm, no more than about 0.09 mm, no more than about 0.08 mm, no more than about 0.07 mm, no more than about 0.06 mm, no more than about 0.05 mm, no more than about 0.04 mm, no more than about 0.03 mm, no more than about 0.02 mm, or no more than about 0.01 mm, inclusive of all values and ranges therebetween. Combinations of the aforementioned values and ranges for the thickness of the sheath 2114 are also possible (e.g., thickness of at least about 0.01 mm and no more than about 25.0 mm, or at least about 0.05 mm and no more than about 10.0 mm), inclusive of all values and ranges therebetween.

Thus, in some embodiments, using the core-wire 2110 as the feed material 1110 in the system 100 may enable usage of larger diameter wires relative to solid wires used in some additive manufacturing systems. This can, for example, increase throughput as well as allow additive manufacturing of complex alloys and novel materials that are difficult to form into thicker wires (e.g., wires having a diameter of greater than about 1 mm).

In some embodiments, the core-wire 2110 may have a consistent cross-sectional shape along a length of the core-wire 2110. In some embodiments, the cross-sectional shape may be circular, semi-circular, oval, triangular, rectangular, polygonal, any other shape formable via a die. In some embodiments, the core-wire 2110 may have a cross-sectional shape that varies along the length of the core-wire. In some embodiments, the feed material 1110 may be an interweave of two or more coaxial wires or core-wires 2110 (i.e., braided wires or core-wires). In some embodiments, the feed material 1110 may include two or more nested wires.

In some embodiments, the core-wire 2110 may include a seam 2116. In some embodiments, the core-wire 2110 may be seamless. In some embodiments, the core-wire 2110 may be formed via a core-wire forming machine by starting with a long strip of a second material, such as a metal. Strips may be rolled into a hollow tubular wire with an opening along its longitudinal axis. This open tube, such as the sheath 2114, may be filled with ingredients, such as the first material, to form the core 2112. In some embodiments, the first material may be compacted. In some embodiments, the core-wire 2110 may be formed via a co-extrusion machine (i.e., the core 2112 and the sheath 2114 may be co-extruded to form the feed material 1110 or the core-wire 2110) where the core ingredients are mixed in a hopper and fed and compacted into a filling shaft. Concurrently, the polymer may melt to form the sacrificial sheath material, which may be extruded around the compacted core material as it is also extruded through a die with a smaller cross-sectional area than the sheath.

In some embodiments, the ingredient(s) of the core material may be blended or modified using a mixer or mill prior to filling the sheath 2114. Such mixing or milling operations may be performed either individually or collectively to enable dynamic control of the core-wire composition. In some embodiments, multiple hoppers may be used to simultaneously fill the moving sheath thereby regulating ingredient concentrations of the core material(s). In some embodiments, the core-wire 2110 may be filled to include various core materials that have gradient compositions along the length or the cross-section of the core-wire 2110. In some embodiments, wires formed of the core material(s) may be nested within the sheath 2114. In some embodiments, the core 2112 may include wires oriented in any suitable direction relative to an axial direction of the core-wire 2110. For example, in some embodiments, the core 2112 may include wires aligned substantially longitudinally along the axial length of the core-wire 2110. In some embodiments, the wires may be coiled within the sheath 2114 along the axial length of the core-wire 2110. In some embodiments, the core 2112 may include transverse wires that are substantially perpendicular to the axial length of the core-wire 2110, for example, to brace the sheath 2114 and/or maintain a shape of the sheath 2114. In some embodiments, the wires may be included in the core 2112 and oriented at any suitable angle offset from the axial direction of the core-wire 2110 (e.g., 10°, 20°, 30°, 40°, 50°, 60°, 70°, 80°, etc., relative to the axial direction of the core-wire 2110). All such variations are envisioned herein and should be considered as part of the present disclosure.

In some embodiments, the system 100 may include one or more forming and/or feeding subsystems (not shown) configured to form and/or feed the core-wire 2110. In some embodiments, the forming and/or feeding subsystems may be integrated into feed assembly 1000 and/or the end effector 1700 and configured to feed and/or form the core-wire 2110 in-situ to the process, for example, to increase throughput and/or manufacturing efficiency. In some embodiments, the forming and/or feeding subsystems may include one or more powder hoppers, each of which may contain similar, substantially the same, or different constituent materials therein. In some embodiments, the forming and/or feeding subsystems may be configured to form a composite wire on demand by incrementally feeding, mixing, compacting, degassing, selected powder mixtures into a co-extruded sacrificial sheath 2114. In some embodiments, the sheath material may encase the powder core and may be formed continuously as the core-wire 2110 is produced. In some embodiments, the system 100 may be configured to dynamically adjust the powder composition in real time, enabling precise control over functionally graded material properties within the printed part. In some embodiments, the sheath 2114 may be sacrificially removed or burned off during the laser heating phase, leaving behind a fully customized material gradient in the core 2112. Without being bound by theory, such embodiments may enable "on-the-fly" modification of the internal composition of the core-wire 2110, which may facilitate the creation of complex, functionally graded materials or structures that would otherwise be impractical to achieve with conventional pre-manufactured feedstock.

In some embodiments, the creation of functionally graded materials (FGMs) may be achieved through the use of multiple spools of core-wires 2110, each having distinct powder compositions within the corresponding cores 2112. In some embodiments, during the directed energy deposition process, the system 100 may be configured to selectively switch between the various spools of core-wires 2110 at predetermined layers or regions of the build, which may enable the creation of stepwise material gradients within the printed part by alternating feedstock compositions. In some embodiments, a single core-wire 2110 may be pre-manufactured with a controlled compositional gradient along its length. In some embodiments, the core-wire 2110 may be engineered such that its material composition varies incrementally along its length. As the core-wire 2110 is fed through the system 100, the built-in gradient may be transferred directly into the printed component or part, thereby enabling production of a continuous functional gradient without on-the-fly composition adjustments.

In some embodiments, the Freewire sheath 2114 may thin or ablate in response to ultrafast laser pulses milliseconds before melt pool M entry. In some embodiments, the Freewire sheath may be spectrum selective, where the sheath formulation allows the sheath to be spectrally opaque to the pyrolyzing laser while being transmissive to the preconditioned laser, UV, or EM. In some embodiments, the Freewire sheath 2114 may be susceptor-doped sheaths for induction and/or RF heating. In some embodiments, the Freewire sheath 2114 may be susceptor-doped sheaths for non-metallic, ceramic, or polymeric cores for hybrid builds.

To avoid or inhibit the sheath materials and core materials intermixing, the sheath extrusion may be allowed a very brief time to cool before the extruded core material is pushed into the sheath. After the sheath and core material have been co-extruded into the core-wire 2110, light external heat may be applied to the sheath to heat shrink the material and tighten the fit between the sheath and core. The core-wire 2110 may then be conveyed to be spooled. In some embodiments, the sheath 2114, or the second material, may be formed of a chosen metal alloy such that when melted by an energy source, the final printed article is formed of a desired composition. For example, the first material and the second material may be selected such that during deposition, the first and second materials interact to form an alloy or a composite in the melt pool. In some embodiments, the core-wire 2110 may be formed via crimping, or laser welding, such that the first material is sealed within the core 2112 of the sheath 2114.

The feed material source 1100 houses the feed material 1110, such as solid wire or the core-wire 2110. In some embodiments, the feed material source 1100 is a collection of components, which houses the feed material 1110 of one or more types (e.g., solid wire and core-wire variants). In some embodiments, the feed material source 1100 may be included in the feed assembly 1000. In some embodiments, the feed material source 1100 may be separate, or separable, from the feed assembly 1000. In some embodiments, the feed material source 1100 may be operably coupled to the drive assembly 1200, the feed material 1110 housed in the feed material source 1100.

In some embodiments, the feed material source 1100 may be housed in, or coupled to, a repository system (not shown) that digitally identifies the feed material 1110 held in a designated location in the feed material source 1100 or the repository. In some embodiments, the repository may involve a mechanical shuffle that moves one or more feed material source(s) 1100 from a first position to a second position to, for example, position to feed material source(s) 1100 to dispense the feed material 1110 to the drive assembly 1200. In some embodiments, the repository may be configured to move expended feed material sources 1100 out of service for removal from the repository.

Figure 3A:
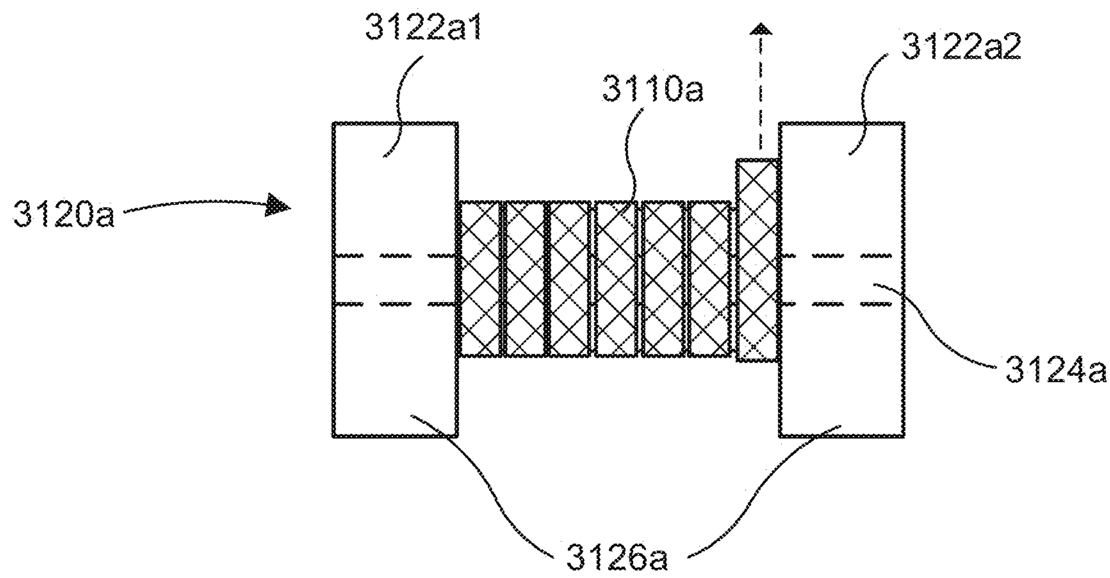
FIG. 3A is a schematic illustration of a feed material source including a spool, according to an embodiment.
Figure 3B:
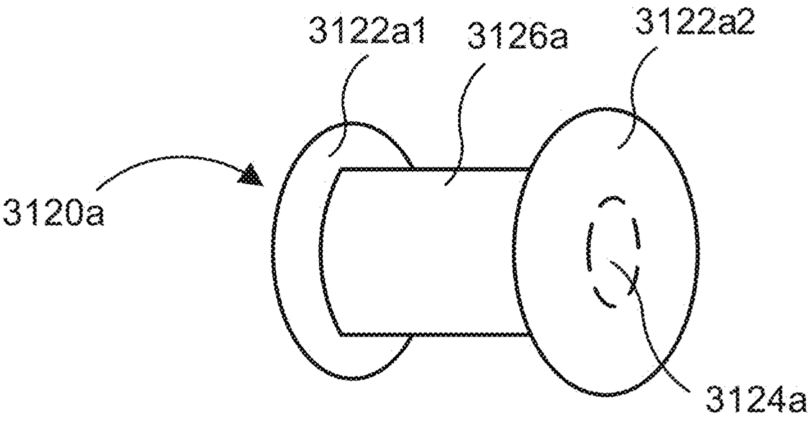
FIG. 3B is a perspective view of the spool of FIG. 3A, according to an embodiment.

In some embodiments, the feed material source 1100 may be a spool configured to house the feed material 1110 in a coil configuration. For example, FIG. 3A and FIG. 3B illustrate a spool **3120*a* configured to act as the feed material source 1100 of FIG. 1A or FIG. 1B, the spool 3120*a* may include a first flange 3122*a*1, a second flange 3122*a*2 disposed opposite the first flange 3122*a*1, a barrel 3126*a* disposed between the first flange 3122*a*1 and the second flange 3122*a*2, an arbor 3124*a* disposed longitudinally through at least a portion of the barrel 3126*a*, and the feed material 3110*a* disposed in a coil configuration around the barrel 3126*a*, according to some embodiments. In some embodiments, the feed material source 1100 may include a plurality of spools, the plurality of spools including the spool 3120*a* or variations thereof. In some embodiments, the spool 3120*a* (or plurality of spools) may be housed in a closed receptacle filled with an inert gas thereby inhibiting a reaction of the feed material 1110** with an environmental contaminant.

Figure 3C:
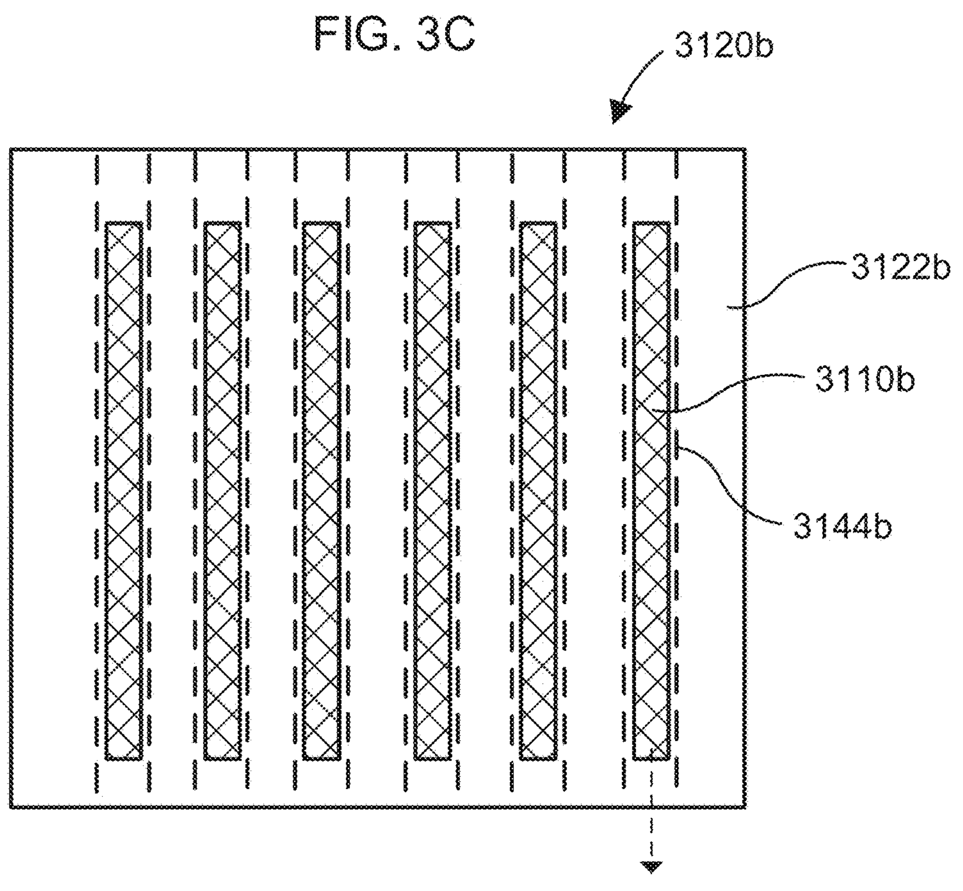
FIG. 3C is a top view schematic illustration of a magazine usable as a feed material source, according to an embodiment.
Figure 3D:
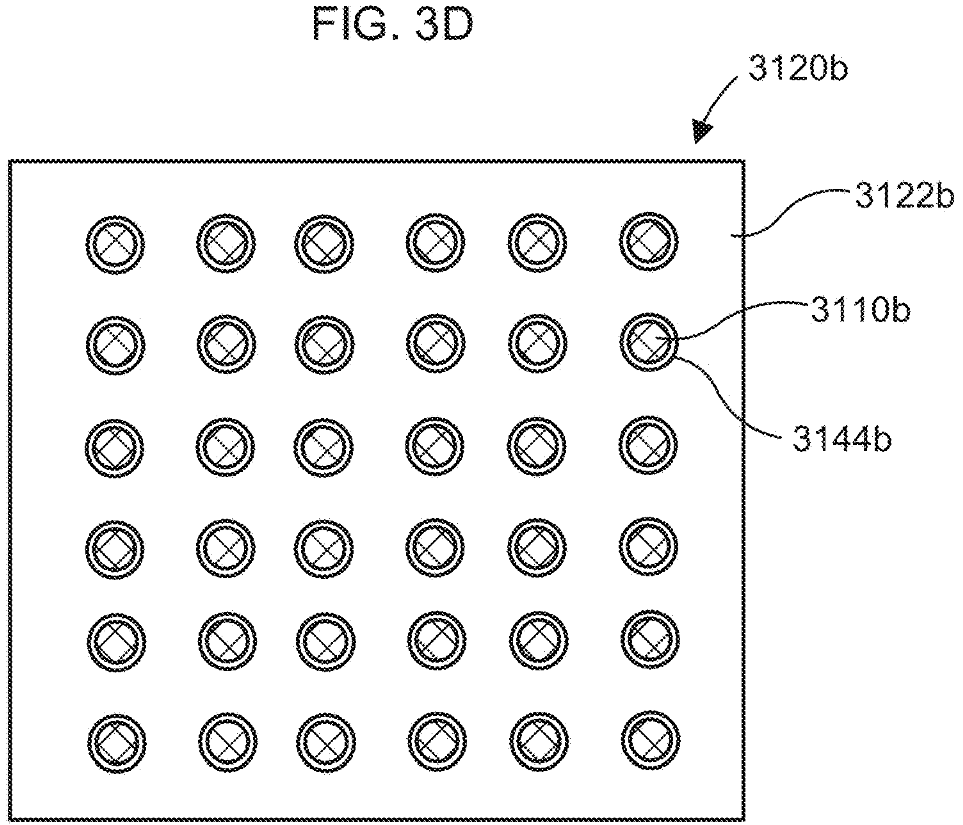
FIG. 3D is a front view schematic illustration of the magazine of FIG. 3C, according to an embodiment.

In some embodiments, the feed material source 1100 may be a magazine configured to house the feed material 1110 in a straight configuration, i.e., without rolling bending, and/or twisting the feed material 1110. For example, FIG. 3C and FIG. 3D display a magazine **3120*b* configured to act as the feed material source 1100 of FIG. 1A or FIG. 1B. The magazine 3120*b* includes a casing 3122*b*, an aperture 3144*b* (also referred to herein as "conduit" or "channel") defined longitudinally through at least a portion of the casing 3122*b*, and a longitudinally extending wire 3110*b* (e.g., the core-wire 2110) disposed in the aperture 3144*b* such that the longitudinally extending wire 3110*b* may be selectively communicated to the drive assembly 1200 from one or more apertures 3144*b* of the casing, according to some embodiments. In some embodiments, the magazine 3120*b* may include the casing 3122*b* defining a plurality of apertures 3144*b* longitudinally through at least a portion thereof. In such embodiments, the feed material includes a plurality of longitudinally extending wires, 3110*b*, each of which is disposed in a corresponding aperture 3144*b* of the plurality of apertures 3144*b* such that each of the plurality of longitudinally extending wires 3110*b* is selectively communicated to the drive assembly 1200 from the corresponding aperture 3144*b* of the casing 3122*b*. In some embodiments, the magazine 3120*b* may include a single aperture 3144*b* defined in the casing 3122*b*, and a single longitudinally extending wire 3110*b* disposed in the single aperture 3144*b*. In some embodiments, the feed material source may include a combination of the spool 3120*a* and the magazine 3120*b*. For example, the feed material may be wrapped in the spool 3120*a* from which it is fed into a corresponding aperture 3144*b* of the magazine 3120*b*, with the aperture 3144*b*** serving to straighten the feed material (i.e., acting as a straightener).

In some embodiments, the feed material source 1100 may include a single magazine **3120*b*. In some embodiments, the feed material source 1100 may include a plurality of magazines, the plurality of magazines including the magazine 3120*b* or variations thereof. In some embodiments, the magazine 3120*b* (or plurality of magazines) may be housed in a closed receptacle filled with an inert gas thereby inhibiting a reaction of the feed material 1110 with an environmental contaminant. In some embodiments, the casing 3122***b* may include a plurality of covers coupled to the plurality of apertures 3144*b*. The plurality of covers may be configured to close the plurality of apertures 3144*b* thereby sealing the magazine 3120*b* from the external environment. In some embodiments, the magazine 3120 may be filled with an inert gas thereby inhibiting reaction of the feed material 1110 the environmental contaminant(s).

In some embodiments, the magazine 3120*b* may be operably coupled to the end effector 1700 and configured to directly feed the longitudinally extending wire 3110*b* into the chuck 1710 along an approximately straight path. In embodiments in which the feed material source may include the spool 3120*a*, this may involve bending and/or twisting of the feed material 1110 to enable transporting the feed material 1110 to the nozzle 1760. However, the magazine 3120*b* configuration may reduce bending and/or twisting of the feed material 1110 as may be needed in the spool 3120*a* configuration of the feed material source 1100. The magazine 3120*b* may be particularly useful for handling wires where the wire composition and/or diameter makes it preferable to preserve the straightness of the wire as it was formed. For example, the magazine 3120*b* may be useful for accommodating wires made from friction extrusion, which are typically available in much smaller lengths (e.g., about 50 cm) than is commonly used in spools (e.g., about 120 m to about 2,000 m, inclusive). Moreover, the magazine 3120*b* may be useful as core-wire feedstock for friction stir additive methods that utilize metal rod and bar stock in lengths below a couple meters.

In some embodiments, the magazine 3120*b* could be cylindrical or rectangular in shape to hold the cache of core-wire segments. Multiple types of core-wires may be housed and selected as desired.

In some embodiments the feed material 1110, the feed material source 1100, such as the spool 3120*a* or the magazine 3120*b*, and/or the feed assembly 1000 may be mounted or integrated into the end effector 1700. This may, for example, minimize a travel distance of the feed material 1110 from the feed material source 1100 to a nozzle or "print head."

The drive assembly 1200 may be configured to receive the feed material 1110 and selectively displace the feed material 1110 along a length thereof. In some embodiments, the drive assembly 1200 may be configured to receive the feed material 1110 (e.g., the core-wire 2110) and push or pull the feed material 1110 through the system 100, along a length of the feed assembly 1000 to the end effector 1700. In some embodiments, the feed material source 1100 may be operably coupled to the drive assembly 1200. In some embodiments, the drive assembly 1200 may include one or more motors, one or more rollers, one or more pistons, one or more shafts, one or more pneumatics or hydraulics, one or more magnetic couplings, or a combination thereof.

In some embodiments the drive assembly 1200 may be disposed sequentially after the feed material source 1100 to receive the feed material 1110 from the feed material source 1100 and transport the feed material 1110 where desired along the feed assembly 1000 to the end effector 1700. In some embodiments, the drive assembly 1200 may include a first sensor 1220 configured to measure a feed rate of the feed material 1110 through the feed assembly 1000, such as, for example, through the drive assembly. In some embodiments, the first sensor 1220 may generate a signal indicative of the feed rate of the feed material 1110 to, for example, allow adjustment of the feed rate based on the signal. In some embodiments, the first sensor 1220 may be configured to selectively measure a temperature of the feed material 1110. In some embodiments, the first sensor 1220 may include a plurality of sensors dispersed throughout the feed assembly 1000, thereby enabling measurements of feed rate at various positions along the feed assembly 1000. Suitable sensors that may be used in or as the first sensor 1220 include temperature sensors (e.g., thermistors, thermometers, etc.), velocity sensors, displacement sensors, motion sensors, image capture devices, electrical sensors (e.g. voltage, current), electromagnetic sensors, interferometric sensors, force sensors (e.g., dynamic strain and stress), environmental sensors (e.g., humidity sensors, i.e., hygrometers, atmospheric pressure sensors, i.e., barometers, etc.), any other suitable sensors, or any suitable combination thereof.

In some embodiments, the feed assembly 1000 may include a manifold (not shown) configured to feed a plurality of feed materials (not shown) or a plurality of core-wires (not shown) into the drive assembly 1200, each of which may be substantially similar to the feed material 1110 and/or the core-wire 2110. In some embodiments, the manifold may be operably coupled to the drive assembly 1200. In some embodiments, the manifold enables multiple feed materials to be fed into the drive assembly 1200 simultaneously and/or enables the drive assembly 1200 to automatically switch from one feed material source 1100 to another feed material source 1100 when a sensor-based controller (e.g., controller 170) detects that an active feed material source 1100 is nearly depleted of feed material 1110. This may, for example, enable uninterrupted operation of the printing process while changing feed material sources, such as wire spools. In some embodiments, the manifold may splice and/or join a plurality of feed materials or core-wires to one another, for example by joining an end of a first segment of feed material 1110 to a start of a second segment of feed material 1110, where the composition of such feed materials are sufficient to permit splicing (e.g., by substantially similar and/or complementary materials used). In some embodiments, the manifold may splice or join the plurality of feed materials through heat, laser seam welding, and/or other methods of fusion.

In some embodiments, the manifold may be operably coupled to the repository that has one or more feed material sources (e.g., a plurality of feed material sources), each of which may be substantially similar to the feed material source 1100. In some embodiments, the system 100 and/or the manifold (not shown) may include a mechanism (not shown) configured to detect depletion of one or more feed material sources of the plurality of feed material sources disposed in the receptacle and/or the feed assembly 1000. In some embodiments, the mechanism may be further configured to automatically replace an expended feed material source with a new feed material source into the receptacle and/or the feed assembly 1000. In some embodiments, the system 100 and/or the manifold may include a joining mechanism configured to physically splice the plurality of feed materials together to form a continuous supply of feed material (e.g., feed material 1110) from multiple the plurality of feed material sources (e.g., feed material source 1100). In some embodiments, the system 100 and/or the manifold may include a mechanism configured to shuttle one or more expended feed material sources out of the system 100 and/or the feed assembly 1000 and dispose one or more new feed material sources into the system 100 and/or the feed assembly 1000 from the repository of feed material sources, for example, to be used in the system 100 and/or the feed assembly 1000.

In some embodiments, the drive assembly 1200 may be configured to communicate with the controller 170 via the communication network 180 in a feedback loop. For example, the controller 170 may determine and communicate a first desired feed rate to the drive assembly 1200 via the communication network 180. The drive assembly 1200 may receive the first desired feed rate and adjust the target feed rate from a first target feed rate to a second target feed rate. In some embodiments, the first sensor 1220 may be operably coupled to the drive assembly 1200. The first sensor 1220 may be configured to measure a first measured feed rate of the feed material 1110 and transmit the first measured feed rate to the drive assembly 1200. The drive assembly 1200 may communicate the first measured feed rate to the controller 170 via the communication network 180. Based on the first measured feed rate, the controller 170 may determine and communicate a second desired feed rate to the drive assembly 1200.

The second desired feed rate may be the same as the first desired feed rate or different than the first desired feed rate, and may be determined based on various parameters including, but not limited to feed material 1110 type, composition, melting point, diameter, solidification temperature, desired build rate, build component shape, any other suitable parameter and/or any suitable combination thereof. The drive assembly 1200 may receive the second desired feed rate and adjust the target feed rate. In this manner, the drive assembly 1200 may operate in a feedback loop with the controller 170 to allow the feed assembly 1000 to operate at a desired feed rate. In some embodiments, the feedback loop may be continuous. In some embodiments, the feedback loop may be selectively transmitted, such as in periodic intervals. Controlling the feed rate via the drive assembly 1200 may beneficially improve print deposition quality and inhibit defects such as balling, keyholes, and lack of fusion.

In some embodiments, the feed assembly 1000 includes the annealer 1300. The annealer 1300 may be configured to selectively heat a portion of the feed material 1110 to an annealing temperature. In some embodiments, the annealer 1300 may include one or more heat sources (also referred to herein as "heating elements"), thermal sensor(s), thermocouple(s), temperature controller(s), and/or a combination thereof. In some embodiments, the annealer 1300 is configured to adjust a heat level (e.g., a temperature set point, such as the annealing temperature) and/or configured to apply a heat ramping rate to the feed material 1110 based on the cross-sectional thickness of the feed material 1110, the composition of the feed material 1110 (e.g., the composition of the wire or core-wire 2110), and/or materials properties or mechanical properties thereof. In some embodiments, the annealer 1300 may communicate with the controller 170 via the communication network 180 and be controlled remotely via a temperature control software. In some embodiments, the annealer 1300 may be operably coupled to a dedicated temperature controller (e.g., a temperature controller and/or a process controller) configured to enable the annealer 1300 to heat the feed material 1110 to a desired temperature set point (e.g., the annealing temperature) at a desired ramp rate. In some embodiments, the annealer 1300 may include and/or be coupled to a PID controller, a thermocouple, or any suitable device for measuring temperatures in-situ and/or adjusting temperature applied to the wire based on a temperature control feedback loop. In some embodiments, the annealer 1300 may be any existing annealer suitable for annealing metals, polymers, ceramics, or a combination thereof, in the feed material 1110 or the core-wire 2110 described herein.

In some embodiments, the annealer 1300 may be operably coupled to the drive assembly 1200 and configured to selectively heat the feed material 1110 (e.g., to increase elasticity of the feed material 1110) as the feed material 1110 is transmitted from the feed material source 1100 to the end effector 1700. In some embodiments, the annealing temperature is sufficient to facilitate bending and/or torsion of the feed material 1110 via the bender 1400 such that the feed material 1110 may bend and/or twist via the bender 1400 without fracture or breakage. In some embodiments, a level, distribution, and/or differential of heat or temperature in the feed material 1110 is monitored and controlled so as to avoid breakage throughout the feed assembly 1000.

In some embodiments, the annealer 1300 may include thermal sensors and/or thermal imaging to measure a thermal profile of the feed material 1110. This may, for example, enable the annealer 1300 to adjust one or more induction parameters via, for example, a closed feedback control loop.

In some embodiments, the feed assembly 1000 may include a plurality of annealers, each of which may be substantially similar to the annealer 1300, and which may be disposed throughout the feed assembly 1000. For example, the plurality of annealers may be disposed between the feed material source 1100 and the end effector 1700, between the feed material source 1100 and the bender 1400, between the feed material source 1100 and the straightener 1500, between the feed material source 1100 and the segmenter 1600, between the bender 1400 and the straightener 1500, between the drive assembly 1200 and the segmenter 1600, and/or any other suitable location(s), or any suitable combination thereof.

In some embodiments, the annealing temperature may be in a range of about 50° C. to about 1,600° C., inclusive of all values and ranges therebetween. In some embodiments, the annealing temperature may be about 50° C., about 75° C., about 100° C., about 125° C., about 150° C., about 175° C., about 200° C., about 225° C., about 250° C., about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., about 1,150° C., about 1,200° C., about 1,250° C., about 1,300° C., about 1,350° C., about 1,400° C., about 1,450° C., about 1,500° C., about 1,550° C., or about 1,600° C., inclusive of all ranges and values therebetween. In some embodiments, the annealing temperature may be at least about 50° C., at least about 75° C., at least about 100° C., at least about 125° C., at least about 150° C., at least about 175° C., at least about 200° C., at least about 225° C., at least about 250° C., at least about 300° C., at least about 350° C., at least about 400° C., at least about 450° C., at least about 500° C., at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., at least about 1,100° C., at least about 1,150° C., at least about 1,200° C., at least about 1,250° C., at least about 1,300° C., at least about 1,350° C., at least about 1,400° C., at least about 1,450° C., at least about 1,500° C., at least about 1,550° C., or at least about 1,600° C., inclusive of all ranges and values therebetween. In some embodiments, the annealing temperature may be no more than about 1,600° C., no more than about 1,550° C., no more than about 1,500° C., no more than about 1,450° C., no more than about 1,400° C., no more than about 1,350° C., no more than about 1,300° C., no more than about 1,250° C., no more than about 1,200° C., no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., no more than about 450° C., no more than about 400° C., no more than about 350° C., no more than about 300° C., no more than about 250° C., no more than about 225° C., no more than about 200° C., no more than about 175° C., no more than about 150° C., no more than about 125° C., no more than about 100° C., no more than about 75° C., or no more than about 50° C., inclusive of all values and ranges therebetween. Combinations of the aforementioned values and ranges for the anneal temperature are also possible (e.g., at least about 50° C. and no more than about 1,600° C., or at least about 250° C. and no more than about 1,250° C.), inclusive of all values and ranges therebetween.

Due to the multi-axis nature of additive manufacturing processes, the feed material 1110 (e.g., the core-wire 2110) may undergo a number of complex motions (e.g., bending, twisting, and/or deformations), and the feed material 1110 should be flexible enough to accommodate such motions. To facilitate this, the annealer 1300 may be employed to selectively heat the feed material 1110 such that the feed material 1110 may become more ductile, thereby improving the ability of the feed material 1110 to withstand a deformation without fracturing. Precision control of the heating may be helpful to avoid damage to the feed material 1110, and, hence, the annealer 1300 may include the thermal sensor, the thermocouple, the temperature controller, or a combination thereof. In some embodiments, the annealer 1300 may also be used to provide energy sufficient to trigger catalysts that may be included in the feed material 1110, and/or or initiate chemical reactions between heat activated ingredients to form a reaction product prior to deposition. The annealer 1300 may include one or more resistive elements, one or more induction elements, one or more microwave elements, one or more infrared heating elements, or any suitable combination thereof.

In some embodiments, the feed assembly 1000 may be equipped with an independent heat source (not shown) that is distinct from the annealer 1300. In some embodiments, the independent heat source (e.g., a resistive heater, an induction heater, etc.) may be used to heat the feed material 1110 prior to entry into the end effector 1700 for melting and deposition. In some embodiments, the feed material may be suitable for or configured for hot wire printing that enables faster deposition rates, improves material utilization, reduces thermal distortion, and allows better control of microstructure and mechanical properties.

In some embodiments, the feed assembly 1000 may include the bender 1400. In some embodiments, the bender 1400 may be disposed between the drive assembly 1200 and the end effector 1700 and configured to selectively bend and/or twist the feed material 1110 from a first direction of travel to a second direction of travel different from the first direction. In some embodiments, the bender 1400 may include a plurality of rollers configured to selectively bend and/or twist the feed material 1110. In some embodiments, the bender 1400 may be disposed after the annealer 1300, such that the annealer 1300 heats the feed material 1110 (e.g., the core-wire 2110) to the annealing temperature, thereby facilitating bending and/or torsion of the feed material 1110 via the bender 1400. For example, the annealer 1300 may be disposed between the drive assembly 1200 and the bender 1400, such that the annealer 1300 facilitates selective bending of the feed material 1110 via the bender 1400.

In some embodiments, the bender 1400 may include a modularized series of rollers (e.g., a cassette) made of ceramic (e.g., cemented carbide), metal, elastomeric materials, or a combination thereof. In some embodiments, the modularized series of rollers may be combined with electric actuators and servomechanisms which may receive the heated feed material 1110 and bend the feed material 1110 where necessary to travel into the nozzle 1760 of the 3D printer. The position of the rollers may be adjustable to receive and feed wires of different widths (gauges) ranging from about 0.3 mm to about 75 mm, inclusive while compensating for heat expansion of the feed material 1110 from the annealing process. In some embodiments, the system 100 may be configured to adjust the bender 1400 and/or a bending force applied to the feed material 1110 based on the cross-sectional thickness, composition, materials properties, and/or mechanical parameters (e.g., spring-back, Young's modulus, buckling load, etc.) of the feed material 1110. The adjustment of the rollers may be performed by software-controlled actuators. The rollers may be heated to maintain the heat of the feed material 1110 before or during bending. Embodiments of the system can be realized to handle various types of wires or feed material, including core-wires (e.g., the core-wire 2110), solid wires, or a combination thereof, subject to any limitations of that wire. In some embodiments, the bender 1400 may include a free-form bender that may include a die defining a channel having a bend therein, such that when the feed material 1110 is fed through the channel, it bends along the length of the channel to emerge from the channel in a different direction from the one it entered the channel in.

In some embodiments, the feed assembly 1000 may include the straightener 1500. The straightener 1500 may be configured to selectively straighten the feed material 1110. In some embodiments, the straightener 1500 may be disposed between the drive assembly 1200 and the end effector 1700. In some embodiments, the straightener 1500 may include a plurality of rollers configured to selectively straighten the feed material 1110. In some embodiments, the straightener 1500 may be disposed after the annealer 1300, such that the annealer 1300 heats the feed material (e.g., the core-wire 2110) to the annealing temperature, thereby facilitating straightening of the feed material 1110 via the straightener 1500. In some embodiments, the straightener 1500 may include a series of precision rollers, servomechanisms, alignment sensors, or a combination thereof to ensure the feed material 1110 fed to the end effector 1700 is uniform and straight. In some embodiments, the position of the rollers may be adjustable to receive feed material(s) 1110 and/or feed wires of different diameters or widths (e.g., gauges), for example, diameters or widths ranging from about 0.5 mm to about 75.0 mm, inclusive of all values and ranges therebetween as described above, while compensating for heat expansion of the feed material 1110 from the annealing process. The adjustment of the roller positioning may be performed by software-controlled actuators. The rollers may be heated to maintain the heat of the feed material 1110 before or during straightening. Embodiments of the system can be realized to handle various types of wires or feed material, including core-wires (e.g., the core-wire 2110), solid wires, or a combination thereof, subject to any limitations of that wire. In some embodiments, the straightener 1500 may include a die configured to straighten the feed material 1110 as it passes through the die.

In some embodiments, the feed assembly 1000 may include the segmenter 1600 that is configured to selectively segment the feed material 1110 and/or selectively provide, apply, or create one or more flex point(s) circumferentially around an outer surface of the feed material 1110, for example, to facilitate selective bending of the feed material 1110. In some embodiments, the segmenter 1600 may include a laser or other energy source configured to selectively etch the outer surface of the feed material 1110 to create the flex point(s). In some embodiments, the segmenter 1600 includes a crimper configured to selectively crimp one or more flex points circumferentially around the outer surface of the feed material 1110.

In some embodiments, the segmenter 1600, or the crimper, includes a first crimping surface and a second crimping surface disposed opposite the first crimping surface a first distance from the first crimping surface, and a coupling mechanism operatively coupled to the first crimping surface and the second crimping surface. The coupling mechanism may be configured to selectively modify the distance (e.g., decrease or increase) between the first crimping surface and the second crimping surface such that the first crimping surface and the second crimping surface may close around the feed material 1110 and circumferentially apply pressure around the feed material 1110, thereby crimping the feed material 1110 and crimping a flex point. The coupling mechanism may also enable the first crimping surface and the second crimping surface to selectively increase the distance therebetween to release the pressure around the feed material 1110 after crimping a flex point therein.

In some embodiments, the first crimping surface and the second crimping surface may be semi-circular mirror images of one another to enable even circumferential crimping around a circularly cross-sectioned feed material 1110, such as the core-wire 2110, when brought together. In some embodiments, the first crimping surface and second crimping surface may form other shapes when brought together, such as, for example, triangular, rectangular, or polygonal. In some embodiments, the first crimping surface and the second crimping surface may mirror one another thereby enabling an even crimp flex point around the feed material 1110. In some embodiments, the first crimping surface and the second crimping surface may not mirror one another, i.e., they may be different, such that different flex points may be created at different points around the feed material 1110 enabling selective bending in a desired direction via the bender 1400.

To achieve a proper level of crimp, in some embodiments, the segmenter 1600 (e.g., the crimper) and the crimping surfaces may be adjusted by a control software to accommodate various wire compositions, diameters, and differences between solid wires and core-wires. The segmenter 1600, or the crimper, can crimp with different impression patterns to result in the optimal bend behavior for the properties of any particular wire or feed material 1110. In some embodiments, the feed assembly 1000 may receive feed materials 1110 (e.g., wires) that have been previously patterned with flex points, and the segmenter 1600 can be disabled, if desired. Embodiments of the system can be realized to handle multiple feed materials simultaneously, or sequentially. Embodiments may include adjustments to a crimp force or a beam etch depth based on software provided data for the cross-sectional thicknesses, composition, and mechanical properties of the feed material.

In some embodiments, the segmenter 1600 may be disposed between the drive assembly 1200 and the end effector 1700. In some embodiments, the segmenter 1600 may be disposed between the drive assembly 1200 and the annealer 1300 such that the segmenter 1600 may apply one or more flex point(s) to the feed material 1110 prior to annealing. In some embodiments, the segmenter 1600 may be disposed between the annealer 1300 and the bender 1400 such that the segmenter 1600 may apply the flex point(s) to the heated feed material 1110 during or after annealing and prior to bending via the bender 1400. In some embodiments, the segmenter 1600 may be disposed between the bender 1400 and the straightener 1500 such that the segmenter 1600 may apply the point(s) to the feed material 1110 prior to straightening via the straightener 1500. In some embodiments, the feed assembly 1000 may include a plurality of segmenters, each of which may be substantially similar to the segmenter 1600, and that may be configured to facilitate bending via the bender 1400 or straightening via the straightener 1500. In some embodiments, the segmenter 1600 may be disposed immediately preceding a thermal region created by the annealer 1300.

The end effector 1700 is configured to melt the feed material 1110 and selectively deposit the melted feed material 1110 onto the substrate 190 to form the melt pool M, as previously described. In some embodiments, the end effector 1700 includes the chuck 1710 configured to accept the feed material 1110, for example, from the feed assembly 1000. In some embodiments, the chuck 1710 is configured to transport the feed material 1110 to the nozzle 1760 for dispensing on the substrate 190. In some embodiments, chuck 1710 is configured to communicate the feed material 1110 towards the substrate 190. In some embodiments, the chuck 1710 may include or be associated with the energy source 1720. In some embodiments, the end effector 1700 includes the nozzle 1760 configured to deposit (e.g., selectively deposit) at least a portion of the melted portion of the feed material 1110 onto the substrate 190 to form the melt pool M. In some embodiments, the nozzle 1760 is configured to selectively deposit the melted portion of the feed material 1110 onto the substrate 190 to form the melt pool M.

In some embodiments, the nozzle 1760 may be operably coupled to the chuck 1710. In some embodiments, the chuck 1710 may optionally include the second sensor 1712. In some embodiments, the end effector 1700 may optionally include the heat source 1730. In some embodiments, the end effector 1700 may optionally include the third sensor 1740. In some embodiments, the end effector 1700 may optionally include the machiner 1750. In some embodiments, the end effector 1700 may optionally include the gas emitter 1770. In some embodiments, the end effector may optionally include the exhaust 1780. In some embodiments, the end effector may optionally include the mister 1790. In some embodiments, the end effector 1700 may optionally include one or more other apparatuses, instruments, tools and/or components suitable and/or configured to interact with the end effector 1700, the feed assembly 1000, the feed material 1110, the system 100, or a combination thereof. In some embodiments, the feed assembly 1000 may be operably coupled to the end effector 1700, or vice versa.

In some embodiments, the chuck 1710 may be configured to automatically, or dynamically, adjust to accommodate various feed materials, wires, or core-wires of different diameters or compositions, for example, based on measurement signals generated by the second sensor 1712. The signals generated by the second sensor 1712 may be communicated to the controller 170 via the communication network 180 in a feedback loop similar to the feedback loop as previously described. This may facilitate transport of the feed material 1110 to the energy source 1720 to selectively melt a portion of the feed material 1110 and selectively deposit the melted portion of the feed material on the substrate 190 via the nozzle 1760. In some embodiments, the chuck 1710 including the second sensor 1712 may be configured to selectively communicate with the feed assembly 1000, the drive assembly 1200, or the first sensor 1220, the controller 170, or a combination thereof via the communication network 180 to, for example, govern a feed rate of the feed material 1110 based on an actual deposition rate or consumption rate of the feed material 1110.

The chuck 1710 may be configured to position the feed material 1110 in a melting zone, a vaporization zone, or a deposition zone, each of which may vary in relation to the substrate 190. For example, the melting zone may disposed be at a position within the chuck 1710 or directly underneath the chuck 1710, such as within about 0.1 mm to about 20 mm of an entry point or inlet of the chuck 1710. The vaporization zone, or sublimination zone may coincide with the melting zone, for example, when the core-wire 2110 includes a sacrificial sheath configured to be vaporized or sublimated at a vaporization temperature below the melting temperature of the core 2112. The deposition zone may be at a position between the end effector 1700 and the substrate 190, such as between the nozzle 1760 and the substrate 190, or immediately above the substrate 190. The chuck 1710 may be configured to adjust a feed mechanism to accommodate for thermal expansion of the feed material 1110 from the annealer 1300 or the heat source 1730 disposed in or operably coupled to the end effector 1700.

The chuck 1710 may be formed of a variety of materials able to handle the feed material 1110 or wires at various temperatures, such as the temperatures previously described in relation to the annealer 1300. In some embodiments, the chuck 1710 may include, or may be formed of, metals, ceramics, cermets, polymers, composites, any other suitable material, or any suitable combination thereof to handle the range of temperatures imparted to the feed material 1110, cyclic temperature loading, abrasive feed material surfaces, chemical compatibility, and other wear features and parameters, over a prolonged period of use. For example, the chuck 1710 may be formed of and/or may include high temperature materials that are wear and corrosion resistant, such as diamond (e.g., polycrystalline diamond(s)), tungsten alloy, molybdenum, silicon carbide, Inconel, cermets, or any combination thereof.

Additionally, the chuck 1710 may be configured to handle a plurality of feed materials, e.g., a plurality of wires, a plurality of core-wires (e.g., the feed material 1110 and/or the core-wire 2110), or a combination thereof, thereby enabling simultaneous deposition of a plurality of melted feed materials for faster printing or printing with different core-wire compositions for creating functional gradients metal and ceramic matrix nanocomposites, and other composites that may benefit from separation from the other deposition ingredients until the moment of melting and deposition. In some embodiments, deposition ingredients may be separated to avoid chemical interaction with other ingredients, effect better deposition performance (e.g., improved dispersion in the melt pool), or simply to facilitate convenience, cost, or availability of existing feedstock inventories depending on the circumstance.

In some embodiments, the plurality of feed materials, wires, or core-wires may be melted to form a plurality of melt pools disposed on one substrate or a plurality of substrates. In some embodiments, the plurality of feed materials may be melted to form a single melt pool. In some embodiments, the plurality of feed materials may include wires or core-wires of varying diameters, including a wire or core-wire of a thinner diameter and of a thicker diameter. The thicker diameter wire or core-wire may enable a high material deposition rate to print a majority of the printed article, and the thinner wire may be used to finish the article to achieve closer dimensional tolerances.

In some embodiments, the chuck 1710 and/or the nozzle 1760 may be equipped with an actuator or transducer to induce a vibration (e.g., ultrasonic vibration) in the feed material 1110 or the core-wire 2110 during melting or vaporization. This may facilitate controlled separation of the melted material, i.e., a molten droplet, from the wire in the melt region. In some embodiments, the vibrations may be synchronized with a corresponding vibration in the substrate 190. In some embodiments, the end effector 1700, the chuck 1710, and/or the nozzle 1760 may include an ultrasonic oscillating source (not shown). For example, in some embodiments, the ultrasonic oscillating source may be operably coupled to the end effector 1700, the chuck 1710, and/or the nozzle 1760. In some embodiments, the ultrasonic oscillating source may be configured to vibrate a tip of feed material 1110 to induce a separation of a molten droplet from the tip of the feed material 1110.

The end effector 1700 further includes the energy source 1720 configured to selectively melt at least a portion of the feed material 1110, for example, to form a melted portion of the feed material 1110 and/or a molten droplet. In some embodiments, the energy source 1720 may be configured to selectively melt at least a portion of the feed material 1110. In some embodiments, the feed material 1110 may be melted by the energy source 1720 to form the molten droplet at an elevation or distance from a surface of the substrate 190. In some embodiments, the energy source 1720 may be an induction source configured to melt the feed material 1110 via induction heating. In some embodiments, the energy source 1720 may be a directed energy source (DES) configured to selectively melt at least a portion of the feed material. The directed energy source may be any directed energy source capable of melting the feed material 1110 or the core-wire 2110 to produce fully dense or partially dense parts.

In some embodiments, the energy source 1720 may be configured to generate energy beams, arcs, induction currents, magnetic fields, electric fields, and/or a combination thereof. For example, the energy source 1720 may be configured to produce a directed energy including a plasma arc, an electric arc, an electron beam, a laser, a plurality thereof, or a combination thereof. In some embodiments, the energy source 1720 may be configured to generate energy that is steady state or pulsed. For example, in some embodiments, the energy source 1720 may be configured to generate pulses of arcs. In some embodiments, the energy source 1720 may be integrated into the chuck 1710 and configured to integrate the core-wire 2110 with a deposition method involving cold metal transfer to induce rapid oscillations of the core-wire 2110 into and out of the melt pool M. In some embodiments, the oscillations described herein may be coordinated to the formation of the core-wire 2110 and the manufactured part, in which the movement is controlled by servo motors, sensors, microprocessors, and/or any combination thereof. In some embodiments, the energy source(s) 1720 and/or the laser(s) may be configured to communicate with a controller, e.g., the controller 170, via a communication network, e.g., the communication network 180, for example, to enable manipulation of one or more parameters of the energy source(s) 1720 or the laser(s) and/or to enable manipulation of a direction of the energy source(s) 1720 or laser(s) from a first direction to a second direction offset from the first direction. In some embodiments, the energy source 1720 may incorporate a cooling system. In some embodiments, a gas from the gas emitter 1770 may also serve as an internal coolant in the cooling system of the energy source 1720, for example, prior to the gas being emitted into a deposition zone.

In some embodiments, the energy source 1720 may be a directed energy source such as a laser beam or other form of electromagnetic radiation, a particle beam (e.g., electrons, neutrons) or arc (e.g., plasma arcs, electric arcs), and/or any other suitable directed energy source sufficient to vaporize the sacrificial sheath and/or melt the core 2112. In some embodiments, a wavelength, power, frequency, modulation, spatial mode, and/or other parameters of the laser serving as the directed energy source may be tailored, selected, or optimized to facilitate vaporization of the sacrificial sheath. The sacrificial sheath may have a vaporization point, or sublimation point, within the melting temperature range of the ingredients in the core 2112 of the core-wire 2110. In some embodiments, the vaporized sacrificial sheath is removed from the end effector 1700, a melt zone, or deposition zone via a flowing gas, and, optionally, transferred to a filtration system.

In some embodiments, multiple directed energy sources and forms of directed energy deposition (DED) may be used. For example, in some embodiments one or more DED source(s) may be used first to ablate, vaporize, or sublimate the sacrificial sheath, which may be followed (e.g., within microseconds or less) with one or more DED sources used to melt the core. For example, a laser, or lasers, may vaporize the sacrificial sheath followed by a second laser, for example, after a microseconds laser, to melt the core ingredients In some embodiments, the same laser may be used to vaporize the sacrificial sheath and melt the core, for example, by pulsing the laser a certain frequency and/or at oscillating energy outputs, e.g., a first energy output to vaporize the sacrificial sheath and a second energy output to melt the core 2112. This selective vaporization and melting process can also happen simultaneously—for instance, while the laser is vaporizing the sheath, a DED source tuned to heat the core may be used (e.g., microwaves, induction, tuned laser, etc.).

In some embodiments, the end effector 1700 may include a plurality of energy sources, each of which may be substantially similar to the energy source 1720. In some embodiments, multiple beam-based directed energy sources may be incorporated, such as a plurality of lasers, a plurality of plasma arcs, a plurality of electric arcs, a plurality of electron beams, or a combination thereof. In some embodiments, the plurality of energy sources may facilitate an increase in an energy input and/or a coverage area imparted to the feed material 1110 via the energy sources. In some embodiments, the plurality of energy sources may be configured to increase a melting rate of at least a portion of the feed material 1110 allowing for a significant boost in a deposition rate for large parts. For example, the plurality of energy sources may be configured or arranged in a manner that maximizes an energy distribution without causing interference or excessive thermal gradients. In some embodiments, the plurality of energy sources may include the plurality of lasers. In some embodiments, the plurality of lasers may include a first laser having a first set of parameters (e.g., a first wavelength, power, frequency, modulation, spatial mode, beam profile, or combination thereof) and a second laser having a second set of parameters (e.g., a second wavelength, power, frequency, modulation, spatial mode, beam profile, or combination thereof), each of which may be substantially similar to one another or different, or they may be configured to vary with respect to one another. In some embodiments, the plurality of energy sources may be directed at different locations in relation to the nozzle 1760, melt pool M, or the deposition zone (e.g., the substrate 190).

In some embodiments, the energy source 1720 (i.e., the directed energy source) may include a focal point where the directed energy is primarily directed. In some embodiments, the focal point may be located on an outer surface of the feed material 1110, such as on the sheath 2114 of the core-wire 2110. In some embodiments, the focal point may be located inside of the feed material 1110, such as in the core 2112 of the core-wire 2110. The focal point may be adjustable by, for example, repositioning the directed energy source or by adjusting one or more parameters of the directed energy source. In some embodiments, the focal point may be adjusted to be a desired location from a surface of the melt pool M on the substrate 190, for example, caused to be located a chosen distance above the melt pool M.

In some embodiments, the directed energy source may be configured to generate the melt pool M on the surface of the component. For example, the directed energy source may include one or more laser beams which melt the feed material 1110 as it is fed into the melt pool M created on a surface of the substrate 190, or a surface of the component, causing it to deposit the molten feed material 1110 layer by layer on the substrate 190 or the component. The feed material 1110 may melt via a combination of a temperature of melt pool and a radiation from the laser. In some embodiments, the energy source 1720 may be directed at an angle to the feed material 1110 or the core-wire 2110, which may be positioned perpendicular to the surface of the substrate 190 or the surface of the part. In some embodiments, the energy source 1720 may be directed perpendicular to the feed material 1110, or the feed material 1110 may be fed at an angle to intersect with the energy source 1720 via the chuck 1710.

In some embodiments, the energy source 1720 (i.e., the directed energy source) may be directed toward a tip of the feed material 1110, or a tip of the core-wire 2110, the tip being some defined distance above the surface of the substrate 190 or the printed article. For example, the core-wire 2110 may be melted via the directed energy source to form a molten liquid and drops of the molten liquid may be disposed on the surface of the substrate 190 or component (e.g., may be similar to extreme high-speed laser application (EHLA) used with powder DED for cladding production). For example, an elevated melt pool may be utilized when using core-wire 2110 containing embedded sensors (e.g., MEMS) to reduce the possibility of heat damage caused by direct exposure to the extreme temperatures of the melt pool. In some embodiments, the drops may be directed to the surface of the substrate 190 via a directional flow of gas formed in a linear stream, helical vortex, pulsed, or other suitable formation. This may, for example, support faster deposition rates, less energy imparted to the printed article, a smaller heat affected zone, and a smaller residual stress in the manufactured part in contrast to if the directed energy source was focused at or near the surface of the substrate 190 or component. This differs from common wire-arc deposition methods where the extreme heat of the arc itself generates a high-temperature plasma which melts both the wire and the substrate, allowing them to fuse together. In some embodiments, the energy source 1720 described herein may utilize either energy beam or arc methods.

In some embodiments, the energy source 1720 may include a combination of laser(s) and induction heater(s) (not shown) configured to cooperatively interact with the feed material 1110. For example, the energy source 1720 may include an induction-assisted laser beam configured to provide bulk heating of the feed material 1110 from the induction heater and localized heating on, for example, the surface of the feed material 1110 via the laser. Induction-assisted lasers used as the energy source 1720 may offer significant advantages in terms of speed and precision of melting or printing of the feed material 1110 and enable increased flexibility of feed material 1110 parameters (e.g., increased feed material 1110 thickness or diameter up to about 75 mm, or greater, and a larger variety of materials capable of being melted and printed over traditional additive manufacturing methods, etc.).

For example, in some embodiments, the induction heater(s) may be used to pre-heat or soften certain areas of the feed material 1110, while the laser(s) may complete the melting process. In some embodiments, precise surface heating of the feed material 1110 via the laser(s) may be followed by bulk heating via induction heater(s). Both the laser and induction heating can be applied simultaneously to maintain a controlled temperature in the feed material 1110 to, for example, help reduce thermal stresses or ensure better heat penetration into the feed material 1110 for uniform melting. Overall, the energy source 1720 (or energy sources) with induction-assisted laser melting may provide increased control over temperature distribution (particularly with thick feed materials 1110), faster heating cycles, reduced energy consumption, and/or reduced power requirements for the laser (i.e., may enable use of lower power lasers, which may reduce costs associated with high power lasers).

In some embodiments, the inductor(s) may include magnetic coils, magnetic field generators (rotating permanent magnets, magnetic circuits), planar inductors (printed circuit inductors, etched inductors), resonant circuits (capacitive coupling, wireless power transfer), toroidal inductors, induction plates, microwave susceptors, magnetic materials, magnetic metamaterials, electromagnetic waveguides, solid state electronics, magnetic concentrators, (ferrite cores, laminated magnetic cores, soft magnetic composites, amorphous metal, magnetic flux conductors, yoke type, magnetic shields, pole pieces), or any combination thereof.

In some embodiments, the inductor(s) may include features to concentrate electromagnetic energy onto the feed material 1110, for example, by employing specific materials and geometries that focus and enhance magnetic field concentration and guide the energy flow for improved heating efficiency and precision. Such features may be achieved through the use of magnetic cores, planar or layered designs, metamaterials, dielectric materials, advanced geometries like fractals or toroids, or a combination thereof.

In some embodiments, the feed material 1110 may include susceptor materials, i.e., "susceptors," as previously described herein. In some embodiments, the susceptors may heat up due to their interaction with an electromagnetic field produced by the inductor(s). In some embodiments, the susceptors may be tunable based on their electrical and magnetic properties to optimize their response to the electromagnetic field and desired thermal behavior and/or topology for melting and deposition. In some embodiments, adjusting the power and frequency of an alternating current driving the induction may control the depth and/or intensity of the induced currents in the susceptors. For example, alternative current with higher frequencies may result in more surface heating, while lower frequencies may penetrate deeper into the feed material 1110.

In some embodiments, the core-wire 2110 may include tuned susceptors as ingredients in the core 2112 composition, as coatings on the sheath 2114, coatings on the core ingredients, and/or form part or all of the composition of the sheath or core, or solid wire. The size of the susceptors may be at the nano, micro, or macro scale. In some embodiments, susceptors may be added to non-conductive feed materials to enable induction heating to materials not otherwise responsive to induction heating. In some embodiments where the sheath 2114 is the sacrificial sheath, susceptors may be added to the sacrificial sheath (e.g., as inclusions, coatings, etc.), to enable induction heating of the sacrificial sheath and support vaporization or sublimation. In some embodiments, the sacrificial sheath may not contain susceptors, while the core 2112 does. In some embodiments, the laser is used to provide precision directed surface heating to vaporize the sheath 2114, while the inductor may be configured to melt the core 2112.

In some embodiments, thermal sensors and imaging are employed to measure, record, and track the thermal output of the inductor, laser beam, and tuned susceptors. This data may be logged and utilized through closed loop feedback control, to, for example, adjust the induction parameters when needed. In some embodiments, the system 100 may include a mechanism and an associated closed loop feedback control for performing automatic adjustments to at least one of applied thermal forces, electromagnetic forces, frictional forces, bending forces, torsional forces, segmenting forces, straightening forces, or a combination thereof to at least one of convey, heat, bend, twist, segment, straighten, or a combination thereof the feed material having a variety of diameters, compositions, and mechanical properties.

In some embodiments, the inductor(s) may be configured to communicate with the controller 170 via the communication network 180. In some embodiments, the controller 170 may utilize machine learning to determine an ideal ratio of induction heating and laser heating based on the specific properties of, for example, the feed material 1110 or core-wire 2110 being deposited (e.g., cross-sectional shape, composition, dimensions, thermal topology, etc.), the article being printed, logged history of deposition performance, other inputs suitable for optimizing induction heating of the feed material 1110, and/or combinations thereof.

In some embodiments, the end effector 1700 may include the heat source 1730 operably coupled to the chuck 1710. In some embodiments, the heat source 1730 may be configured to selectively heat the feed material 1110 to a desired temperature just prior to deposition via the nozzle 1760. This may, for example, improve deposition properties or deposition rate of the melted feed material 1110. The desired temperature may be selected based on the specific material that is being deposited, such as the first material or the second material, and the geometry of the component being printed. The heat source 1730 may provide heat to the feed material 1110 via resistive heating, induction heating, microwave radiation, or a combination thereof.

In some embodiments, the annealing temperature of the feed material 1110 may be maintained until it emerges from the chuck 1710 to undergo melting and deposition (e.g., a "soak phase"). This "soak" phase is designed to allow an internal temperature of the feed material 1110 to become uniform and reach the desired level throughout its entire volume. This uniform temperature may enable a desired metallurgical transformation to occur uniformly across the feedstock. Heating mechanisms may be incorporated throughout the system 100, such as along the feed assembly 1000 and/or within the end effector 1700, to facilitate this. In some embodiments where the feed material 1110 may include or be formed substantially of conductive metals, the annealer 1300 may be sufficient to keep the feed material 1110 at the annealing temperature throughout the system 100. In some embodiments, uniform heat in the feed material 1110 may be enabled through electrical resistance heating.

In some embodiments, the heat source 1730 may include an electro-magnetic (EM) emitter (not shown) configured to produce microwaves or other wavelengths of electromagnetic radiation, which may modify the melt and solidification dynamics of the feed material 1110 or the core-wire 2110 during or after melting via the energy source 1720. In some embodiments, microwaves can be used to improve process efficiency, part quality, and material properties. For example, microwaves may provide energy-efficient heating as they may selectively heat the melt pool M without heating the surrounding environment, potentially resulting in a lower heat affected zone. This may lead to a reduction in energy usage, lower processing costs, and better material properties. Likewise, rapid and uniform microwave heating of the core-wire melt region may minimize grain growth and promote fine microstructures, reduce residual stresses and print distortion resulting in improved mechanical performance and dimensional accuracy of the final part. Integrating EM into the end effector 1700 may offer enhanced process flexibility in terms of process parameters and materials compatibility. Microwaves may be selectively applied to different regions of the part deposition, allowing for tailored heating profiles and improved control over the printing process. In some embodiments, the microwaves may be tuned to selectively resonate with certain materials in the core-wire via resonance absorption. In some embodiments, the EM emitter may be used to cure materials present in the core 2112 and/or the sheath 2114 of the core-wire 2110. In some embodiments, the heat source 1730 may be configured to heat the component printed by the additive manufacturing system 100 to a temperature sufficient to sinter the component, for example, to reduce porosity, remove defects, and/or increase quality.

In some embodiments, the EM emitter may be a laser beam with properties that improve process efficiency, part quality, and material properties. Examples may include dynamically tunable lasers, beam shaping lasers, lasers with optic parametric oscillators (OPOs), lasers with adaptive optics (AO), optical cavity enhanced lasers, and lasers with quantum control. In some embodiments, properties of the core-wire 2110 (e.g., mechanical properties, composition, etc.) may be analyzed by a control, monitoring, and feedback (CMF) system utilized by a computational engineering system (CES) (e.g., controller 170). In some embodiments, the CMF and/or CES may be configured to aggregated data (e.g., anonymous data aggregation) across a network of printers or additive manufacturing systems to optimize laser parameters (e.g., wavelength for use in tunable wavelength lasers) through deep learning and modeling.

In some embodiments, the energy source 1720 may include dynamically tunable wavelength lasers (TWL) configured to provide precise control of the heat transferred into the core 2112 by adjusting (e.g., modulating) the wavelength. Without being bound by theory, adjustments in wavelength corresponding to composition of the core-wire 2110 may reduce potential defects (e.g., porosity, cracking, residual stress, etc.) and improve the quality, stability, and surface finish of the printed part. In some embodiments, a TWL may be configured to adjust the emitted wavelength to correspond to the peak absorption rate of the core-wire 2110 being processed. Since different metals and alloys exhibit varying absorption rates across different wavelengths, tuning the TWL wavelength may enhance the efficiency and quality of the melting process. In some embodiments, the TWL may serve as the primary directed energy source.

In some embodiments, the TWLs may utilize OPOs configured to convert single frequency laser light into a broad spectrum of wavelengths spanning the infrared and/or visible ranges. In some embodiments, optical parametric conversion may facilitate the design of practical, commercially viable tunable laser systems capable of improving efficiency and expanding core-wire 2110 compatibility.

In some embodiments, the energy source 1720 may include adaptive optics (AO) configured to control (e.g., modulate) a parameter of the energy produced by the energy source 1720. For example, in some embodiments in which the energy source 1720 includes laser sources configured to generate one or more laser beams, the AO may be configured to control the beam size and/or shape of the one or more laser beams, thereby enhancing efficiency, precision, cost-effectiveness, and overall quality of the core-wire 2110 melting and printing process. In some embodiments, AO may may be configured to dynamically correct for distortions in the laser beam caused by thermal effects, optical aberrations, other factors, and/or any combination thereof. In some embodiments, dynamic corrections may lead to a more uniform and stable laser beam, which enables finer resolution and more accurate feature creation for more complex geometric printed objects in turn limiting additional post-processing steps. In some embodiments, AO may be operably and/or communicatively coupled to the CMF and/or the CES (e.g., controller 170) described in further detail herein.

In some embodiments, the AO may include a real-time monitoring system capable of simultaneous adjustments during the deposition process. In some embodiments, laser sources with AO may optimize deposition rates to maximize core-wire material deposition efficiency. In some embodiments, AO may be configured to maintain a consistent energy density in the laser spot as the laser beam interacts with the core-wire 2110 and/or melt pool M, thereby reducing the likelihood of defects (e.g., porosity variations, cracks, incomplete fusion, etc.) and enhancing structural integrity and reliability of the manufactured parts. In some embodiments, AO can be configured to modulate laser energy distribution, reducing material waste of the core-wire 2110. In some embodiments, reduction of material waste can be particularly important when processing rare or high-cost core-wire materials. Without being bound by theory, in some embodiments, the use of AO may enhance the adaptability of the system 100 and/or DED process to accommodate a wider range of core-wire compositions and/or complex geometries of printed parts as compared with comparative additive manufacturing systems or processes, and may expand the versatility of applications and/or industries where core-wire laser DED additive manufacturing may be beneficial.

For example, lasers with quantum control may provide the ability to control the energy distribution into the wire feed material at the quantum level to optimize the microstructure of the deposited material. In some embodiments, the EM emitter may be operably coupled to the system 100 and/or the end effector 1700. In some embodiments, the EM emitter may be configured to emit electromagnetic waves directed to the melt pool M, for example, to control a temperature of the melt pool M and/or modify a solidification dynamic of the melt pool M.

In some embodiments, the end effector 1700 may include the third sensor 1740 configured to selectively measure various process parameters related to the feed material 1110, the end effector 1700, and/or any of the components included in the end effector 1700, such as the chuck 1710, the energy source 1720, the heat source 1730, the machiner 1750, the nozzle 1760, deposition parameters, quality control of the final part, or a combination thereof. In some embodiments, the third sensor 1740 includes a plurality of sensors configured to provide a suite of real-time monitoring, control feedback, defect detection, in-situ error correction, tracking of quality assurance data across the entire build process and built object, or a combination thereof. In some embodiments, the third sensor 1740 may include additional sensors or devices, including, but not limited to a vision system, light detection and ranging (LiDAR) sensor, structured light scanning, thermal measurement systems (pyrometry), x-ray computed tomography (CT) scan systems, neutron imaging systems, acoustic systems, stress-strain testing systems, dynamic mechanical analysis (DMA) systems, X-ray images, interferometry systems, electrical impedance systems, electron imaging, infrared cameras and sensors, or a combination thereof. In some embodiments, the third sensor 1740 may be incorporated into the end effector 1700. In some embodiments, the third sensor 1740 may be housed externally or separately from the system 100.

In some embodiments, the electrical impedance system may include two or more microelectrodes embedded within, positioned proximate to, and/or positioned on the surface of the printed object. In some embodiments, the electrical impedance system may be configured to generate alternating electrical currents of varying frequencies, which may be transmitted from one microelectrode to another microelectrode, with voltage measured at one or more receiving microelectrodes. In some embodiments, embedded microelectrodes may be electrically coupled to an external AC current source. In some embodiments, the embedded microelectrodes may be coupled to a partially embedded connector portion, such that at least a portion of the connector is exposed at the surface of the printed part. In some embodiments, the microelectrodes may be coupled to wires configured to link the microelectrodes to an external AC current, and the wires run from the embedded microelectrodes and emerge from the part surface. In some embodiments, conductive material (e.g., copper, etc.) may be printed in the space between the embedded microelectrode and the part surface. In some embodiments, a conductive nanopowder may be utilized to treat the print materials and/or be dispersed within the matrix material prior to the deposition process. In some embodiments, electromagnetic induction may activate the microelectrodes to produce alternating currents. In some embodiments, the microelectrodes themselves may include a form of conductive material (e.g., graphite, graphene, copper, etc.), for example, printed into the part to create a circuit across a variety of microelectrodes. When the microelectrodes themselves include a form of conductive material, an implanted electrode unit may be excluded.

In some embodiments, reference materials with established impedance characteristics may be incorporated into the printed part, as to provide precision material performance assessments in relation to the baseline electrical impedance measurements (EIMs) of the reference materials. In some embodiments, variations in impedance may provide information on different aspects of the printed object, such as integrity, composition, structure, and any combination thereof. In some embodiments, the microelectrodes may be strategically placed in different regions of the printed part to aid in the detection of damage or defects (e.g., cracks, voids, delaminations, corrosion, material degradation, etc.) over time. In some embodiments, EIMs may be performed automatically and/or continuously between microelectrodes to acquire data for image reconstruction.

In some embodiments, the electrical impedance system may be configured for electrical impedance tomography (EIT) and/or electrical impedance spectroscopy (EIS). In some embodiments, EIT may be configured to generate a tomographic image of the interior portion of the printed part and provide a spatial distribution of electrical properties, such as resistance and/or reactance. In some embodiments, data obtained through EIT may be transferred through the communication network 180 to the CES tripartite digital twin. In some embodiments, the data may be aggregated with data from identical and/or related parts in service to perform simulation, artificial intelligence (AI) analysis [e.g., machine learning (ML)], and/or optimizations of performance, predictive maintenance, other systems of algorithms, and/or a combination thereof. In some embodiments, EIS may be utilized to analyze impendence responses across a range of frequencies to characterize the mechanical properties of the printed object. In some embodiments, the impedance data described herein may be transferred through the communication network 180 for further image processing by cloud-based software that utilizes AI/ML analysis. In some embodiments, AI/ML analysis may be configured to incorporate additional static and/or real-time diagnostic data to provide new observations, assess performance, and/or conduct failure mode monitoring. In some embodiments, the utilization of EIM-enabled printed objects may enhance preventative efforts in real-time by targeting early detection and replacements of parts at risk of failure or in need of maintenance.

In some embodiments, the end effector 1700 may include the machiner 1750. In some embodiments, the machiner 1750 may be configured to selectively modify the printed article during or after deposition or solidification of the melted feed material 1110. In some embodiments, the machiner 1750 may be operably coupled to the chuck 1710. In some embodiments, the machiner 1750 may include a tool carousel that may include various manufacturing tools. For example, the machiner 1750 may include a milling tool integrated into the same end effector used for deposition, or the milling tool may be integrated into a separate end effector, such as in a plurality of end effectors, each of which may be substantially similar to the end effector 1700. In some embodiments, the milling tool may be cryogenically cooled to facilitate cryogenic machining, which improves tool life, reduces wear, and enhances surface finish of the printed article by minimizing heat generation and thermal damage during cutting processes.

The milling tool may be used to selectively mill the printed article to specific machine tolerances where desired. The machiner 1750 may enable for a hybrid additive-subtractive process allowing for in-situ machining of a printed article to produce a net shape article. Different tooling heads can be used (e.g., welding heads, cutting heads, and/or heads for various finishing methods such as burnishing, buffing, brushing, blasting, peening, texturing, nitriding, polishing, etching, coating, plating, thermal spray, cladding, hardening, cleaning, etc.), which may be chosen or swapped from the tool carousel. The machiner 1750 may enable in-situ machining, which may enable milling in regions of the part being printed which may otherwise be inaccessible once the part is completely printed. In-situ machining may also reduce the time, expense, or added challenges of transferring the printed article to a subtractive manufacturing machine for subsequent processing, which may involve the printed article to be fixtured thereto and programmed separately.

In some embodiments, the machiner 1750 may be coupled to a devoted end effector attached to a multi-axis robotic arm, which may incorporate active vibration compensation algorithms known as "input shaping" to achieve a high surface finish quality, tight dimensional tolerances, fast processing rates, or a combination thereof. This may be particularly useful when machining harder metal and ceramic based materials that are more susceptible to chatter, or to avoid use of larger, heavier, and more costly robotic arms to provide bulk mass dampening. In some embodiments, the machiner 1750 may be configured to communicate with a machiner controller, such as a computer. The machiner controller may allow shaping algorithms to be input to adjust machining parameters. The machiner controller may be configured to selectively communicate with the third sensors 1740, and, hence, may provide parameter adjustments to the machiner 1750. In some embodiments, machining parameter adjustments or measurements may be fully automatic, which may, for example, eliminate the need for manual adjustments to the machiner 1750.

In some embodiments, the end effector 1700 may include a mechanism to insert embedded sensors (e.g., MEMS) in the printed article or object during the deposition process. In some embodiments, the embedded sensor(s) may be Industrial Internet of Things (IoT) components capable of extracting real-time data. In some embodiments, one or more sensors may be configured to gather specified data and transfer that information through the communication network 180 to the CES tripartite digital twin. The information may then be aggregated with data from identical and/or related parts in service to perform simulation, AI analysis, and/or optimizations of performance, predictive maintenance, and/or a combination thereof. In some embodiments, one or more embedded sensors may be cladded or encapsulated within material to withstand the molten core-wire material(s) surrounding the one or more embedded sensors and maintain functionality. In some embodiments, the end effector 1700 may include a robotic armature (not shown), which may be configured to place one or more sensors at predefined locations. In some embodiments, the robotic armature may be communicatively coupled to the CMF to implant or otherwise embed the sensor(s) at predefined regions and/or predefined times in the feed material 1110 and/or the melt pool M during the deposition process. It can be appreciated that in some embodiments, the robotic armature may include a type of positioning device, however, in some embodiments, the end effector 1700 may include any suitable positioning mechanisms or devices capable of performing similar or substantially the same functions as described herein with respect to the robotic armature.

The nozzle 1760 may be operably coupled to the end effector 1700. For example, in some embodiments, the nozzle 1760 may be operably coupled to the chuck 1710, the nozzle 1760 configured to selectively deposit the melted portion of the feed material 1110 onto the substrate 190 to form the melt pool M. In some embodiments, the end effector 1700 may include a plurality of nozzles, each of which may be substantially similar to the nozzle 1760, thereby enabling deposition of a plurality of melt pools onto one or more substrates simultaneously. In some embodiments, an electrical current may be transmitted through the feed material 1110.

In some embodiments, the nozzle 1760 may include one or more heating element(s) (not shown) configured to raise a temperature of the nozzle 1760 (e.g., "heated nozzle," not shown) to melt or facilitate melting of certain feed material(s) 1110. In some embodiments, the energy source 1720 may not be employed and the nozzle 1760 may be utilized as an alternative to melt certain feed material. For example, the nozzle 1760 may be used to melt core-wires composed of a polymer filled core and/or a polymer sheath, which has a lower melting temperature than metals. In some embodiments, it may be advantageous to have the core 2112 in a molten state while the sheath 2114 remains solid, or vice versa. This may, for example, facilitate decoupling and separation of the molten core 2112 from the sheath 2114 prior or during deposition, or other purpose. To achieve this, the nozzle 1760 may be heated by the heating elements and used in tandem with the energy source 1720 to facilitate melting of the feed material 1110 or core-wire 2110. For example, in some embodiments, the heated nozzle (e.g., the nozzle 1760 after heating via the heating element(s)) may be used to selectively melt sections of the feed material 1110, or core-wire 2110, having lower melting temperatures (i.e., that become molten at the lower temperature), while the energy source 1720 energy (e.g., beam, arc, induction) may be employed to melt sections of the feed material 1110 or core-wire 2110 having higher melting temperatures.

In some embodiments, the nozzle 1760 may be a heated nozzle (not shown) including a heating element. In some embodiments, the heated nozzle is configured to selectively melt a material having a melting temperature that falls within an operating temperature range of the heated nozzle (e.g., for example, the operating temperature range of about 20° C. to about 500° C., inclusive). In some embodiments, the core 2112 formed from the first material has a first melting temperature, and the sheath 2114 formed from the second material has a second melting temperature. In some embodiments, the nozzle 1760 includes a heating element configured to heat the nozzle 1760 and/or to melt at least a portion of the first material or the second material. For example, in some embodiments, the second melting temperature may be lower than the first melting temperature (or vice versa), and the heated nozzle may be configured to selectively melt at least a portion of the second material (e.g., the sheath material) having the second melting temperature.

In some embodiments, at least one of the first material and/or the second material has a melting temperature that falls within the operating temperature range of the heated nozzle. For example, in some embodiments, the first melting temperature or the second melting temperature may fall within the operating temperature range of the heated nozzle, for example, to facilitate melting of the first material or the second material, respectively. In some embodiments, the heated nozzle is configured to co-heat the feed material 1110 with the energy source 1720 (e.g., the directed energy source). In some embodiments, the energy source 1720, i.e., the directed energy source, is configured to selectively melt the first material having the first melting temperature higher than the second melting temperature.

In some embodiments, the nozzle 1760 may include a magnetic material or a magnet, and hence may be referred to herein as "magnetic nozzle." In some embodiments, the magnetic nozzle may include one or more magnets, such as electromagnets, permanent magnets, or any combination thereof suitable to generate steady state, pulsed, or cascading magnetic fields, or any combination thereof. The magnetic nozzle may direct the speed, shape, and/or deposition of the feed material 1110 including magnetically responsive materials (e.g., ferromagnetic) in a molten, vaporized, sublimated, or ionized state. In some embodiments, the magnetic nozzle may provide refined flow control, residual stress management, and grain growth and/or orientation. In some embodiments, a constricting force generated by the magnetic nozzle may be used to separate the molten droplet from the feed material 1110 or the core-wire 2110, either exclusively or in combination with other methods. In some embodiments, the magnetic nozzle may be used to facilitate deposition of the feed material 1110 in reduced or micro-gravity environments (e.g., Earth orbit, Moon). In some embodiments, the magnetic nozzle may be used in tandem with a pulsed beam to control deposition without the support of gravity. In some embodiments, the nozzle 1760 (e.g., the magnetic nozzle) is configured to emit one or more magnetic fields. In some embodiments, a portion of the feed material 1110 includes molten feed material, and the one or more magnetic fields may be configured to interact with the molten feed material.

In some embodiments, one or more magnetic fields can be configured to direct the speed, shape, movement, and/or any combination thereof of the molten portion of feed material 1110 to manipulate the grain orientation or growth of the printed part. For example, one or more magnetic fields may be configured to compress the molten droplet into a thinner stream to enable higher resolution printing. In some embodiments, one or more magnetic fields may be configured to modify the solidification process, in turn affecting the nucleation and/or growth of grains within metals. In some embodiments, the solidification process may be dependent on the orientation and strength of the magnetic field, whereby modifications utilizing one or more magnetic fields may promote specific crystallographic orientations or grain structures within the printed part. In some embodiments, the magnetic field may be configured to distribute residual stresses within the printed material to reduce distortion and improve dimensional accuracy.

In some embodiments, the end effector 1700 may include the gas emitter 1770. In some embodiments, the gas emitter 1770 may be operably coupled to the end effector 1700. In some embodiments, the gas emitter 1770 may be configured to emit or communicate a gas proximate to the nozzle 1760, the substrate 190, the melt pool M, and/or the feed material 1110 just prior to or after deposition from the nozzle 1760. In some embodiments, the gas may be an inert gas (e.g., argon, nitrogen, etc.), or a mixture of inert gases, used to shield the deposition materials (e.g., the feed material 1110) from oxidation. In some embodiments, the gas may be one or more reactive gases or a mixture thereof. In some embodiments, the gas may be a carrier of functional particles designed to chemically react with the deposition materials or processes to form target species or modify metallurgical properties in the printed article or formed object. In some embodiments, the gas may react via temperature and be heated or cryogenically cooled (e.g., liquid nitrogen stored in a cylinder and released as a gas near the boiling point) to be emitted before, during or after deposition. In some embodiments, the gas may be contained within core-shell powders and released through a mechanism of the deposition process.

For example, in-situ cooling rate control of the core-wire deposition may reduce residual stresses and distortion, refine microstructure, enhance mechanical properties. reduce porosity, inhibit oxidation and contamination. improve interlayer bonding, and/or facilitate superior surface finish. Cryogenic cooling may be utilized to rapidly quench the deposited metal from the core-wire onto the substrate preventing the atoms from organizing into a crystalline structure, thus promoting the formation of an amorphous phase (e.g., to produce a metallic glass). As a post-processing step, cryogenic tempering may further relieve stresses, enhance wear resistance, and improve fatigue life by stabilizing the microstructure. In some embodiments, maintaining a directed flow of gas may be challenging, leading to potential quality issues (e.g., open-air environments). Therefore, in some embodiments, the emission of reactive or gas may be in the form of a vortex stream driven by a vortex generator, vortex cannon, ionic thruster, or other means, to direct gas or deposition material to the substrate. In some embodiments, the nozzle 1760 may be configured to emit one or more magnetic fields (e.g., include a magnetic nozzle) that may be configured to interact with an ionized gas emitted from the gas emitter 1770.

In some embodiments, the gas emitter 1770 may emit gas which may be ionized to form a plasma. In some embodiments, the gas may be ionized after emission by means of an ionizing radiation. In some embodiments, the gas emitted from the gas emitter 1770 may be an ionized gas. In some embodiments, the ionized gas may be used to interact with the deposition process and/or react with the depositing materials. In some embodiments, a confining magnetic field may be applied to the ionized gas, and/or the plasma, to support and/or direct an undisturbed flow of ionized gas. In some embodiments, a directed energy beam may be emitted from the end effector 1700 and directed through the gas or ionized gas causing a change in the refractive index of the gas and/or a medium. Without being bound by theory, the change in refractive index may cause the beam to focus or maintain its shape over a longer distance (i.e., reduce a divergence of the beam and/or maintain a diameter of the beam) due to the nonlinear Kerr effect. In some embodiments, the beam may possess sufficient energy to expel electrons along the beam path thereby creating a positively charged plasma channel, which may also serve to focus and guide the beam (i.e., a self-focusing effect).

For example, in some embodiments the gas emitter 1770 is operably coupled to the end effector 1700 and configured to emit a flow of gas. In some embodiments, the gas emitter 1770 may be configured to emit one or more functional gases configured to react with one or more of the core 2112 and/or the sheath 2114 for reaction synthesis of the core 2112 and/or the sheath 2114. In some embodiments, the gas emitter 1770 is configured to emit one or more ionized gases configured to react with the core 2112 and/or the sheath 2114. In some embodiments, the gas emitter 1770 is configured to emit the flow of gas in a form of a vortex (i.e., vortex flow of gas), for example, around a periphery of at least one of the core-wire 2110 (or the feed material 1110) or the melt pool M during deposition (e.g., around a molten portion of the core-wire 2110). In some embodiments, the vortex flow may be configured to inhibit external contaminants (e.g., dust) from entering the melt pool M. In some embodiments, the energy source 1720 is configured to generate a directed energy beam having a beam diameter and/or a beam shape at a focal distance. In some embodiments, the gas emitter 1770 is configured to emit one or more neutral or ionized particles configured to react with the directed energy beam to cause a change in a refractive index of the gas. In some embodiments, the refractive index change of the gas is configured to modify the beam diameter and/or the focal distance of the directed energy beam.

For example, in some embodiments, the gas emitter 1770 is configured to emit a neutral gas or an ionized gas, the neutral gas or the ionized gas configured to react with a directed energy beam to cause a change in a refractive index of the neutral gas or the ionized gas thereby causing the directed energy beam to focus or maintain a beam shape over a longer distance. In some embodiments, the beam diameter is a first beam diameter, and the refractive index change of the gas is configured to focus the directed energy beam by reducing the first beam diameter to a second beam diameter that is smaller than the first beam diameter. In some embodiments, the focal distance is a first focal distance, and the refractive index change of the gas is configured to maintain the beam shape and/or the beam diameter over a longer distance by, for example, increasing the first focal distance to a second focal distance greater than the first focal distance. In some embodiments, the gas emitter 1770 is configured to emit a neutral gas or an ionized gas, the neutral gas or the ionized gas configured to react with the directed energy beam to expel one or more electrons along a beam path of the directed energy beam and create a positively charged plasma channel configured to focuses and guides the directed energy beam.

In some embodiments, the end effector 1700 may include the exhaust 1780, (e.g., a vacuum exhaust system, may also be referred to as "vacuum exhaust system 1780" or "exhaust system 1780") configured to evacuate smoke, vaporized material, and other contaminants from the deposition zone. In some embodiments, the exhaust 1780 may work in conjunction with the gas flowing from the gas emitter(s) 1770 to form a low-pressure region and a high-pressure region (e.g., Bernoulli effect). For example, a conically shaped gas may be emitted from the gas emitter(s) 1770 and directed from the end effector 1700 to the substrate 190. While inside the conical region, the exhaust 1780 on the end effector 1700 may be configured to extract air out in a direction substantially opposite to the direction of gas. This may create a pressure differential between the inside and outside of the cone of gas, with the inside forming a partial vacuum (e.g., similar principle to venturi tubes or vacuum pumps). This partial vacuum environment may remove air molecules, dust particles, and/or other contaminants from the path of the directed energy beam to enable a reduction of attenuation and/or scattering of the directed energy beam.

In some embodiments, the exhaust 1780 may be operably coupled to the end effector 1700, and the exhaust 1780 may be configured to form a low-pressure region in the flow of gas emitted from the gas emitter 1770. In some embodiments, the flow of emitted gas is in the form of a cone surrounding the exhaust 1780 thereby forming a high-pressure region in the flow of gas emitted from the gas emitter, the high-pressure region having a higher pressure than the low-pressure region. In some embodiments, the high-pressure region and the low-pressure region form a suction flow to create a partial vacuum region proximate the path of the directed energy beam and/or proximate a deposition zone of the feed material 1110 (e.g., proximate the substrate 190). In some embodiments, the suction flow is configured to reduce an attenuation and/or a scattering of the directed energy beam by removing air molecules, dust particles, other contaminants, or a combination thereof proximate the directed energy beam or the deposition zone.

In some embodiments, the end effector 1700 may include the mister 1790 configured to spray (e.g., nebulize, aerosol, mist, or atomize) a liquid solution proximate the nozzle 1760, the feed material 1110, the melt pool M, the substrate 190, and/or a combination thereof. In some embodiments, the mister 1790 may be configured to spray a mist of the liquid solution, e.g., nanoparticle suspension, which may be nebulized, aerosolized, atomized, sprayed or misted (e.g., by a mesh atomizer or an ultrasonic mesh atomizer) onto the tip of the feed material 1110, or the core-wire 2110, undergoing deposition to intermix the particles with the molten droplets from the melted feed material 1110. In some embodiments, directed gas flow may be used to guide the molten droplets to the substrate and/or direct the vaporized products away from the deposition zone for removal. In some embodiments, the mister 1790 may be operably coupled to the end effector 1700. In some embodiments, the mister 1790 may be configured to emit a mist of a fluid containing a particulate for reaction or co-deposition with the feed material 1110. In some embodiments, the mister 1790 is configured to emit a mist in the form of a vortex. In some embodiments, the nozzle 1760 may emit one or more magnetic fields (e.g., the magnetic nozzle) configured to interact with a particulate mist emitted from a mister 1790.

In some embodiments, the system 100 may include the controller 170. The controller 170 may be configured to selectively communicate with the feed assembly 1000, the end effector 1700, any components thereof, or a combination thereof via the communication network 180. In some embodiments, the controller 170, or the system 100, may include a CMF system (control, monitoring, and feedback system) (not shown), the CMF system is connected via a fieldbus network and/or is configured to provide instructions to the additive manufacturing system 100, operate the various process parameters, such as selection of the feed material 1110, adjusting energy output from the energy source 1720, adjusting a toolpath, modifying deposition parameters, or the like. In some embodiments, the CMF may communicate with the first sensor 1220, the second sensor 1712, the third sensor 1740, to monitor various measurements from the various sensors and modifying process parameters in real-time. In some embodiments, the CMF coordinates the articulation and orientation of the robotic arm, with the toolpath for producing the printed object, and with the wire feed system to ensure proper operation of all systems working in unison.

In some embodiments, the CMF system may collect all data from the printer operation and printed article. In some embodiments, the system 100, or the controller 170, may include a computational engineering system (CES) configured to integrate all operations related to the additive manufacturing process, such as the feed material 1110 or core-wire 2110, parameters thereof (e.g., material composition, cross-sectional shape, thickness, etc.), the design of the part to be printed, the printing process and all parameters thereof, and/or manipulation of the printed article. In some embodiments, the CES may utilize algorithms to encode a specified part, material design process, manufacturing process, and field use data for entire classes of parts made with the core-wire additive printer. The core-wire 2110 and the system 100 may contribute to the code base of the CES algorithms for the design of future parts of the same type, such that a dynamic data repository is created to accelerate development cycles and optimize components over time.

In some embodiments, the CES may communicate with the CMF which may allow for the print instruction and configuration changes before, during, or after a print. For example, the AI/ML integrated CES may receive input from the CMF about an executed printed part, in which the input is fed back into a digital twin to optimize the process parameters (e.g., toolpath simulation, process plans, metallurgical and mechanical test performance, etc.) for subsequent prints of that component. In some embodiments, the CES may utilize a manufacturing aware generative design framework, such that multi-physics simulation predicts performance of the alloy applied to a specific part geometry and optimizes the shape, topology, and material layout based on material properties of the core-wire 2110. In some embodiments, the CES may access the network of connected industrial 'internet of things' (IIoT) to collect and return information from numerous distributed system inputs, thus mining values for parameterized data sets to build a comprehensive data set for deep learning analysis. In some embodiments, the CES may provide updates, upgrades, and/or optimizations of the various processes across the entire IIoT network. In some embodiments, the information exchange may occur in the background without requiring active user involvement and provides data aggregated from various sources in an anonymized and encrypted form.

In some embodiments, the CES utilizes artificial intelligence-based machine learning (AI/ML) and/or deep learning, generative design, surrogate modeling, digital twinning, and/or other computational engineering methods, to integrate and/or optimize all interrelated operations of the additive manufacturing process, including material design, feedstock design, part design, print process, finishing, and operational data acquired from part performance in the field. For example, the system 100 may include an AI/ML system configured to utilize models, simulations, and algorithms based on deep data parameter sets and constraints. The AI/ML system may generate optimized performance solutions for printed objects by integrating a variety of analytical and predictive frameworks, including but not limited to physics, data-driven and digital twin models (e.g., finite element analysis, machine learning, deep learning, manufacturing models), deep learning (e.g., quality, production, process AI), integrated computational materials engineering (ICME; e.g., process, structure, properties, performance), data systems (e.g., computed aided engineering, computer aided design, computer aided manufacturing), multi-dimensional decision making (e.g., sustainability, time, cost), and production feedback (e.g., additive/subtractive/finishing process parameters, component validation). For example, in some embodiments, a machine learning (or deep learning) model may be used to analyze composition of the core-wire 2110, process parameters, monitoring data, and print results (e.g., metallurgy, metrology) across a range of different components and material chemistries, where AI utilizes this information to optimize composition of the core-wire 2110 and/or print processes for a given set of performance parameters provided by a user.

In some embodiments, the CES may be configured to determine the composition of the core-wire 2110 and identify and/or modify process parameters to use for printing of the core-wire 2110. In some embodiments, the CES may be configured to store information (e.g., data) on process parameters (e.g., set of input and output parameters such as feed rate, annealing temperature, energy output, etc.), external conditions (e.g., atmospheric pressure, elevation, geography, temperature, humidity, etc.), print results and/or measurements of the article of manufacture and/or melt pool M (e.g., microstructural data, crystal structure, porosity, tomography, topography, spectroscopy measurements, etc.), and/or composition of the core-wire 2110. In some embodiments, the CES may be configured to use artificial intelligence (e.g., ML model, deep learning model) to analyze the information, identify modifications to process parameters to optimize print results for that set of conditions, and predict a set of optimal process parameters for future additive manufacturing runs, based on corresponding information. In some embodiments, the ai model may be referred to as "outcome intelligence engine."

In some embodiments, the outcome intelligence engine may be configured to use adaptive parameter control based on in-situ sensor feedback (e.g., via sensors 1220, 1712, 1740). In some embodiments, the sensors 1220, 1712, 1740 may be configured to perform operations such as hyperspectral imaging, Raman spectroscopy, laser-induced breakdown spectroscopy (LIBS), and/or tomography of the article of manufacture during and/or after the additive manufacturing process, receive information based on one or more of the operations, and communicate the information to the outcome intelligence engine. Subsequently, in some embodiments, the outcome intelligence engine may be configured to receive the communicated information and use AI (e.g., ML, deep learning) to analyze the information, train the AI model, (e.g., ML model, deep learning model), store the information, analysis, and/or training data, modify one or more process parameters based on the analyzed information (e.g., to modify a parameter of the article of manufacture and/or melt pool M while printing), and/or predict optimal process parameters based on a set of input conditions and/or composition of the core-wire 2110. In such embodiments, the outcome intelligence engine may be configured to collect, store, and use process data to predict and/or tune outcomes, for example, to generate a digital fingerprint of core-wire and/or melt pool M parameters, train the AI (e.g., ML, deep learning) models, and apply control to ensure part-to-part consistency across additive manufacturing runs. Without being bound by theory, in such a manner, the outcome intelligence engine may be configured to build and store a fingerprint of multi-physics & microstructural data from every material conditioning run and part build, which may enable continuous refinement of material properties, process parameters, and part performance. Thus, the outcome intelligence engine may enable the system 100 to perform intelligent manufacturing, enabling reproducible, certifiable results across machines, sites, and/or geographies.

In some embodiments, the controller 170 may include a processor, a memory, and an input/output (I/O) interface (not shown). The processor may be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory (e.g., Random Access Memory (RAM), Read-Only Memory (ROM), Non-volatile RAM (NVRAM), Flash Memory, hard disk storage, etc.) stores data (e.g., operating parameter data) and/or computer code (e.g., operating parameter filtering or processing algorithms, etc.) for facilitating at least some of the various processes described herein. The memory may include tangible, non-transient volatile memory, or non-volatile memory. The memory may include a non-transitory processor readable medium having stores programming logic that, when executed by the processor, controls the operations of the controller. In some arrangements, the processor and the memory form various processing circuits described with respect to the controller 170.

The I/O interface may be structured for sending and receiving data (e.g., over a communication network) from the controller 170. Accordingly, the I/O interface can include any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

In some embodiments, the controller 170 may be configured to employ and/or communicate with the CES and/or outcome intelligence engine, as described herein. In other words, in some embodiments, the controller 170 may be configured to use AI, machine learning, and/or deep learning to receive information on process parameters, print conditions, part performance, and/or other parameters, and use the received information to modify one or more process parameters. In some embodiments, the controller 170 may be configured to receive information and modify process parameters before, during (e.g., on-the-fly), and/or after the system 100 performs one or more printing operations. In some embodiments, the CES and/or outcome intelligence engine may be configured to use the controller 170 to modify one or more parameters of the system 100. All such variations are envisioned herein and should be considered as part of the present disclosure.

The communication network 180 is any suitable Local Area Network (LAN) or Wide Area Network (WAN). For example, the communication network 180 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 180 is structured to permit the exchange of data, values, instructions, messages, and the like between the controller 170, and the feed assembly 1000 and/or the end effector 1700.

In some embodiments, the controller 170 may be configured to communicate with the system 100 and selectively adjust one or more system parameters via the communication network 180. In some embodiments, the controller 170 is configured to selectively store the one or more system parameters as a system configuration. In some embodiments, the system 100 and/or the controller 170 is configured to selectively recall the system configuration. In some embodiments, the system 100 includes an external database (not shown) configured to communicate with the controller 170 and/or the system 100 via the communication network 180. In some embodiments, the external database is configured to selectively store the one or more system parameters as one or more system configurations and/or selectively provide the one or more system configurations to the controller 170, the system 100, the feed assembly 1000, the end effector 1700, any component thereof, and/or a combination thereof. In some embodiments, the controller 170 is configured to receive the one or more system configurations from the external database and selectively alter the one or more system parameters to generate a second system configuration.

In some embodiments, the system 100 includes a mechanism and an associated closed loop feedback control configured to perform automatic adjustments to at least one of applied thermal forces, electromagnetic forces, frictional forces, bending forces, torsional forces, segmenting forces, straightening forces, or a combination thereof to at least one of convey, heat, bend, twist, segment, straighten the feed material 1110, or a combination thereof, to facilitate processing of various types of feed materials, for example, feed materials having a variety of diameters, compositions, and/or mechanical properties. In some embodiments, the system 100 may further include a test segment of the feed material 1110, the test segment configured to be fed through the feed assembly 1000 and coupled to a test run cycle with closed loop feedback control to auto configure and validate a successful performance of the test segment through the feed assembly 1000 or the system 100.

In some embodiments, the system 100 may include an optimization algorithm configured to perform automatic feed assembly configuration adjustments in response to the performance of the test segment fed through the feed assembly 1000 or the system 100. In some embodiments, the test segment of the feed material 1110 is configured to be sent through the feed assembly 1000 repeatedly to verify the corrections have been successful, and the optimization algorithm is configured to make further refining corrective adjustments.

In some embodiments, the system 100 may include a data log (and/or a data logger) configured to log data and/or store feed assembly configuration adjustments for every feed material specification that is conveyed through the system 100. In some embodiments, the system 100 may include a machine learning algorithm configured to analyze the data log of one or more prior feed assembly configurations and/or an associated feed material specification and/or predict an optimized feed assembly configuration for a future feed material that has not yet been used in the feed assembly 1000 and/or the system 100. In some embodiments, the system 100 is networked with external databases and configured to share and/or obtain one or more feed assembly-material configurations and/or optimizations determined by other feed assemblies. In some embodiments, the system 100 includes an input shaping control algorithm configured to reduce vibrations in at least one of the feed assembly 1000 or the end effector 1700.

For example, in some embodiments, the controller 170 may be operably or otherwise communicably coupled to at least one of the feed assembly 1000 or the end effector 1700 (or any suitable components thereof). In some embodiments, the controller 170 may be configured to use an input shaping algorithm, method, or protocol configured to modify (e.g., damp, reduce, nullify, cancel) vibrations in the feed assembly 1000 and/or the end effector 1700 (or any suitable components thereof). In some embodiments, the input shaping algorithm, method, or protocol may be configured to actively modify vibrations in the feed assembly 1000 or the end effector 1700. For example, in some embodiments, the system 100 may include piezoelectric transmitters or other vibration sources in communication with the controller 170 configured to employ input shaping algorithms, the controller 170 instruct the piezoelectric transmitters or other vibration sources to vibrate at a predetermined frequency, amplitude, or phase to damp, reduce, cancel, or otherwise nullify unwanted vibrations in the feed assembly 1000 and/or the end effector 1700. In some embodiments, the feed assembly 1000 and/or the end effector 1700 may be acoustically coupled to a vibration damping material (e.g., platform formed of rubber or other vibration damping materials) configured to damp, reduce, or mitigate transmission of vibrations within the feed assembly 1000 and/or end effector 1700 and/or therebetween. All such variations are envisioned herein and should be considered as part of the present disclosure.

In some embodiments the system 100 may include an inspection apparatus configured to inspect the feed material 1110 before or during processing, or the printed article during or after deposition. For example, the inspection apparatus may be configured to inspect the feed material 1110 prior to selection of the feed material 1110 and entry of the feed material into the feed assembly 1000 for process. This may help detect defects in the feed material 1110, such as faults, voids, imperfections, or impurities in the feed material 1110, and may help avoid defects in the printed article which may have resulted from defects in the feed material 1110, thereby improving throughput or consistency of the printing process or properties of the printed article. In some embodiments, the inspection apparatus may be included in the feed assembly 1000 allowing for selective removal of feed material 1110 containing defects as it is fed through the feed assembly 1000, and replacement with other defect-free feed material without interrupting the manufacturing process.

In some embodiments, passive and/or active control features may be used by the system 100 to manipulate acoustic and mechanical waves (i.e., vibrations) by, for example, using input shaping control algorithms, metamaterial structures, resonators, actuators, transducers, engineered materials and fluids. For example, in some embodiments, the system 100 may include an input shaping control algorithm configured to reduce vibrations in the feed assembly 1000 and/or the end effector 1700. In some embodiments, passive and/or active control features may be included throughout the system 100 and/or any suitable component thereof (e.g., the feed material source 1100, the feed assembly 1000, the drive assembly 1200, the annealer 1300, the bender 1400, the straightener 1500, the segmenter 1600, the end effector 1700, the chuck 1710, the energy source 1720, the heat source 1730, the sensor(s) 1220, 1712, 1740, the machiner 1750, the nozzle 1760, the gas emitter(s) 1770, the controller 170, and/or a surface, build plate, or a multi-axis positioning platform or build plate that the substrate 190 is disposed on). This may be beneficial for most if not all the components given vibrations may travel throughout the system 100.

In some embodiments, the inspection apparatus may be configured to inspect the feed material 1110 before or during selection and/or processing in the feed assembly 1000, as well as inspect the printed article during or after deposition. In some embodiments, the inspection apparatus may be configured to utilize imaging (e.g., sonography, interferometric, visible spectrum, IR, UV, x-ray, neutron, electrical impedance tomography, etc.) to inspect the quality of the feed material 1110, the core-wire 2110, the first material (e.g., material of the core 2112), the second material (e.g., material of the sheath 2114), or a combination thereof, thereby enabling for identification of defects in the ingredients and prevention of defect propagation in the printed article (e.g., avoiding unwanted voids in the feed material 1110 or the printed article). In some embodiments, the system 100 may include a plurality of inspection apparatuses that may be disposed throughout the system 100 and configured to inspect and/or measure a variety of pre-print, post-print, or real time print parameters (e.g., layer thickness, surface profile and topography, thermal distortion, crack and inclusion defects, anomalies, alignment and registration, etc.). For example, the plurality of inspection apparatuses may be disposed proximate the feed material source 1100, the feed assembly 1000, the end effector 1700, the melt pool M, the substrate 190, or a combination thereof. In some embodiments, the inspection apparatus may include post-print metallurgical testing, inspection, and analysis of the printed article through testing of, for example, physical, mechanical, or chemical properties. Such tests may be fed into the controller 170, such as the CMF or the CES, to optimize feed material selection and process parameters.

In some embodiments, the substrate 190 is configured to accept the melt pool M, for example, by receiving the molten feed material from the nozzle 1760 or serving as a platform on which the melt pool M can be deposited and on which a desired component can be printed or built. The substrate 190 may be formed of any material configured to receive the molten feed material, allowing for the molten feed to solidify and fuse with various other layers of the molten feed material, thereby allowing for multiple layers to build up and form a desired shape of the printed object, part, or component. In some embodiments, the printed article or part may be formed though successive layers of material deposition. In some embodiments, the molten feed material may fuse with the substrate, or previous layers of at least partially solidified feed material, to build up the desired shape. In some embodiments, the core material(s) may be configured to enter the melt pool M in an unmelted state to enhance dispersion and preserve functional properties (e.g., oxide nanopowders). In some embodiments, the melt pool M can be heated by a global or directed energy source (e.g., the energy source 1720) before, during, or after the deposition process to modify the solidification phase and metallurgical properties. In some embodiments, the substrate 190 may be located perpendicular to a direction of travel of the molten feed material.

In some embodiments, the substrate 190 may be positioned on a multi-axis build plate configured to enable tilting, rotation, or shifting of the multi-axis build plate or substrate in multiple directions. In some embodiments, the multi-axis build plate may be configured to communicate with the end effector 1700 to reduce or remove the need for printing supports. In some embodiments, the build plate may be heated to a desired temperature, which may improve the properties of the printed layers on the substrate 190. In some embodiments, the multi-axis build plate may be equipped with a piezoelectric actuator and/or transducer to selectively induce vibrations during the print process, which may enable improved microstructure control, mechanical properties, or overall quality in the printed article, component, object, or part (e.g., reduce porosity, reduce residual stresses, promote grain refinement, enhance mechanical performance, or a combination thereof). The multi-axis build plate having the transducer may, for example, enable improvements in material properties of the printed article, deposition efficiency during processing, and may contribute to the manufacturing and production of high-performance metal components suitable for demanding applications in aerospace, automotive, or other industries. In some embodiments, the multi-axis build plate may include a piezo controller configured to synchronize the vibrations with the deposition process, allowing for precise control over the frequency and amplitude of the vibrations to achieve desired effects.

In some embodiments the system 100 may include a movement system (not shown) or support system (not shown). In some embodiments, the system 100 may include a gantry system (not shown) configured to enable selective movement (e.g., translation, rotation, etc.), support, and/or selective manipulation of the feed assembly 1000, the end effector 1700, and/or one or more components of the feed assembly 1000 and/or the end effector 1700. In some embodiments, the gantry system may include one or more of a boom, a moveable column (e.g., a moveable/structural support column), a robotic arm (e.g., a multi-axis robotic industrial arm), one or more rails and/or rail systems thereof, a telescoping or articulating boom or crane, a positioning platform, any other suitable apparatus or assembly configured to provide structural support, extension, conveyance and/or articulation of the feed material 1110 to the end effector 1700 to perform manufacturing operations, and/or a combination thereof.

In some embodiments, the gantry system may enable one or more of the feed assembly 1000, the end effector 1700, and/or one or more components of the feed assembly 1000 and/or the end effector 1700, to move or translate in various directions, such as X, Y, or Z directions, and/or horizontal, vertical, or diagonal directions (e.g., allow 6-degrees freedom of motion). In some embodiments, the gantry system may be modular such that it may be expanded via additional rails, robotic arms, and/or supporting structures in either vertical or horizontal directions. In some embodiments, the gantry system may be operably coupled to the feed assembly, the end effector, or a combination thereof, the gantry system including at least one of boom, a structural support column, a robotic arm, or a combination thereof, the gantry system configured to provide extension conveyance and articulation of the feed material to the end effector.

In some embodiments, the feed assembly 1000, or any component thereof (e.g., the feed material source 1100, the drive assembly 1200, the annealer 1300, the bender 1400, the straightener 1500, the segmenter 1600, and/or a combination thereof), may be operably coupled to the gantry system, or the gantry system may be included in the feed assembly 1000, and/or coupled to one or more of the components thereof. In some embodiments, the gantry system may be configured to enable the feed assembly 1000 and/or components thereof to move or translate in various directions, such as X, Y, or Z directions, and/or horizontal, vertical, or diagonal directions (e.g., allow 6-degrees freedom of motion). In some embodiments, the feed assembly 1000 may be operably coupled to the gantry system, or any other support system, for example, a telescoping or articulating boom or crane. In some embodiments, the feed assembly 1000 may be operably coupled to the gantry system, such as coupled to the boom, the structural support column, the robotic arm, or any other assembly providing structural support, extension, conveyance and articulation of the feed material 1110 to the end effector 1700 to perform manufacturing operations.

In some embodiments, for example, to accommodate a build envelope of very large-scale components or articles, the end effector 1700, or any component thereof (e.g., the chuck 1710, the second sensor 1712, the energy source 1720, the heat source 1730, the third sensor 1740, the machiner 1750, the nozzle 1760, the gas emitter 1770, the exhaust 1780, the mister 1790, and/or a combination thereof), may be operably coupled to the gantry system, or the gantry system may be operably incorporated in the end effector 1700 and/or coupled to one or more of the components thereof. In some embodiments, the end effector 1700 may be disposed on a moveable column (e.g., the structural support column) and/or a robotic arm which may be further mounted to one or more rails on a gantry system, or a telescoping or articulating boom or crane configured to allow the end effector 1700 to move or translate in various directions, such as X, Y, or Z directions, and/or horizontal, vertical, or diagonal directions (e.g., allow 6-degrees freedom of motion).

In some embodiments, the end effector 1700 may be mounted to a multi-axis robotic industrial arm (e.g., the multi, the end effector 1700 housing one or more of the chuck 1710, the energy source 1720, the heat source 1730 the third sensor 1740, the machiner 1750, the nozzle 1760, the gas emitter 1770, the exhaust 1780, the mister 1790, other suitable instruments and tools, or a combination thereof). In some embodiments, the end effector 1700 may be coupled directly to the gantry system or the telescoping or articulating boom or crane. In some embodiments, the feed assembly 1000 may be integrated into the gantry system of the end effector 1700, i.e., incorporated into the boom, the support column, the robotic arm, or any other type of structure that provides structural support, conveyance, and/or articulation of the end effector 1700, to perform manufacturing operations. In some embodiments, the feed assembly 1000 may be operably coupled to the end effector 1700. In some embodiments, the feed assembly 1000 may be operably coupled to the end effector 1700 via the gantry system.

In some embodiments, there may be a plurality of gantry systems, each of which may be substantially similar to the gantry system as described above. The plurality of gantry systems may include one or more movable columns, supporting structures, robotic arms, positioning platforms, and/or various combinations thereof, which may be used to facilitate the printing, machining, surface treatment, finishing, cleaning, and/or metrology of the printed article. For example, in some embodiments, the plurality of gantry systems may include a first gantry system and a second gantry system, the feed assembly 1000, or any component thereof, may be operably coupled to the first gantry system, and the end effector 1700, or any component thereof, may be operably coupled to the second gantry system. In some embodiments, there may be a plurality of gantry systems, such as a gantry system for one or more of the components of the feed assembly 1000 and/or the end effector 1700.

In some embodiments, the system 100 may include an environmentally controlled enclosure (not shown) configured to enable temperature control, atmospheric filtration, pressure control, evacuation capabilities, and/or a combination thereof.

In some embodiments, the feed assembly 1000, the end effector 1700, or any component thereof, may be placed in the environmentally controlled enclosure with temperature control, atmospheric filtration and evacuation capabilities. In some embodiments, the enclosure can be placed under vacuum or alternatively, filled with gas to react with the feed material 1110 or core-wire 2110 and/or process or shield reactive feed materials 1110 from atmospheric oxidation during annealing and/or transport from the feed material source 1100 to the end effector 1700. In some embodiments, the enclosure may protect operators from potential hazards during the manufacturing process.

In some embodiments, the system 100, may include a mechanism and/or an associated closed loop feedback control for performing one or more automatic adjustments to one or more parameters of the feed assembly 1000, the end effector 1700, or any component thereof, to enable adjustments of one or more of an applied thermal force, an electromagnetic force, a frictional force, a bending force, a torsional force, a segmenting force, a straightening force, or a combination thereof. In some embodiments, the adjustments may enable the system 100 to convey, heat, bend, twist, segment, and/or straighten a wide variety of feed materials 1110 having a variety of diameters, compositions, and/or mechanical properties.

In some embodiments, the system 100, such as the feed assembly 1000 or the end effector 1700, may be configured to employ a test configuration cycle (also referred to as "test-autocorrect cycle") configured to run a sufficient segment of feed material 1110 (e.g., a "test segment") through the feed assembly 1000 as a test segment of feed material 1110 to ensure proper conveyance of the feed material 1110 through the additive manufacturing system 100. This test and configuration process may be performed once per type of feed material 1110 and prior to the first print with the feed material 1110, a mechanism and an associated closed loop feedback control for performing feed assembly configuration adjustments to a parameter of the system 100, the feed assembly 1000, or any component thereof (i.e., parameters may be one or more of an applied thermal force, an electromagnetic force, a frictional force, a bending force, a torsional force, a segmenting force, a straightening force, and/or a combination thereof) may be used. Such a mechanism or feedback control may be manual or automatic and may be configured to perform adjustments by adjusting conveying, heating, bending, twisting, segmenting, straightening, or a combination thereof, the feed material 1110 through the system 100 or the feed assembly 1000.

For example, the feed assembly 1000 or feed material source 1100, may include a test segment of feed material 1110, the test segment may be configured to be fed through the feed assembly 1000 and coupled to a test run cycle with closed loop feedback control to auto-configure and validate a performance (e.g., conveyance, bending, twisting, heating, segmenting, straightening and/or a combination thereof) of the test segment of the feed material 1110 through the feed assembly 1000. In some embodiments, the test segment of the feed material 4110 may be ejected from a print head or nozzle (e.g., the nozzle 1760) without any deposition process taking place. In some embodiments, the test segment of the feed material 1110 may also be reversed through the system 100 and/or the feed assembly 1000 to eject the test segment from an initial entry point in the feed assembly 1000 (e.g., the drive assembly 1200). Based on the performance of the test segment of the feed material 1110 through the additive manufacturing system 100, a software system may make automatic feed assembly configuration adjustments (e.g., automatic adjustments or corrective adjustments) to one or more parameters of the feed assembly 1000 or any component thereof (e.g., adjustments to bending, twisting, heat, roller force, etc.). In some embodiments, the automatic adjustments (e.g., the feed assembly configuration adjustments) may be corrections (i.e., "corrective adjustments") to one or more parameters of the feed assembly 1000.

In some embodiments, a fresh test segments of the feed material 1110 may be sent through the system 100 or the feed assembly 1000 to verify that the automatic adjustments and/or corrections have been successful and/or make further corrective adjustments. In some embodiments, test segments of feed material 1110 may be sent through the feed assembly 1000 repeatedly to verify the corrections have been successful, make further refining corrective adjustments if needed, and/or a combination thereof. In some embodiments, this "test-autocorrect cycle" may be utilized multiple times until all feed through parameters have reached an optimized state. For example, in some embodiments, the test segment of the feed material 1110 may be configured to be sent through the feed assembly 1000 repeatedly to verify the corrective adjustments have been successful, and the optimization algorithm may be configured to make further refining corrective adjustments. In some embodiments, a plurality of test segments of the feed material 1110 may be used and configured to be sent through the feed assembly 1000 successively and/or repeatedly to verify the corrections have been successful and/or enable further refining corrective adjustments.

In some embodiments, the system 100 may include an optimization algorithm configured to perform automatic feed assembly configuration adjustments in response to the performance of the test segment fed through the feed assembly. In some embodiments, the test segment of the feed material 1110 is configured to be sent through the feed assembly 1000 repeatedly to verify the corrections have been successful, and the optimization algorithm is configured to make further refining corrective adjustments. In some embodiments, the system 100 includes a data log configured to store feed assembly configuration adjustments (such as previous feed assembly configurations and/or previous configuration adjustments) for one or more feed material 1110 type or specification that is conveyed through the system 100. In some embodiments, the system 100 includes a machine learning algorithm configured to analyze the data log of one or more prior feed assembly configurations and/or an associated feed material specification and/or predict an optimized feed assembly configuration for a new or future feed material that has not yet been used or processed in or through the feed assembly 1000. In some embodiments, the system 100 may be configured to communicate with, and/or be networked to, one or more external database(s) (e.g., via the controller 170 and/or the communication network 180) and configured to share and obtain one or more feed assembly-material configurations and/or optimizations determined by other systems or feed assemblies.

Figure 4:
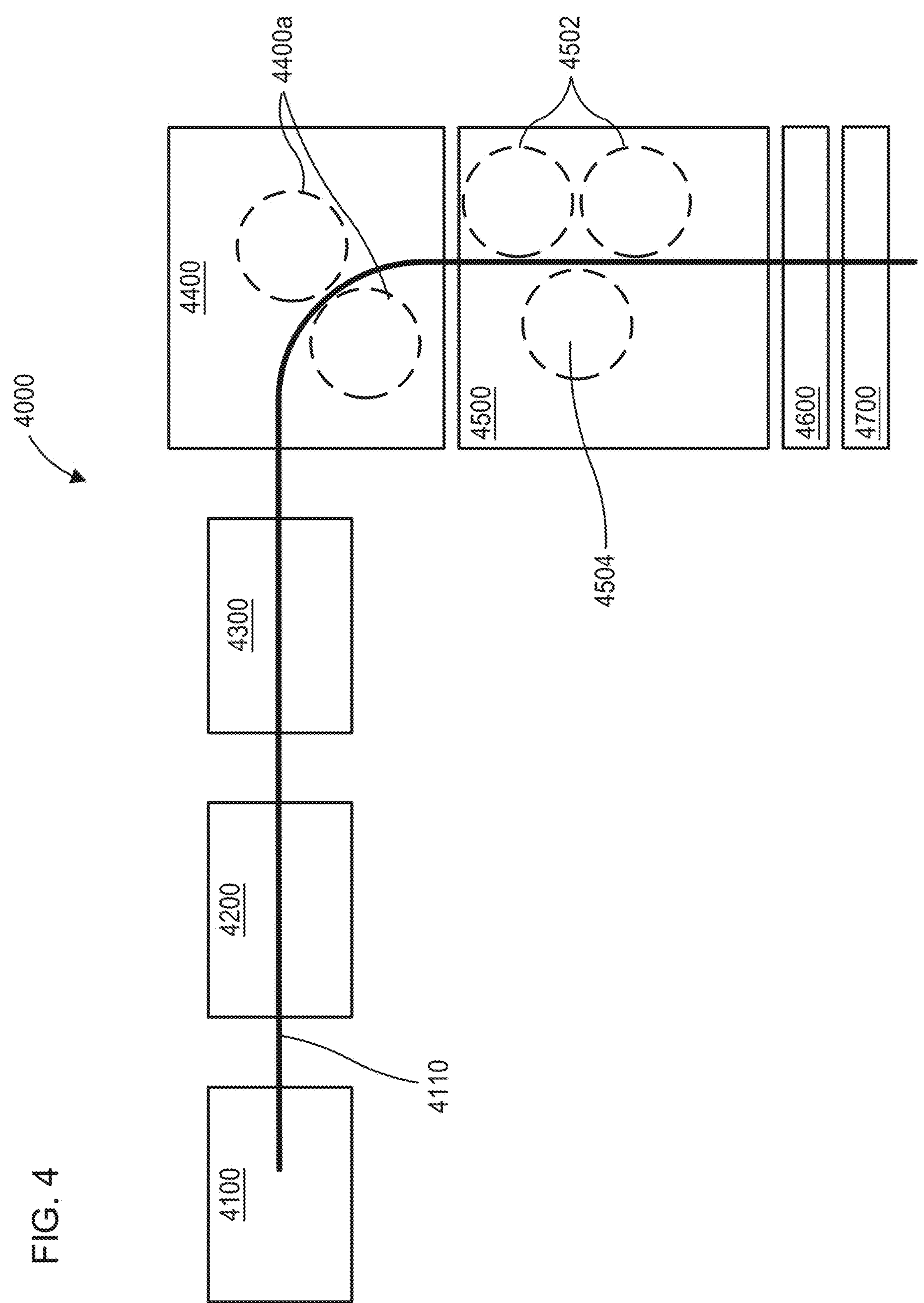
FIG. 4 is a schematic illustration of a feed assembly, according to an embodiment.

FIG. 4 is a schematic illustration of a feed assembly 4000 including a feed material source 4100, a feed material 4110, a drive assembly 4200, an annealer 4300, a bender 4400 having bender rollers 4400*a*, a straightener 4500 having straightener rollers 4502 and 4504, a segmenter 4600, and an end effector 4700, according to an embodiment.

In some embodiments, the feed assembly 4000, as shown in FIG. 4, and all components therein, may be substantially similar to the feed assembly 1000 and may include all the features and/or components thereof as previously described with respect to FIG. 1. In some embodiments, the feed material source 4100 may be configured to feed a feed material 4110 (e.g., the core-wire 2110) through the components of the feed assembly 4000. The feed material source 4100 may include the spool 3120*a* as previously described with respect to FIG. 3A-3B, or the magazine 3120*b* as previously described with respect to the FIG. 3C-3D, or any other feed material source described herein. For example, in some embodiments, the feed material source 4100 may be substantially similar to the feed material source 1100, the spool 3120*a*, or the magazine 3120*b* as previously described with respect to FIG. 1A, FIG. 1B, FIG. 3A, FIG. 3B, FIG. 3C, or FIG. 3D, respectively, and may include all of the features and components as previously described with respect to FIG. 1, FIG. 3A-3D. The feed material 4110 may include a solid wire or a core-wire, for example, the core-wire 2110 or any other suitable material, as described herein. In some embodiments, the annealer 4300, the bender 4400, the straightener 4500, the segmenter 4600, and the end effector 4700 may be substantially similar to the annealer 1300, the bender 1400, the straightener 1500, the segmenter 1600, and the end effector 1700. Thus, certain features of these components are not described in further detail herein.

In some embodiments, the system 100, the feed assembly 4000, and/or the end effector 4700 may be configured to automatically adjust to accommodate various feed materials (e.g., feed material 1110, 4110), wires, or core-wires (e.g., core-wire 2110) of different cross-sectional dimensions and cross-sectional compositions. In some embodiments, a coupling mechanism utilized by the feed assembly 4000 and/or drive assembly 4200 to convey the feed material 4110 may be configured to selectively modify the distance (e.g., decrease or increase) between a first coupling surface and a second coupling surface such that the first coupling surface and the second coupling surface may close around the feed material 4110 and circumferentially apply pressure around the feed material 4110 to successfully convey the feed material 4110. In some embodiments, the system 100, the feed assembly 4000, and/or the end effector 4700 may also perform dynamic adjustments to the coupling mechanisms to accommodate for dimensional variances in the wire.

In some embodiments, the bender 4400 may include the bender rollers 4400*a*. In some embodiments, the bender rollers 4400*a* may be configured to selectively bend the feed material 4110 to enable travel of the feed material 4110 or communicate the feed material 4110 to the end effector 4700. The bender rollers 4400*a* may include a modularized series of rollers (e.g., the magazine) as previously referred to with respect to FIG. 1. In some embodiments, the bender rollers 4400*a* may be made of ceramic (e.g., cemented carbide), metal, elastomeric materials, or any suitable combination thereof to handle the range of temperatures imparted to the feedstock, cyclic temperature loading, abrasive feed material surfaces, chemical compatibility, and other wear features and parameters, over a prolonged period of use.

In some embodiments, the bender rollers 4400*a* may be combined with electric actuators and servomechanisms (e.g., servo motors) which may receive the feed material 4110 after heating via the annealer 4300 and may bend the heated feed material 4110 where necessary to travel into the end effector 4700 of the 3D printing system including the feed assembly 4000. The position of the bender rollers 4400*a* may be adjustable to receive and feed wires or the feed material 4110 of different widths (gauges) ranging from about 0.5 mm to about 75.0 mm, inclusive while compensating for heat expansion of the feed material 4110 from the annealing process. The adjustment of the bender rollers 4400*a* may be performed by software-controlled actuators. The bender rollers 4400*a* may be heated to maintain the heat of the feed material 4110 before or during bending. In some embodiments, the bender rollers 4400*a* may include a roller diameter. In some embodiments, the roller diameter may be fixed, or in some embodiments, the roller diameter may be configured to selectively expand, contract, or displace, such as via mechanical, pneumatic, or hydraulic means, or in some embodiments, the rollers 4400*a* may be configured to move inward or outward in relation to the feed material 4110, to selectively adjust contact with the feed material 4110.

In some embodiments, the rollers 4400*a* may be configured to automatically adjust to accommodate various feed materials (e.g., feed material 1110, 4110), wires, or core-wires (e.g., core-wire 2110) of different cross-sectional dimensions and cross-sectional compositions. In some embodiments, a coupling mechanism utilized by rollers 4400*a* to convey the feed material 4110 may be configured to selectively modify the distance (e.g., decrease or increase) between a first coupling roller surface and a second coupling roller surface such that the first coupling roller surface and the second coupling roller surface may close around the feed material 4110 and circumferentially apply force around the feed material 4110 to successfully convey the feed material 4110. In some embodiments, the rollers 4400*a* may also perform dynamic adjustments to the coupling mechanisms to accommodate for dimensional variances in the wire. In some embodiments, structured light scanning or other methods, individually or combined, may be employed to continuously measure the cross-sectional dimensions of the feed material 4110 along at least a portion of the length of the feed material 1110 (may, for example, be an entire length of the feed material 4110 disposed in the feed assembly 4000 and/or end effector 1700) during conveyance through the feed assembly 4000. In some embodiments, these data may be aggregated with build process monitoring data to enable forecasting of any impacts to the feed process, the deposition process and printed article.

In some embodiments, the feed assembly 4000 may employ a test configuration cycle that will run a sufficient segment of feed material 4110 through the feed assembly 4000 as a test segment of feed material 4110 to ensure proper conveyance of the feed material 4110 through the additive manufacturing system, e.g., the system 100. This test and configuration process may be performed once per type of feed material 4110 and prior to the first print with said feed material 4110. a mechanism and an associated closed loop feedback control for performing automatic feed assembly configuration adjustments to at least one of applied thermal forces, electromagnetic forces, frictional forces, bending forces, torsional forces, segmenting forces, straightening forces, or a combination thereof to at least one of convey, heat, bend, twist, segment, straighten, or a combination thereof the feed material 4110 having a variety of diameters, compositions, and mechanical properties.

For example, the feed assembly 4000 or feed material source 4100, may include a test segment of feed material 4110, the test segment configured to be fed through the feed assembly 4000 and coupled to a test run cycle with closed loop feedback control to auto configure and validate the successful performance (e.g., conveyance, bending, twisting, heating, segmenting, straightening and/or a combination thereof) of the test segment of the feed material 4110 through the feed assembly 4000. In some embodiments, the test segment of the feed material 4110 may be ejected from a print head or nozzle (such as the nozzle 1760) without any deposition process taking place. In some embodiments, the test segment of the feed material 4110 may also be reversed through the system, e.g., the system 100, to eject from the initial entry point in the feed assembly 4000 (e.g., the drive assembly 4200). Based on the performance of the test segment of the feed material 4110 through the additive manufacturing system, e.g., the system 100, a software system may make automatic feed assembly configuration adjustments (e.g., automatic adjustments or corrective adjustments) to one or more parameters of the feed assembly 4000 or any component thereof (e.g., adjustments to bending, twisting, heat, roller force, etc.). In some embodiments, the automatic adjustments may be corrections to one or more parameters of the feed assembly 4000.

In some embodiments, fresh test segments of the feed material 4110 may be sent through the system again to verify the automatic adjustments and/or corrections have been successful or make further corrective adjustments. In some embodiments, test segments of feed material 4110 may be sent through the feed assembly 4000 repeatedly to verify the corrections have been successful, make further refining corrective adjustments if needed, and/or a combination thereof. This test-autocorrect cycle may be utilized multiple times until all feed through parameters have reached an optimized state. For example, in some embodiments, the test segment of the feed material 4110 may be configured to be sent through the feed assembly 4000 repeatedly to verify the corrections have been successful, and the optimization algorithm may be configured to make further refining corrective adjustments. In some embodiments, a plurality of test segments of the feed material 4110 may be used, the plurality of test segments configured to be sent through the feed assembly 4000 successively and/or repeatedly to verify the corrections have been successful and/or enable further refining corrective adjustments.

In some embodiments, the bender rollers 4400*a* may include two rollers as shown in FIG. 4. In some embodiments, a plurality of bender rollers 4400*a* may be incorporated to facilitate selective bending of feed material 4110, such as three rollers, four rollers, five rollers, six rollers, or more, each of which may have their own roller diameter which may be the same as or different from the other diameters. The plurality of bender rollers 4400*a* may, for example, include primary bender rollers configured to selectively bend the feed material 4110 and secondary bender rollers configured to guide the feed material 4110 along a certain path or trajectory to the end effector 4700.

Figure 5:
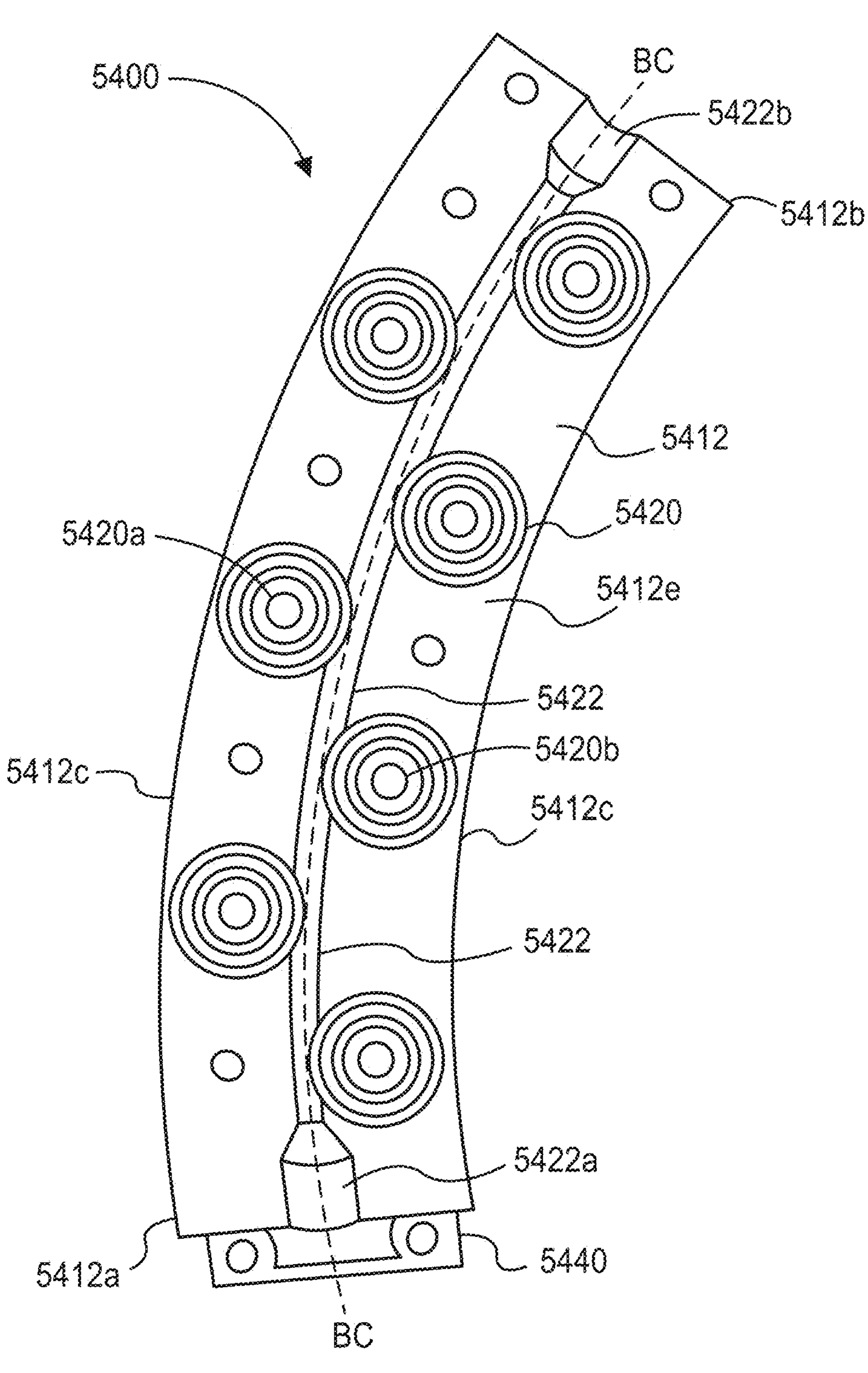
FIG. 5 is a schematic illustration of a bender, according to an embodiment.

In some embodiments, the bender 4400 may include a flexible wire-guide bending apparatus for guiding and changing the direction of the feed material 4110 or wire as the feed material 4110 moves through an inner passageway defined in a housing or casing and rollers in the housing adjacent the inner passageway to facilitate transport of the feed material 4110 through the passageway. For example, FIG. 5 depicts a flexible wire-guide bending apparatus 5400 configured to selectively bend the feed material (not shown) along a centerline BC. The flexible wire-guide apparatus 5400 may include a housing 5412 having an inner passageway 5422 defined therein with rollers 5420 mounted in the housing 5412 adjacent the inner passageway 5422.

In some embodiments, the flexible wire-guide bending apparatus 5400 may include the housing 5412 having a first end 5412*a* and a second end 5412*b* with an inner side 5412*c* and an outer side 5412*d* extending therebetween and a top surface 5412*e* and bottom surface 5412*f* (not shown) extending between the ends 5412*a* and 5412*b* and the sides 5412*c* and 5412*d*. In some embodiments, the housing 5412 may be a first housing and may be configured to selectively attach to a second housing configured to mirror the first housing and operably attach thereto. In some embodiments, the flexible bending apparatus may include the inner passageway 5422 extending between the ends 5412*a* and 5412*b* of the housing 5412 spaced between the inner and outer sides 5412*c* and 5412*d*.

In some embodiments, the inner passageway 5422 may be located substantially through the longitudinal center BC of the housing 5412. In some embodiments, the longitudinal center BC of the housing 5412 may be the longitudinal center of the inner passageway 5422. In some embodiments, the inner passageway 5422 may be evenly spaced between the sides 5412*c* and 5412*d* of the housing 5412 along a length of the housing 5412 between the ends 5412*a* and 5412*b* of the housing 5412 such that the longitudinal shape of the inner passageway 5422 is substantially similar to the longitudinal shape of the housing 5412 between the ends 5412*a* and 5412*b*. In some embodiments, the inner passageway 5422 may include openings 5422*a* and 5422*b* leading therein which may be located at each end 5412*a* and 5412*b* of the housing 5412 and in communication with and lead into the inner passageway 5422.

In some embodiments, the inner passageway 5422 may have a circular cross section. In some embodiments, the inner passageway 5422 may have a cross sectional shape substantially similar to the cross-sectional shape of the feed material. In some embodiments, the size of the inner passageway 5422 may be selected based on the size or diameter of the feed material. However, it is understood that the inner passageway 5422 may have a variety of shapes and sizes. In some embodiments, the ends of the inner passageway 5422 may be adjacent the ends 5412*a* and 5412*b* of the housing 5412 forming the openings 5422*a* and 5422*b* into the inner passageway 5422. In some embodiments, the openings 5422*a* and 5422*b* may have a size greater than the size of the remainder of the inner passageway 5422 so as to enable easier feeding of the feed material through the inner passageway 5422. In embodiments where the inner passageway 5422 has a cylindrical shape, the diameter of the openings 5422*a* and 5422*b* to the inner passageway 5422 may be greater than the diameter of the remainder of the inner passageway 5422. In some embodiments, the flexible wire-guide apparatus 5400 may have at least one roller 5420*a* positioned between the first side of the housing 5412 and the inner passageway 5422 along a length of the inner passageway 5422 between the ends 5412*a* and 5412*b* of the housing 5412 and at least one roller 5420*b* positioned between the second side of the housing 5412 and the inner passageway 5422 such that the rollers are on opposite sides of the inner passageway 5422.

Various examples of the flexible wire-guide bending apparatus 5400 may found in U.S. Pat. No. 9,751,715, issued Sep. 5, 2017, and entitled "Wire guide module and system," and in U.S. Pat. No. 10,500,670, issued Dec. 10, 2019, and entitled "Flexible wire guide system," the entire disclosures of which are herein incorporated by reference.

Figure 6:
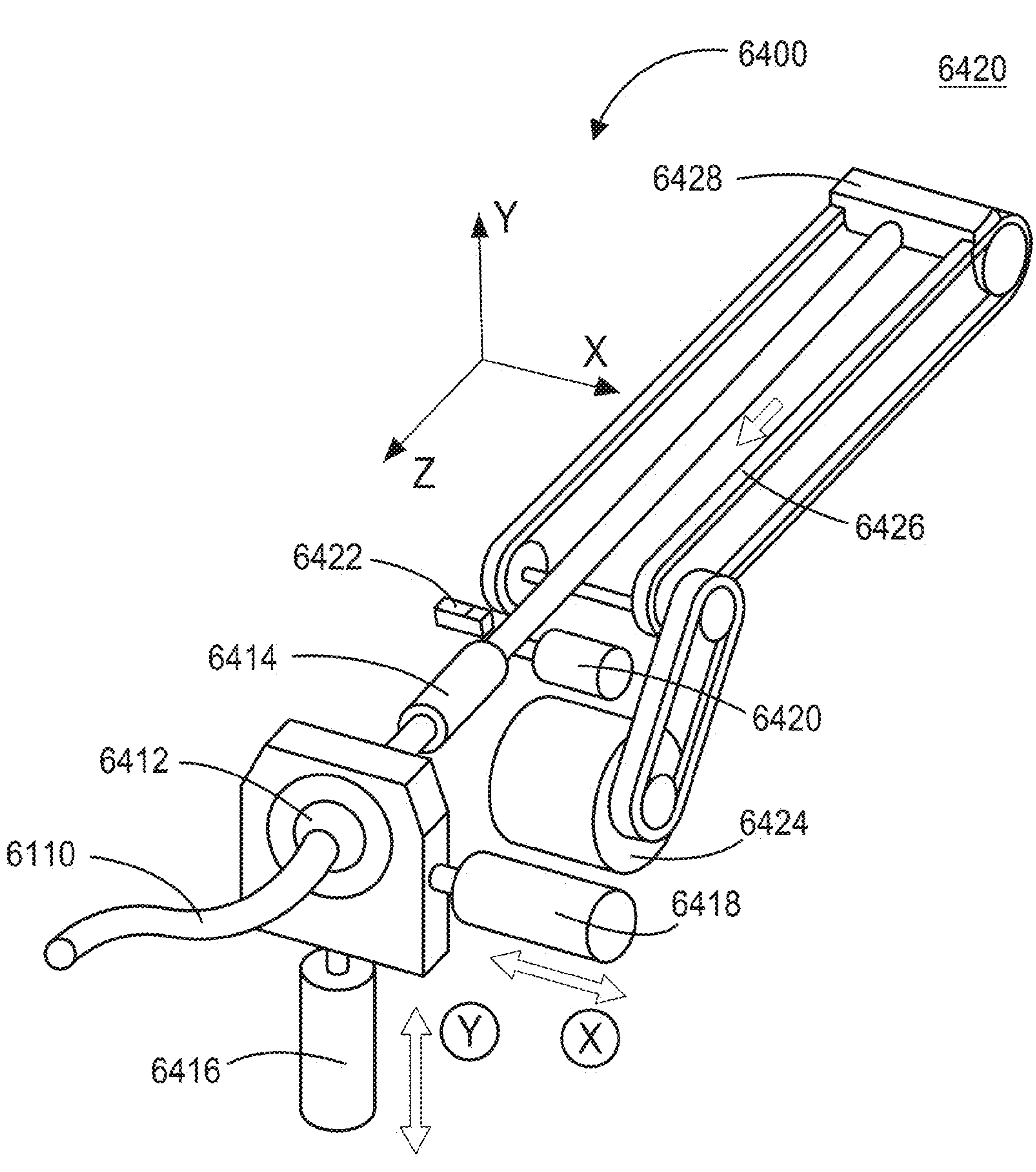
FIG. 6 is a schematic illustration of a free-form bender, according to an embodiment.

FIG. 6 is a schematic illustration of a free-form bender 6400, which may be incorporated as the bender 1400 in the feed assembly 1000, as previously described in FIG. 1B, or the bender 4400, as previously described in FIG. 4, according to some embodiments. In some embodiments, the free-form bender 6400 may include a bending die 6412 defining a channel and configured to selectively bend a feed material 6110 to a bending radius such that when the feed material 6110 is fed through the bending die 6412, the feed material 6110 bends along the length of the channel to emerge from the channel in a different direction from the one it entered the channel in. In some embodiments, the bending die 6412 includes an inner diameter configured to receive the feed material 6110. In some embodiments, the inner diameter may be configured to selectively expand or contract to enable receival of feed material 6110 of a variety of diameters. In some embodiments, a guide cylinder 6414 may be incorporated prior to and/or after the bending die 6412 to guide the feed material 6110 through the bending die 6412, or through the free-form bender 6400, and facilitate bending of the feed material 6110. Materials for the bending die 6412 and/or the guide cylinder 6414 should be selected that withstand a bending force applied thereto during bending and/or resist abrasion from continued movement of the feed material 6110 during a prolonged period of operation. Moreover, the bending die 6412 and/or the guide cylinder 6414 may include other features configured to resist wear over a prolonged period of operation. In some embodiments, the bending die 6412 or the guide cylinder 6414 may include, or may be formed of metal, ceramic, polymer, composites, any other suitable material, or any suitable combination thereof. For example, the bending die 6412 or the guide cylinder 6414 may be formed of cemented carbide, stainless steel, or a combination thereof.

The bender 6400 may be configured to receive any suitable feed material 6110, for example, a solid wire, or the core-wire 2110, as previously described. In some embodiments, the free-form bender 6400 may be configured to reposition the bending die 6412 or the guide cylinder 6414 in the X-axis or the Y-axis, each perpendicular to a direction of travel of the feed material 6110 in the Z-axis. For example, in some embodiments, the free-form bender 6400 may include an X-axis position adjustor 6416 and/or a Y-axis position adjustor 6418 operably coupled thereto to facilitate selective positional adjustment of the bending die 6412 or the guide cylinder 6414 to allow for selective bending of the feed material 6110 to a desired radius. In some embodiments, the X-axis position adjustor 6416 or the Y-axis position adjustor 6418 may include a motor operably coupled thereto, such as one or more AC servo motors, to allow for automized control of the positioning of the bending die 6412 or the guide cylinder 6414.

In some embodiments, the free-form bender 6400 may include an encoder 6420 configured to measure a forward length of the feed material 6110 in the Z-axis (i.e., the direction of travel of the feed material 6110). In some embodiments, the encoder 6420 may be a rotary encoder, an optical encoder, a digital potentiometer, any other suitable device for determining a length of travel of the feed material 6110 in the Z-axis, or a combination thereof.

In some embodiments, the free-form bender 6400 may include a switch 6422 configured to allow selective operation of the free-form bender 6400. For example, the switch 6422 may include an "on" mode and an "off" mode. In the "on" mode, the switch 6422 may be configured to activate the free-form bender 6400 and allow for selective bending of the feed material 6110. In the "off" mode, the switch 6422 may be configured to place the free-form bender 6400 in a passive-mode thereby allowing the feed material 6110 to pass through the free-form bender 6400 without bending or in a fixed bending position (i.e., bending the passing feed material 6110 to a fixed radius). In some embodiments, the switch 6422 may be a sensor configured to activate as the feed material 6110 enters the free-form bender 6400.

In some embodiments, the free-form bender 6400 may include an operation motor 6424 operably coupled to a chain 6426 and/or plate 6428, the combination thereof configured to communicate the feed material 6110 through the bending die 6412 or the guide cylinder 6414 and into a remainder of an additive manufacturing system, for example, the system 100 as previously described with respect to FIG. 1. In some embodiments, the free-form bender 6400 may be operably connected to a drive assembly (e.g., the drive assembly 1200 or 4200) configured to communicate the feed material 6110 through the system 600, such as the drive assembly 1200 as described with respect to FIG. 1. In embodiments where the free-form bender 6400 is connected to the drive, the free-form bender 6400 may exclude the operation motor 6424, the chain 6426, and/or the plate 6428.

In some embodiments, the free-form bender 6400 may include a sensor (e.g., a digital photoelectric sensor) and/or a controller configured to selectively connect with a network to enable for selective automatized or remote adjustments of a parameter of the free-form bender 6400. In some embodiments, the controller may be the controller 170, as previously described with respect to FIG. 1, and the network may be the network 180, as previously described with respect to FIG. 1. In some embodiments, the sensor, the controller, and/or the network may enable selective remote adjustments to the X-axis position adjustor 6416 and/or the Y-axis position adjustor 6418, thereby enabling for remote adjustments of the bending radius of the feed material 6110. In some embodiments, the sensor, the controller, and/or the network may enable selective automatized adjustments the diameter of the die 6412 thereby enabling entry of feed materials 6110 of a variety of diameters or materials.

Figure 7:
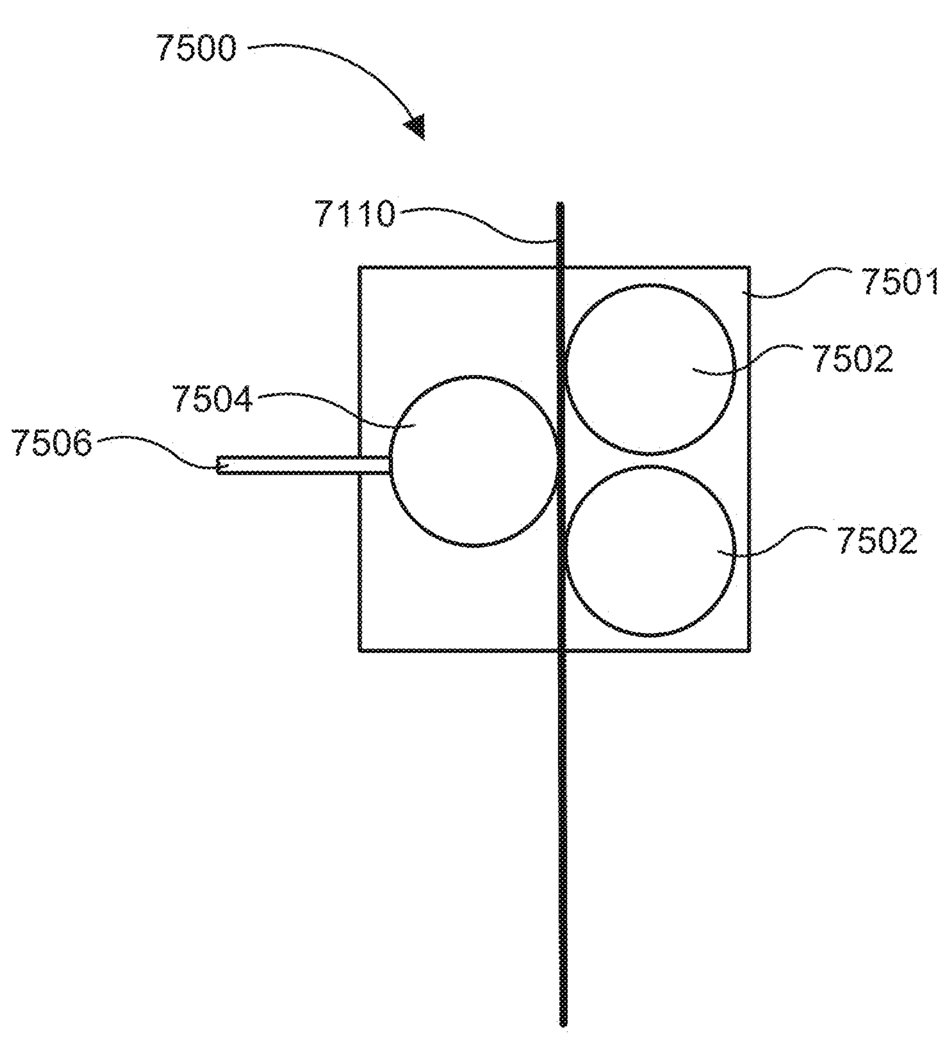
FIG. 7 is a schematic illustration of a straightener, according to an embodiment.

FIG. 7 is a schematic illustration of a straightener 7500 configured to selectively straighten a feed material 7110 traveling therethrough, according to an embodiment. The feed material 7110 may include a solid wire or a core-wire (e.g., the core-wire 2110), or any other suitable feed material. In some embodiments, the straightener 7500 may include a first roller 7502 disposed proximate to a first side of the feed material 7110 and a second roller 7504 disposed proximate to a second side of the feed material 7110 opposite the first side. In some embodiments, the first roller 7502 and/or the second roller 7504 may include a single roller or a plurality of rollers. In some embodiments, the first roller 7502 and the second roller 7504 may each define an internal tangent line parallel to a direction of travel of the feed material 7110, the internal tangent lines having a distance therebetween defining a channel with a channel width through which the feed material 7110 may travel. In some embodiments, the channel width may be selectively adjusted to receive feed material 7110 of a variety of sizes or materials. For example, in some embodiments, the straightener 7500 may include a knob 7506 configured to selectively adjust the channel width to accommodate feed material 7110 of various diameters or sizes.

In some embodiments, the straightener 7500 may be used as the straightener 1500 in the system 100, or the straightener 4500, as previously described with respect to FIG. 4, the descriptions of which are hereby incorporated herein. In some embodiments, the straightener 7500 may be utilized in conjunction with the bender 1400, as previously described with respect to FIG. 1, and/or the bender 4400, as previously described with respect to FIG. 4. For example, the straightener 7500 may be used after any of the benders 7400 (not shown) described herein to facilitate selective straightening or dispensing of any of the feed material 7510 embodiments described herein. In some embodiments, the straightener 7500 may be disposed immediately after a feed material source in a direction of travel of the feed wire, to enable straightening of the feed material 7110 traveling from the feed material source 7100 (not shown).

Various examples of the straightener 1500, 4500, and/or 7500 may be found described in US Publication No. 2008/0156925, published Jul. 3, 2008, and entitled "Wire Dispensing System," the entire disclosure of which is incorporated herein by reference.

FIG. 8 is a schematic flow chart of a method 8800 for additive manufacturing using an additive manufacturing system, for example, the additive manufacturing system 100, according to an embodiment. While described with respect to the system 100, this is for illustrative purposes only, and the operations of the method 8800 are equally applicable to any additive manufacturing system or feed assembly described herein.

The method 8000 includes receiving the feed material 1110 in the drive assembly 1200 from the feed material source 1100, at 8002. For example, the feed material 1110 may be selectively communicated from the feed material source 1100 to the drive assembly 1200 in selective intervals or continuously, such as a continuous flow of feed material 1110.

At 8004, the feed material 1110 may be selectively communicated to the annealer 1300 via the drive assembly 1200. For example, the drive assembly 1200 may transmit the feed material 1110 to the annealer 1300. At 8006, the annealer 1300 may selectively anneal (i.e., heat) the feed material 1110 to the annealing temperature. This may, for example, increase the malleability or ductility of the feed material 1110 and enable selective bending or straightening of the feed material 1110, as previously described.

At 8008, the feed material 1110 may be bent via the bender 1400. At 8010, the feed material 1110 may be straightened via the straightener 1500. At 8012, the feed material 1110 may be selectively segmented and/or crimped via the segmenter 1600. In some embodiments, at 8012 the segmenter 1600 may provide one or more flex points to the feed material 1110. In some embodiments, feed material 1110 may be heated via the annealer 1300 prior to, during, or after any of operations 8008, 8010, or 8012 to facilitate selective bending, straightening, segmenting, or crimping of the feed material 1110. In some embodiments, each of operations 8008, 8010, and 8012 may be performed successively. In some embodiments, each of operations 8008, 8010, and 8012 may be performed in any consecutive order. In some embodiments, one or more of operations 8808, 8810, or 8812 may be performed. In some embodiments, each of operations 8008, 8010, or 8012 may be performed multiple times. In some embodiments, each of operations 8008, 8010, or 8012 may be excluded from the method 8000.

At 8014, the feed material 1110 is communicated to the end effector 1700 via the drive assembly 1200. At 8016, the feed material 1110 may be heated in the end effector 1700 via the heat source 1730 to facilitate manipulation of the feed material 1110 in the end effector 1700. At 8018, at least a portion of the feed material 1110 is melted via the energy source 1720 of the end effector 1700. The energy source 1720 may be a directed energy source, such as a laser, configured to melt at least a portion of the feed material 1110. At 8020, the melted feed material 1110 is disposed onto the substrate 190 via the nozzle 1760 to form the melt pool M.

FIG. 9A-9D are schematic illustrations of a system 9000 configured to transmit a current C in a core-wire 9110 to generate a pinch force PF configured to facilitate deposition of the core-wire 9110 (e.g., a core of a core-wire that includes a sacrificial sheath, as described herein), according to an embodiment. FIGS. 9A-9D display a portion of the end effector 9700 (also referred to as "deposition head"), which includes a nozzle 9760 configured to communicate the core-wire 9110 towards a substrate 9190 and/or a melt pool M, which is on a surface of the substrate 9190. In some embodiments, the system 9000 may include a power source PS and an electrical ground G. In some embodiments, the end effector 9700 may be configured to direct a shielding gas envelope 9772 around the core-wire 9110 during deposition. Additionally, in some embodiments, the end effector 9700 may be configured to communicate exhausted gas 9774 away from the melt pool M.

Figures 9A, 9B:
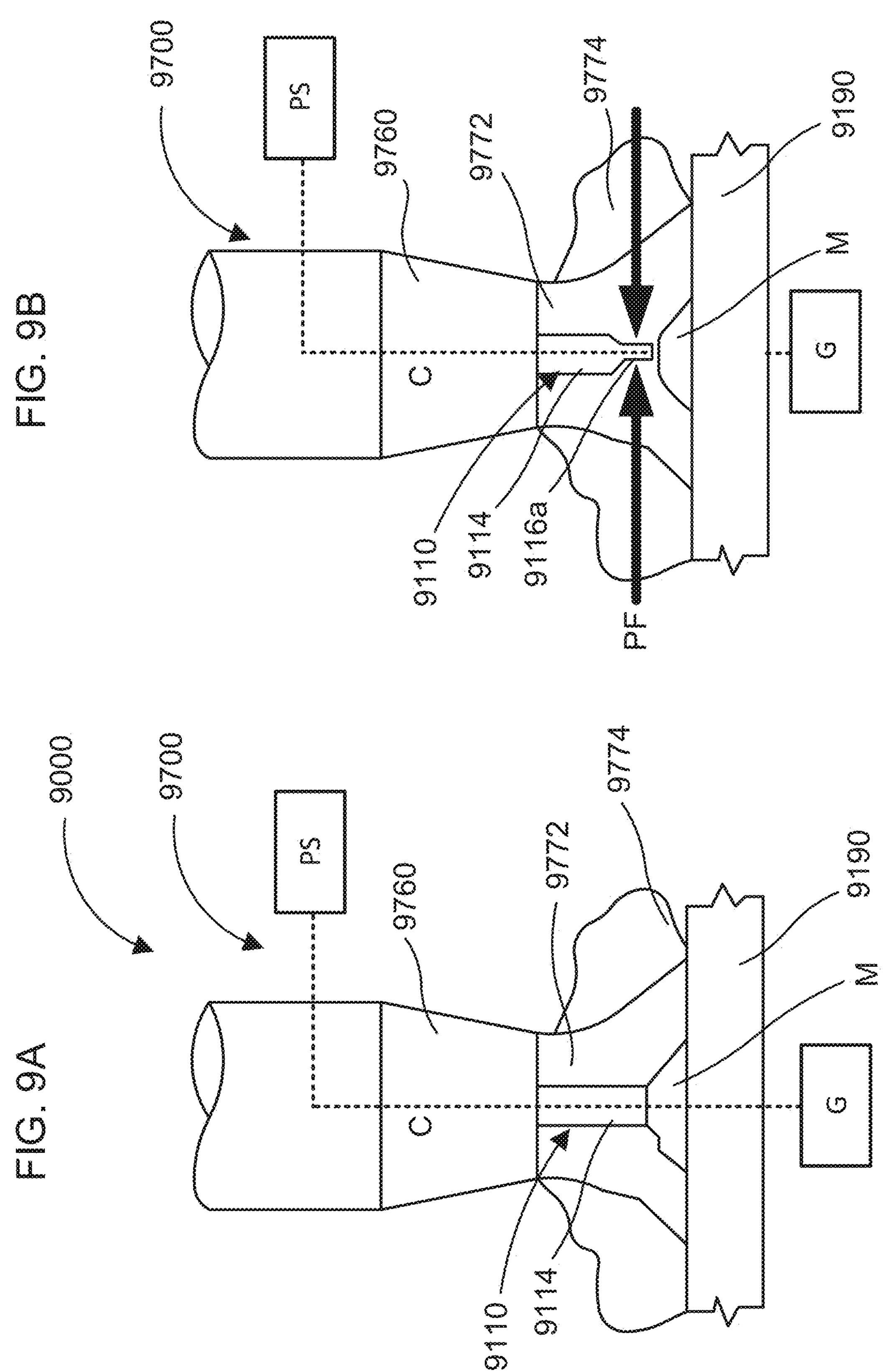
FIGS. 9A-D are schematic illustrations of a feed material during deposition from a nozzle onto a substrate, according to various embodiments.
Figures 9C, 9D:
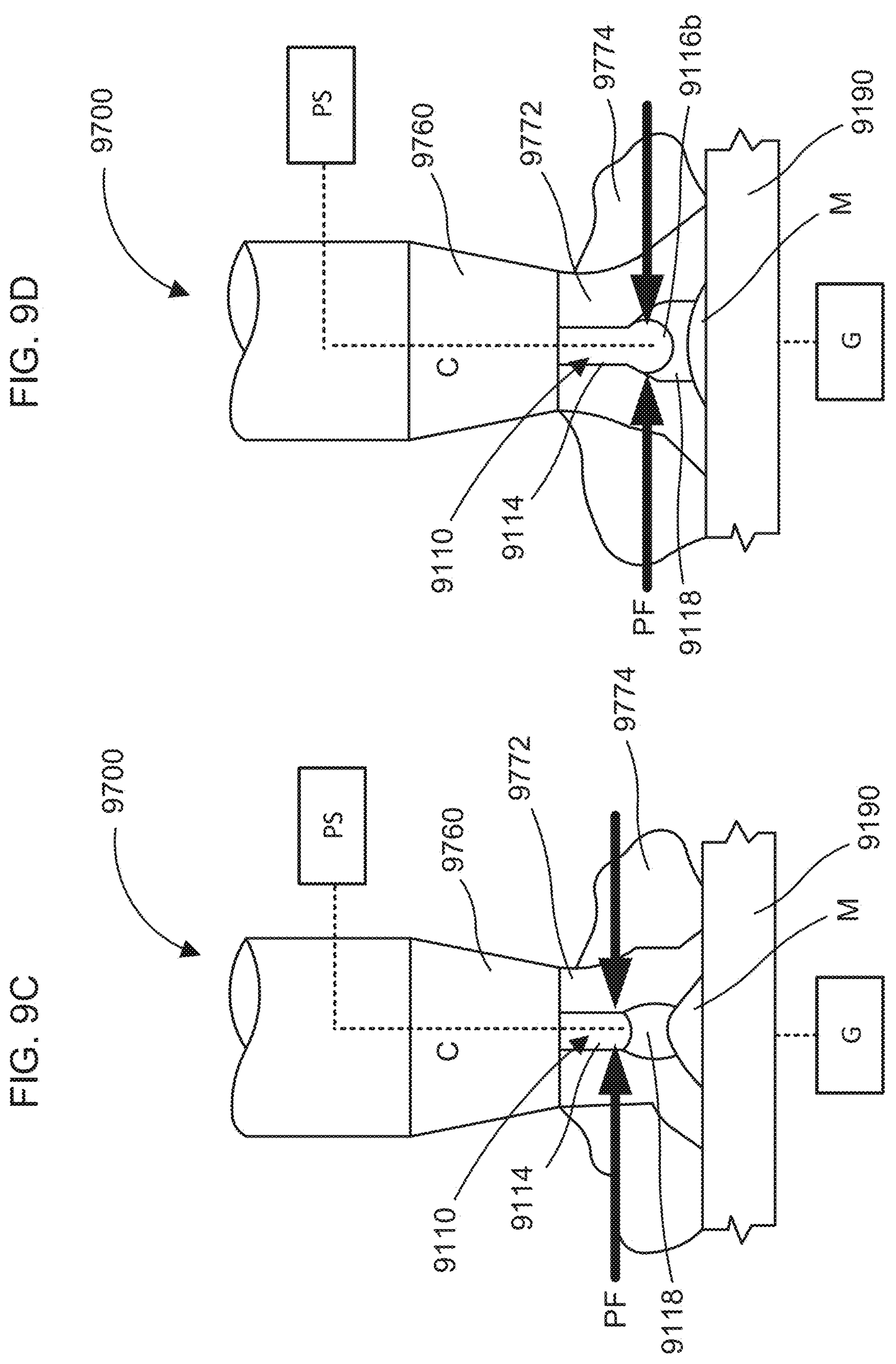

While not shown, in some embodiments, instead of and/or in addition to the shielding gas envelope 9772, the system 900 may be configured to direct a functional gas around the core-wire 9110 during deposition, and the functional gas may be configured to modify one or more parameters of the core-wire 9110 and/or the deposition process. Furthermore, as shown in FIGS. 9B-9D, in some embodiments, the system 9000 may be configured to form and/or deposit molten droplets 9116*a*, 9116*b* (collectively referred to herein as "molten droplets 9116" and/or "droplets 9116"). In some embodiments, the system 9000 may include a melt deposition region and/or melt zone, which may correspond to a region including a portion on the core-wire 9110 exposed to energy for heating and/or melting, a top surface of the substrate 9190, and all features therebetween (e.g., melt pool M).

In some embodiments, the core-wire 9110 may be similar to or substantially the same as the feed material 1110 as described herein with respect to FIG. 1 and/or the core-wire 2110 as described herein with respect to FIG. 2. Hence, in some embodiments, the core-wire 9110 may include any suitable materials and/or features as described with respect to the feed material 1110 and/or core-wire 2110. However, in some embodiments, the core-wire 9110 as shown in FIGS. 9A-9D (collectively referred to herein as "FIG. 9") may be electrically conductive (e.g., including or formed substantially of a conductive material, such as metal) to facilitate conduction of electrical energy (e.g., current C) therethrough and generation of the pinch force PF. For example, in some embodiments, the core-wire 9110 may include a sheath 9114 and/or a core (not shown) disposed therewithin including a conductive material. In some embodiments, the sheath 9114 may be similar to or substantially the same as the sheath 2114 as described herein with respect to FIG. 2. Likewise, in some embodiments, the core may be substantially the same as the core 2112 as described with respect to FIG. 2. Yet, in some embodiments, the sheath 9114 and/or the core may be formed of an electrically conductive material (e.g., metal).

In some embodiments, the end effector 9700, nozzle 9760, and the substrate 9190 may be similar to or substantially the same as the end effector 1700, the nozzle 1760, and/or the substrate 190 as described herein with respect to FIG. 1. Hence, while not shown in FIGS. 9A-9D, the end effector 9700 may include any components (e.g., chuck 1710, second sensor(s) 1712 energy source 1720, heat source 1730, third sensor(s) 1740, machiner 1750, gas emitter 1770, exhaust 1780, and/or mister 1790) and/or any features as described herein with respect to the end effector 1700 of FIG. 1. For example, in some embodiments, the shielding gas envelope 9772 may be generated by gas emitters (not shown) and exhausts (not shown) in the end effector 9700, each of which may be similar to or substantially the same as the gas emitters 1770 and/or the exhausts 1780 as described herein with respect to FIG. 1. Likewise, the nozzle 9760 and/or the substrate 9190 may include any features of the nozzle 1760 and/or substrate 190 as described herein with respect to FIG. 1. Accordingly, certain features of the end effector 9700, the nozzle 9760, and/or the substrate 9190 are not described in further detail herein.

However, the substrate 9190 in particular may be electrically coupled to the electrical ground G such that the current C flows to the electrical ground G (e.g., upon generation of an electric arc between the core-wire 9110 and the substrate 9190 and/or upon physical and/or electrical contact therebetween). In some embodiments, the substrate 9190 may be electrically conductive and configured to communicate the current C therethrough to the electrical ground G (e.g., the substrate 9190 may be grounded). In some embodiments, the substrate 9190 may be disposed on a platform or base formed of an electrically insulating material to inhibit transfer of charge between the substrate 9190 and other objects and/or operators in close proximity.

In some embodiments, the power source PS may include any suitable power sources configured to generate and/or direct electrical energy (e.g., voltage, current) to the substrate 9190, the melt pool M, the core-wire 9110, and/or the nozzle 9760. In some embodiments, the power source PS may be electrically coupled to one or more components of the system 9000 and configured to communicate electrical energy (e.g., voltage, current) thereto and/or therethrough. For example, in some embodiments, the power source PS may be electrically coupled to at least one of the end effector 9700 (e.g., nozzle 9760) and/or core-wire 9110 and configured to communicate electrical energy (e.g., voltage, current) thereto and/or therethrough. In some embodiments, power source PS may be electrically coupled to the core-wire 9110 and configured to transmit the current C therein and/or along a length thereof.

In some embodiments, the current C may generate the pinch force PF in the core-wire 9110. In some embodiments, the pinch force PF may facilitate deposition of molten droplets 9116 (also referred to as "molten portions") of the core-wire 9110 onto the substrate 9190 and/or into the melt pool M. Without being bound by theory, the current C may be configured to flow through the core-wire 9110 and the molten droplet **9116*a* of the core-wire 9110. In some embodiments, the current C generates a magnetic field around the molten droplets 9116, and a Lorentz force that acts inwardly on the molten droplet 9116*a*. In some embodiments, the Lorentz force acting inwardly on the molten droplet 9116*a* may be referred to herein as the "pinch force PF." In some embodiments, the pinch force PF may act to compress at least a portion of the molten droplet 9116*a* such that a neck (also referred to as "bridge") forms between the molten droplet 9116*a* and the axial end of the core-wire 9110. Furthermore, over time and/or as the pinch force PF increases, the neck may narrow, and, consequently, the molten droplet 9116*a* may detach from the core-wire 9110. In other words, the pinch force PF may facilitate pinching of the molten feed material molten droplet 9116*a* formed at the axial end of the core-wire 9110 to facilitate separation of the molten droplet 9116*a* from the core-wire 9110. In such a manner, the pinch force PF may enable communication of the molten droplet 9116*a* to at least one of the substrate 9190** and/or the melt pool M.

In some embodiments, the current C may be pulsed (e.g., at any suitable predetermined frequency, phase, shape, and/or amplitude), for example, to generate corresponding pulses of the pinch force PF on the molten droplet **9116*a*. In some embodiments, the pulses of the current C and resulting pulses of pinch force PF may be configured to facilitate detachment of successive molten droplets 9116 in a temporally controlled manner. For example, in some embodiments, the current C and/or pinch force PF may be pulsed at a frequency and/or phase to generate droplets at a predetermined frequency, phase, and/or deposition rate. In some embodiments, the frequency and/or phase of the current C and/or pinch force PF may be similar to or substantially the same as a desired frequency and/or phase for detachment of the droplets 9116. In other words, in some embodiments, the timed pulses of current C may be configured to create controlled pinch forces PF (e.g., Lorentz forces), which in turn may be configured to generate repeatable droplets 9116 at a predetermined deposition rate, for example, by forming and severing the neck between the tip of the core-wire 9110 and the molten droplets 9116. In such a manner, the pulses of current C and/or pinch force PF may be configured to generate and/or deposit molten droplets 9116** with higher uniformity in droplet size (e.g., repeatable droplet volume), higher control of droplet deposition rate, higher consistency in droplet placement, and/or lower spatter than without pulses of current C and/or pinch force PF.

In some embodiments, the pinch force PF may enable enhanced control over the formation rate, size, and/or release of the molten droplet **9116*a*, while creating a higher energy density within the core-wire 9110, which may result in faster melting and printing speeds. Furthermore, in some embodiments, the pinch force PF may cause the core-wire 9110 to have a narrower deposition bead or droplet (i.e., molten droplet 9116*a*) than convention systems and/or methods, which may increase print resolution and precision as compared with convention systems and/or methods. Moreover, the act of pinching the molten droplet 9116*a*** may enable to the melt region and/or melt pool M to be more stable and/or controlled, which may support more consistent print quality (e.g., more consistent porosity and/or solidification behavior) over time.

Turning to FIG. 9A, as shown, the core-wire 9110 may contact the melt pool M and deposit molten material by immersion and/or surface tension. In some embodiments, the core-wire 9110 may be deposited into the melt pool M and/or on the substrate 9190 without having the current C running therethrough through this mechanism. However, if the core-wire 9110 has the current C running therethrough from power source PS, a short circuit may occur between the power source PS and the ground G, for example, the current C may flow from the power source PS through the core-wire 9110, the melt pool M, and/or the substrate 9190 to the ground G during contact between the core-wire 9110 and the melt pool M and/or the substrate 9190. In some embodiments, this may be the case as the melt pool M may be formed at least partially by the conductive material of the core-wire 9110 such that the melt pool M exhibits electrical conductivity. Likewise, as discussed herein, in some embodiments, the substrate 9190 may be electrically conductive, and, hence, the core-wire 9110 may electrically contact the substrate 9190 either directly or through the melt pool M. Furthermore, during the short circuit event (e.g., between contact between core-wire 9110 and melt pool M and/or substrate 9190 such that current C flows from power source PS to ground G), there is no pinch force acting on the core-wire 9110, and instead, undesirable or uncontrolled effects may result, such as uncontrolled heating (e.g., thermal runaway), spatter (e.g., uncontrolled melting and/or deposition of the core-wire 9110), and potential wire stubbing. In some embodiments, the nozzle 9760 may include an insulating portion (not shown) configured to electrically isolate the current from other components of the end effector 9700 to inhibit or prevent unwanted electrical shorts. However, in some embodiments, it may be advantageous for the core-wire 9110 to be maintained above the surface of the melt pool M, for example, to inhibit short circuit events and enable generation of the pinch force PF to facilitate formation and/or separation of the molten droplet **9116*a***.

Expanding further, as shown in FIG. 9B, the molten droplet **9116*a* (i.e., portion of core-wire 9110 that is at least partially liquid and able to flow) may form on an axial end (i.e., "tip") of the core-wire 9110. In some embodiments, the molten droplet 9116***a* may be generated by heating and/or melting the core-wire-9110 by energy directed via an energy source (e.g., energy and/or energy source 1720 of FIG. 1) included in the end effector 9700. In some embodiments, the molten droplet 9116*a* may be in the process of forming at the tip. In some embodiments, the current C may be applied, but the pinch force PF may be beginning to act on molten droplet 9116*a* and/or the molten neck so as to prepare the molten droplet 9116*a* for detachment. In some embodiments, the molten droplet 9116*a* may be suspended above and/or proximate to the melt pool M, for example, without contacting the melt pool M. In such a manner, a short circuit between the core-wire 9110 with current C running therethrough and the melt pool M and/or substrate 9190 can be inhibited and/or avoided.

In some embodiments, inhibiting or avoiding the short circuit between the core-wire 9110 and the melt pool M and/or the substrate 9190 may be advantageous because the current C running through the core-wire 9110 may generate a magnetic field around core-wire 9110 and the pinch force PF (e.g., Lorentz force) acting inwardly on the molten droplet 9116*a*. In such a manner, the pinch force PF may cause a narrowing of the molten droplet 9116*a* and/or generation of a liquid bridge between the molten droplet 9116*a* and the axial end of the core-wire 9110. Accordingly, in some embodiments, the magnetic force MF may cause a separation of the molten droplet 9116*a* from the axial end of the core-wire 9110 such that the molten droplet 9116*a* may be communicated to the melt pool M or otherwise deposited on the substrate 9190. In some embodiments, the magnetic field, magnetic forces, and/or electrostatic forces may facilitate transfer of the molten droplet 9116*a* to the melt pool M because the molten droplet 9116*a* may be magnetically and/or electrically susceptible. In some embodiments, transfer via magnetic or electrostatic mechanisms may be advantageous in zero- or low-gravity environments, and enable additive manufacturing in such environments. All such variations are envisioned herein and should be considered as part of the present disclosure.

After the molten droplet 9116*a* is communicated to the melt pool M and/or substrate 9190, the molten droplet 9116*a* may leave behind a vacant region 9118 (i.e., region unoccupied by the core-wire 9110) within the inert gas envelope 9772, as shown in FIG. 9C. In some embodiments, the core-wire 9110 may be communicated from the nozzle 9760 towards the melt pool M and/or the substrate 9190 such that the core-wire 9110 may occupy at least a portion of the vacant region 9118 while remaining above the melt pool M and/or substrate 9190. Furthermore, the core-wire 9110 may be heated via energy from the energy source (e.g., energy source 1720) such that a subsequent molten droplet 9116*b* forms on the axial end of the core-wire 9110, as shown in FIG. 9D. During the course of the formation of the subsequent molten droplet 9116*b*, the current C may continue to be transmitted through the core-wire 9110 such that the pinch force PF may act on the tip of the core-wire 9110 and/or the subsequent molten droplet 9116*b*. In some embodiments, the power source PS may be configured to generate pulses of current C in the core-wire 9110, as described herein. In some embodiments, the pulses of current C may be configured to generate the pinch force PF (e.g., via a magnetic field and/or Lorentz force) around the molten neck, for example, to radially compress the molten neck, enabling thinning of the neck and facilitating detachment of droplets 9116. In some embodiments, the current C or pinch force PF may facilitate the formation of the subsequent molten droplets (e.g., droplet 9116*b* of FIG. 9D) on the axial end (e.g., tip) of the core-wire 9110 (e.g., via electrostatic and/or magnetic fields or forces). Accordingly, in some embodiments, the neck between each of the molten droplets 9116 and the tip of the core-wire 9110 may be pinched off such that the droplet separates cleanly and transfers to the melt pool M. In some embodiments, the pulse of the current C may terminate immediately after and/or substantially simultaneously with detachment of the droplets 9116, for example, to minimizing post-detachment heating. Represents the completion of the cycle, leading into the next deposition step.

As the energy source heats and/or melts the core-wire 9110, additional material may be added to the subsequent molten droplet 9116*b* such that the subsequent molten droplet 9116*b* increases in size and/or advances towards the substrate 9190, occupying more of the vacant region 9118 than shown in FIG. 9C while maintaining above the melt pool M (e.g., to inhibit a short circuit therebetween). Furthermore, in a manner similar to that described with the molten droplet 9116*a* of FIG. 9B, in some embodiments, the pinch force PF may cause the formation of a neck (e.g., liquid bridge) between the axial end of the core-wire 9110 and the subsequent molten droplet 9116*b* such that the subsequent molten droplet 9116*b* separates from the core-wire 9110 and is communicated to the melt pool M and/or the substrate 9190. In such a manner, the pinch force PF may enable deposition of a plurality of molten droplets 9116*a*, 9116*b* (i.e., droplets 9116) from the axial end of the core-wire 9110 to the melt pool M and/or the substrate 9190 to form an article of manufacture.

While in some embodiments, the molten droplets 9116 may be maintained above the melt pool M and/or the substrate 9190 or the article of manufacture (i.e., printed article) to inhibit short circuits or arcing therebetween as described herein, in some embodiments, the core-wire 9110 may be lowered sufficiently close to facilitate arc generation therebetween. For example, in some embodiments, deposition of the molten droplets 9116 may be accomplished by existing wire-arc additive manufacturing processes. In some embodiments, the existing wire-arc additive manufacturing processes may be employed to deposit the molten droplets 9116 either independently or in combination with an energy beam directed from the energy source (e.g., 1720), for example, to heat, melt, and/or facilitate formation and/or separation of the molten droplets 9116. In some embodiments, a primary energy beam (e.g., generated and directed by a primary energy source) may be used to heat and/or melt the core-wire 9110 to generate the molten droplets 9116 while a secondary energy beam (e.g., generated and directed by the primary energy source or a secondary energy source) may be pulsed to separate the molten droplets 9116 from the core-wire 9110. In some embodiments, the secondary energy beam (e.g., laser) may be configured to substantially match the energy pulse rate (e.g., energy pulse rate) to the desired deposition rate, for example, to facilitate detachment of the molten droplets 9116 from the core-wire 9110. In some embodiments, an array secondary energy sources may be configured to generate a plurality of pulsed beams directionally aligned with the primary energy source to separate the molten droplets 9116 from the core-wire 2110. All such variations are envisioned herein and should be considered as part of the present disclosure.

Without being bound by theory, in some embodiments, the pinch force PF may be configured to be applied in an active, controlled, fine-scale, and/or digitally coordinated manner, for example, by using pulses of current C to generate corresponding pulses of the pinch force PF and deposition of repeatable droplets 9116. In such embodiments, the current C and/or pinch force PF may be integrated with the CES and/or controller 170, for example, using closed loop feedback control, and configured to control the droplet size, timing, and energy density by controlling one or more parameters of the pinch force PF.

In some embodiments in which the core-wire 9110 includes a sacrificial sheath (e.g., as described in FIG. 2), the system 9000 may be configured to inhibit premature melting, pyrolysis, ablation, sublimation, evaporation, or otherwise, degradation of the sacrificial sheath when current C is running through conductive core materials of the core-wire 9110. For example, in some embodiments, the path of the current C may be pulsed and/or kept tightly localized towards a center of the core of the core-wire 9110 to inhibit premature melting. In some embodiments, the core of the core-wire 9110 may include a conductive pathway (e.g., formed of an electrically conductive material) proximate to and/or along the center of the core of the core-wire 9110, guiding the communication of current C along the conductive pathway. In some embodiments, the core-wire 9110 may include an electrically resistive and/or isolating material and/or a thermally insulating material within the core between the conductive pathway and the sacrificial sheath. Furthermore, in some embodiments, the current C (e.g., running along the conductive pathway) may be pulsed at a predetermined frequency and/or phase to inhibit heating of the sacrificial sheath while enabling formation of the pinch force PF at the predetermined frequency and/or phase and corresponding detachment of molten droplets 9116.

In some embodiments, the core-wire 9110 may include a polymeric sacrificial sheath and a conductive core is processed in a deposition head configured to apply localized, time-limited current only at a terminal segment of the wire. In some embodiments, the system 9000 may include a supply electrode and a return electrode (e.g., coaxial with the supply electrode), which may be positioned within a few millimeters of the melt pool M, for example, to form a compact loop of the current C. In some embodiments, the current C may be delivered from the power source PS as pulses of duration in a range of microseconds to milliseconds with low duty cycle and controlled rise and/or fall of the current C, such that the current C is configured to generate the pinch force PF (e.g., Lorentz pinch) at the molten neck between the droplets 9116 and the tip of the core-wire 9110, for example, while limiting Joule heating of upstream sections of the core-wire 9110. In some embodiments, the system 9000 may include a terminal de-sheathing station configured to expose a portion of the core (e.g., 1-3 mm) of the core-wire 9110 immediately upstream of the energy impact region on the core-wire 9110 and/or the melt pool M, for example, to confine current to the core tip. In some embodiments, the nozzle 9760 (i.e., deposition head) may be configured to use gas impingement cooling to extract residual heat (e.g., from the core-wire 9110), and/or may include a temperature feedback circuit configured to determine a temperature of the sheath and modulate pulse parameters of the current C when the sheath approaches a temperature threshold (e.g., phase change temperature), for example, to inhibit the sheath from exceeding the temperature threshold.

In some embodiments, the core-wire 9110 may include a conductive filament (e.g., formed of a metallic material) disposed substantially centrally along a length of the core, an electrically insulating annulus disposed around the conductive filament, an outer functional powder core disposed around the electrically insulating annulus, and a sacrificial sheath disposed continuously around the outer functional powder core. In some embodiments, during deposition, current C may be applied between a tip of the conductive filament and a return electrode proximate to the tip such that current C is confined to the conductive filament by the insulating annulus. In some embodiments, the resulting azimuthal magnetic field may be configured to generate the pinch force PF (e.g., Lorentz pinch) localized at a neck of the molten conductive filament, for example, to enable repeatable detachment of molten droplets 9116 while limiting Joule heating of the sheath. In some embodiments, the electrically insulating annulus may include powders with insulating properties (e.g., either for inclusion in the deposition or sacrificial in nature), for example, with volume fraction and/or particle coating configured to inhibit and/or prevent percolation. In some embodiments, the sheath may be configured to remain substantially intact (e.g., structurally intact) and electrically isolated along the heated length of the core-wire 9110.

In some embodiments, the system 9000 may be configured to employ a non-contact inductive detachment method configured to be applicable to solid wires, metal-cored wires, and/or powder-filled wire with a continuous sheath. For example, in some embodiments, the system 9000 may include an electromagnetic applicator (e.g., an induction coil or magnetic yoke), which may be positioned adjacent a melt zone on the core-wire 9110 and configured to generate an electric field and/or magnetic field, for example, driven at a frequency selected to couple eddy currents into a molten neck region between the molten droplets 9116 and the tip of the core-wire 9110. In some embodiments, interaction of the induced azimuthal currents with the generated magnetic field may be configured to generate the pinch force PF (e.g., Lorentz pinch) local to the molten neck, and the localized pinch force PF may be configured to narrow the molten neck and cause detachment of droplets 9116. In such embodiments, the droplets 9116 may be generated independently of an internal geometry of the core-wire 9110 and/or may optionally exclude direct current conduction through the upstream core-wire 9110, and, consequently, may minimize undesired Joule heating of the core-wire 9110 while still enabling precise, repeatable droplet deposition.

While in some embodiments, the system 9000 may be configured to generate the pinch force PF to detach droplets 9116, in some embodiments, the system 9000 may be configured to detach droplets 9116 via other suitable apparatuses or methods. For example, in some embodiments, the system 9000 may include a pulsed photonic source (e.g., pulsed laser source), and the pulsed photonic source may be configured to direct a pulses of photonic energy (e.g., laser pulses) at the molten droplets 9116 and/or neck region between the molten droplets 9116 and the tip of the core-wire 9110 and/or any other suitable feedstock types and/or material as described with the feed material 1110 of FIG. 1 (e.g., solid wire, metal cored wire, sacrificial sheath core wire, core-wire). In some embodiments, the photonic energy pulse may be configured to impart sufficient surface momentum to generate recoil pressure within the molten neck between the droplets 9116 and the tip, for example, to drive localized thinning of the molten neck. In some embodiments, the photonic pulse may be configured to generate a thermal gradient, which may induce thermocapillary (e.g., Marangoni) flow within the molten droplets 9116 and neck region, for example, to generate internal circulation and accelerating molten material (e.g., metal) redistribution away from the neck region to promote separation.

Without being bound by theory, in such embodiments, the pulsed photonic source and pulsed photonic energy may be configured to synergistically accelerate neck thinning and facilitate controlled separation of the droplets 9116. In some embodiments, the pulsed photonic source may be configured to use pulse parameters (e.g. energy, duration, temporal profile, etc.) of the pulsed photonic energy to achieve neck pinch-off without excessive spatter or undesirable melt pool disturbance. In some embodiments, the pulses of photonic energy may be synchronized with a feed rate and/or advancement position of the core-wire 9110, and/or any auxiliary thermal input, such that droplet formation, detachment, and/or deposition operations may be performed at repeatable intervals. In some embodiments, such coordination via the pulsed photonic source and feeding and/or deposition of the core-wire 9110 may enable consistent droplet volume, controlled flight trajectory, and/or precise landing on the melt pool M or substrate 9190, for example, while improving dimensional accuracy and build repeatability. Accordingly, in some embodiments, the system 9000 may be configured to detach droplets via the pulsed photonic source, and, hence, may optionally be configured to include the power source PS and/or ground G, and/or may optionally be configured to generate the current C and/or pinch force PF. All such variations are envisioned herein and should be considered as part of the present disclosure.

Figures 10A, 10B:
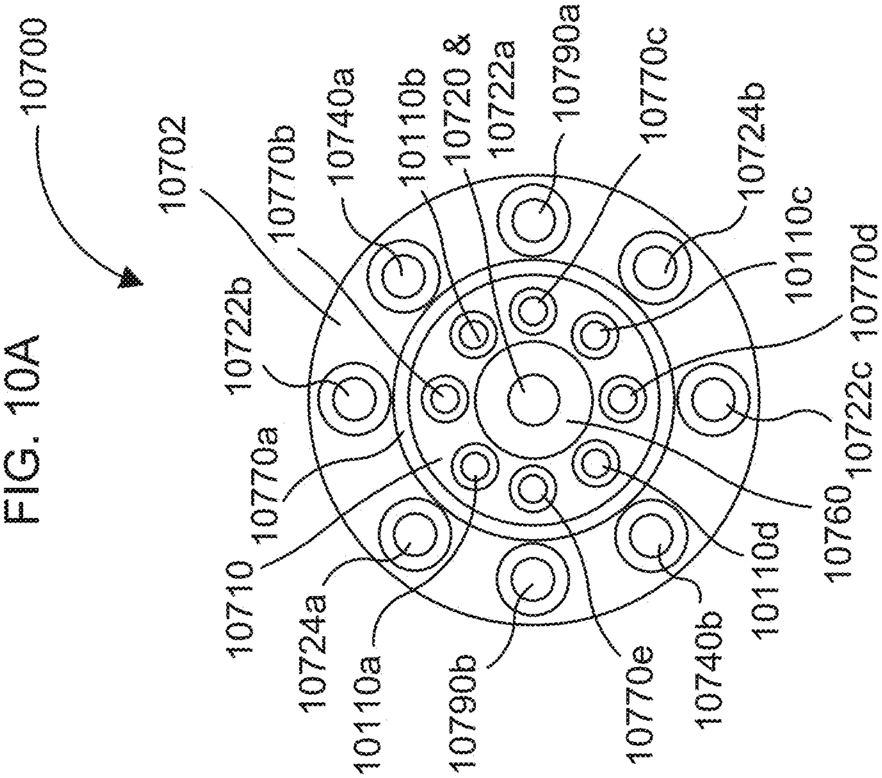
Figures 10C, 10D:
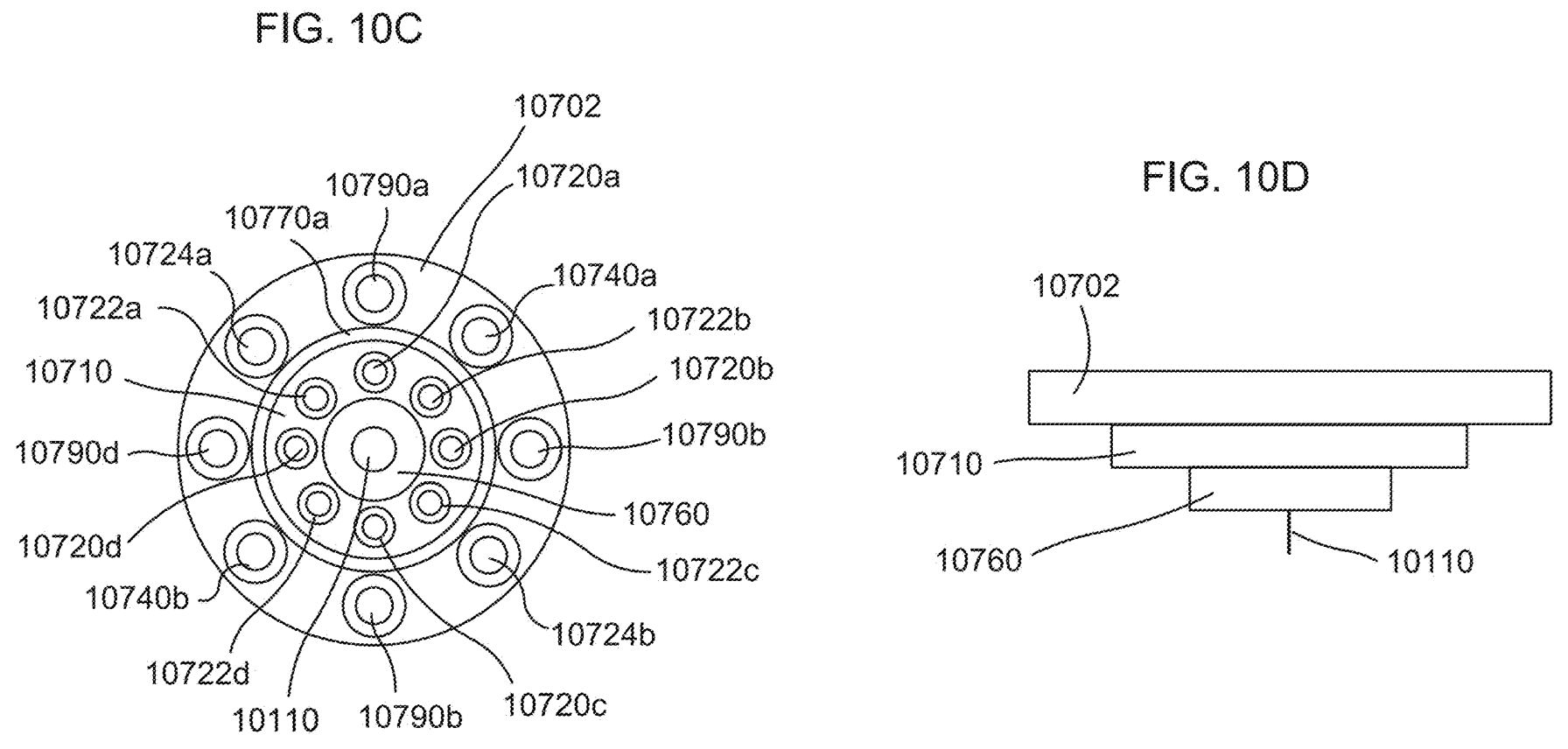

FIGS. 10A-10C display bottom perspective views of an end effector 10700 in various configurations, according to some embodiments. FIG. 10D displays a side profile view of the end effector 10700, according to an embodiment. As shown in FIGS. 10A-D, the end effector 10700 may have a housing 10702, a chuck 10710 coupled to the housing 10702, and a nozzle 10760 extending from the chuck 10710 configured to communicate a core-wire 10110 therefrom. In some embodiments, the end effector 10700 may be configured to communicate a single core-wire 10110 or a plurality of core-wires **10110*a*, 10110*b*, 10110*c*, and/or 10110*d* (collectively referred to herein as "core-wires 10110**"), for example, onto a substrate (not shown) to form a melt pool (not shown) as described in detail herein.

In some embodiments, end effector 10700 may have an array of attachments operably coupled thereto and/or defined therein. For example, in some embodiments, the end effector 10700 may include one or more primary energy sources **10720*a* 10720*b*, 10720*c*, and/or 10720*d* (collectively referred to herein as "primary energy sources 10720") and/or one or more secondary energy sources 10722*a*, 10722*b*, and/or 10722*c* (collectively referred to herein as "secondary energy sources 10722") configured to heat, melt, and/or modify (e.g., via ultrafast laser) the core-wires 10110. In some embodiments, the end effector 10700 may further include one or more electromagnetic (EM) emitters 10724*a* and/or 10724*b* (collectively referred to herein as "EM emitters 10724") configured to communicate EM energy (e.g., radiofrequency energy) to at least one of the core-wires 10110, one or more sensors 10740*a* and/or 10740*b* (collectively referred to herein as "sensors 10740"), one or more gas emitters 10770*a*, 10770*b*, 10770*c*, 10770*d*, and/or 10770 (collectively referred to as "gas emitters 10770"), one or more exhausts one or more cryogen emitters 10790*a* and/or 10790*b* (collectively referred to herein as "cryogen emitters 10790" or alternatively "misters 10790**"), and/or a combination thereof (collectively referred to herein as "attachments").

In some embodiments, the secondary energy sources 10722 may be configured to direct ultrafast lasers having a frequency in a range of about picoseconds to femtoseconds and/or using laser pulse shaping to selectively excite phonon modes in the core-wires 10110 and/or melt pool M before, during, and/or after the additive manufacturing process. In such manner, the secondary energy sources 10722 may be configured to perform selective phonon excitation to precondition core-wires 10110 and/or quantum control over one or more parameters (e.g., microstructure) of the melt pool M, core-wires 10110, and/or the article of manufacture before, during, and/or after the additive manufacturing process (e.g., during heating and/or melting of the core-wires 10110, formation of the melt pool M, and/or formation and/or solidification of the article of manufacture.

In some embodiments, the cryogen emitters 10790 may be configured to emit a cryogenic material (e.g., as a mist) proximate to the core-wire 10110, the melt pool, and/or the substrate. In some embodiments, the cryogenic material may be configured to absorb thermal energy or otherwise modify a temperature of at least one of the core-wire 10110, melt pool, and/or substrate. In some embodiments, the cryogenic material may include at least one of liquid nitrogen, liquid helium, liquid hydrogen, and/or a combination thereof.

In some embodiments, the core-wires 10110 may be similar to or substantially the same as the core-wire 2110 as described herein with respect to FIG. 2. In some embodiments, the end effector 10700, the chuck 10710, and/or the nozzle 10760 may be similar to or substantially the same as the end effector 1700, the chuck 1710, and/or the nozzle 1760 as described herein with respect to FIG. 1. In some embodiments, the primary energy sources 10720 and/or the secondary energy sources 10722 may be similar to or substantially the same as the energy source 1720 as described herein with respect to FIG. 1. In some embodiments, the EM emitters 10724 may be similar to substantially the same as the EM emitters as described herein with respect to FIG. 1. In some embodiments, the sensors 10740 may be similar to substantially as the second sensors(s) 1712 and/or the third sensor(s) 1740 as described herein with respect to FIG. 1. In some embodiments, the gas emitters 10770 may be similar to substantially the same as the gas emitter 1770 and/or the exhaust 1780 as described herein with respect to FIG. 1. In some embodiments, the cryogen emitters 10790 may be similar to or substantially the same as the mister 1790 as described herein with respect to FIG. 1. Therefore, certain features of the core-wire 10110, end effector 10700, chuck 10710, nozzle 10760, primary energy sources 10720, secondary energy sources 10722, EM emitters 10724, sensors 10740, gas emitters 10770, and/or cryogen emitters 10790 are not described in further detail herein.

In some embodiments, a portion of the attachments may be operably coupled and/or defined in at least one of the housing 10702, the chuck 10710, the nozzle 10760, and/or a combination thereof. For example, as shown in FIG. 10A, in some embodiments, the end effector 10700 may include the primary energy source 10720 and secondary energy source **10722*a* within the nozzle 10760. In some embodiments, the core-wires 10110*a*, 10110*b*, 10110*c*, and/or 10110*d* may be communicated through channels (not shown) or nozzles (not shown) defined in the chuck 10710. In some embodiments, exposed portions of the core-wires 10110*a*, 10110*b*, 10110*c*, and/or 10110*d* may be heated, melted, or otherwise modified via the primary energy source 10720 and/or the secondary energy sources 10722. In some embodiments, the end effector 10700 may include an annular gas emitter 10770*a* around the chuck 10710 at a boundary between the chuck 10710 and the housing 10702, and the chuck 10710 may include additional gas emitters 10770*b*, 10770*c*, 10770*d*, and/or 10770*e* operably coupled thereto and/or defined therein. In some embodiments, the annular gas emitter 10770 may be configured to direct a shielding gas curtain of inert gas around the core-wires 10110, for example, to protect the core-wire 10110 from contaminants, environmental factors, oxidation, and/or other degradation. In some embodiments, the additional gas emitters 10770***b*, 10770*c*, 10770*d*, and/or 10770*e* may be configured to direct flow of gas in any suitable direction, for example, to exhaust unwanted gases or particles away from the melt pool. In some embodiments, the housing 10702 may include secondary energy sources 10722*b*, 10722*c* operably coupled thereto. Furthermore, in some embodiments, the housing 10702 may also include the EM emitters 10724*a* and 10724*b*, the sensors 10740*a* and 10740*b*, and/or the cryogen emitters 10790 operably coupled thereto.

FIGS. 10B and 10C show similar end effector configuration as shown and described in FIG. 10A. Therefore, certain features of FIGS. 10B and 10C are not described in further detail herein. However, different from FIG. 10A, FIG. 10B includes only the primary energy source 1720 in the nozzle 10760, rather than a combination of the primary energy source 10720 and secondary energy source 10722*a* as shown in FIG. 10A. Additionally, FIG. 10C shows only a single core-wire 10110 being communicated out of the nozzle 10760, with several primary energy sources 10720*a*, 10720*b*, 10720*c*, and 10720 and several secondary energy sources 10722*a*, 10722*b*, 10722*c*, and 10722*d* operably coupled to the chuck 10710 and disposed in an array around the nozzle 10760. Furthermore, the configuration as shown in FIG. 10C shows only a single gas emitter 10770 disposed annularly around the chuck 10710. In some embodiments, the gas emitter 10770 may be configured to direct a shielding curtain of inert gas around the central core-wire 10110, for example, to protect the core-wire 10110 from contaminants, environmental factors, oxidation, and/or other degradation. All such variations are envisioned herein and should be considered as part of the present disclosure.

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially" and similar terms are intended to have a broad meaning in harmony with the common and accepted usage by those of ordinary skill in the art to which the subject matter of this disclosure pertains. For example, the term "substantially flat" would mean that there may be de minimis amount of surface variations or undulations present due to manufacturing variations present on an otherwise flat surface. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms "coupled," and the like as used herein mean the joining of two members directly or indirectly to one another. Such joining may be stationary (e.g., permanent) or moveable (e.g., removable, or releasable). Such joining may be achieved with the two members, or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for additive manufacturing, comprising:

a feed assembly, the feed assembly including:

a drive assembly configured to receive a feed material and displace the feed material along a length thereof, the feed material including a core-wire, the core-wire including a sheath defining a hollow channel, and a core disposed in the sheath; and an annealer configured to heat a portion of the feed material to an annealing temperature to increase workability of the feed material; and an end effector, the end effector including:

a chuck configured to accept the feed material;

an energy source configured to melt at least a portion of the feed material to form a melted portion of the feed material; and a nozzle operably coupled to the chuck, the nozzle configured to deposit the melted portion of the feed material onto a substrate to form a melt pool.

2. The system of claim 1, wherein:

the core is formed from a first material, and the sheath is formed from a second material different from the first material.

3. The system of claim 2, wherein the melt pool of the feed material includes the first material.

4. The system of claim 2, wherein the sheath is configured to at least one of vaporize or pyrolyze in response to exposure to energy from the energy source such that the second material is substantially excluded from the melt pool.

5. The system of claim 1, further comprising:

a mister operably coupled to the end effector, the mister configured to emit a mist in the form of a vortex, the mist including a fluid containing a particulate configured to at least one of react or co-deposit with the feed material.

6. The system of claim 1, further comprising:

an ultrasonic oscillating source operably coupled to the end effector, the ultrasonic oscillating source configured to vibrate a tip of feed material to induce a separation of the melted portion from the tip of the feed material.

7. The system of claim 1, further comprising:

a controller communicably coupled to at least one of the feed assembly or the end effector, the controller configured use an input shaping control algorithm configured to reduce vibrations in the at least one of the feed assembly or the end effector.

8. The system of claim 1, further comprising:

a bender disposed between the drive assembly and the end effector, the bender configured to selectively bend the feed material from a first direction of travel to a second direction of travel.

9. The system of claim 8, wherein the annealer is disposed between the drive assembly and the bender, and the annealing temperature is sufficient to facilitate bending of the feed material via the bender.

10. The system of claim 1, further comprising:

a straightener disposed between the drive assembly and the end effector, the straightener configured to selectively straighten the feed material.

11. A system for additive manufacturing, comprising:

a magazine including a feed material, the feed material including:

a sheath formed of a material configured to transition from a solid phase to a gaseous phase when exposed to energy, the sheath defining a channel therethrough, and a particulate material disposed within the channel;

an end effector configured to receive the feed material and direct the feed material towards a substrate;

a feed assembly operably coupled to the magazine and the end effector, the feed assembly configured to communicate the feed material from the magazine to the end effector; and an energy source configured to direct energy to the feed material, the energy configured to cause:

the particulate material to melt to form a melt pool on the substrate, and the sheath to transition from the solid phase to the gaseous phase such that the sheath is inhibited from entering the melt pool.

12. The system of claim 11, wherein the magazine includes a casing defining a plurality of apertures longitudinally through at least a portion thereof, and the feed material includes a plurality of longitudinally extending wires, each of the plurality of longitudinally extending wires disposed in a corresponding aperture of the plurality of apertures such that each of the plurality of longitudinally extending wires is configured to be selectively communicated to the feed assembly from the corresponding aperture of the casing.

13. The system of claim 11, wherein the particulate material includes a first material having a first melting temperature, and a second material having a second melting temperature greater than the first melting temperature, the system further comprising:

a nozzle including a heat source, the heat source configured to heat the nozzle to a temperature greater than or equal to the first melting temperature, the heated nozzle configured to selectively melt at least a portion of the first material.

14. The system of claim 13, wherein energy from the energy source is configured to selectively heat at least a portion of the second material to a temperature greater than or equal to the second melting temperature to melt the portion of the second material.

15. The system of claim 11, further comprising:

a controller communicably coupled to the magazine, the feed assembly, and the end effector; and a test segment of the feed material disposed in the magazine, the feed assembly configured to communicate the test segment to the end effector to perform a test run cycle, wherein:

at least one of the feed assembly or the end effector is configured to communicate information on the test run cycle to the controller, and the controller is configured to receive the information and modify one or more parameters of the feed assembly or the end effector in response to the received information.

16. The system of claim 11, further comprising:

a fluid disposed within the channel, the fluid and the particulate material forming a fluid suspension, the fluid suspension configured to emerge from an opening at an axial end of the feed material, energy from the energy source configured to vaporize at least a portion of the fluid from the fluid suspension such that at least a portion of the particulate material is communicated to the substrate.

17. The system of claim 11, wherein the particulate material and the sheath of the feed material are formed of non-conductive materials, the feed material further including susceptor additives, the susceptor additives configured to respond to magnetic energy, the system further comprising:

magnetic couplings operably coupled to the feed assembly, the magnetic couplings configured to direct magnetic energy to the susceptor additives to modify one or more parameters of the feed material.

18. The system of claim 11, further comprising:

a gas emitter operably coupled to the end effector, the gas emitter configured to emit a vortex flow of gas around a periphery of at least one of the feed material or the melt pool.

19. The system of claim 11, further comprising:

a vacuum exhaust system operably coupled to the end effector, the vacuum exhaust system configured to form a low-pressure region proximate to at least one of the feed material or the melt pool, the low-pressure region configured to exhaust at least a portion of the sheath converted to gaseous phase converted away from the melt pool.

20. The system of claim 11, further comprising:

an annealer operably coupled to the feed assembly, the annealer configured to heat at least a portion of the feed material to an annealing temperature to facilitate bending of the feed material in at least one of the feed assembly or the end effector.

21. A system for additive manufacturing, comprising:

a feed assembly, the feed assembly including:

a drive assembly configured to receive a feed material and displace the feed material along a length thereof; and an annealer configured to heat a portion of the feed material to an annealing temperature to increase workability of the feed material;

an end effector, the end effector including:

a chuck configured to accept the feed material;

an energy source configured to melt at least a portion of the feed material to form a melted portion of the feed material; and a nozzle operably coupled to the chuck, the nozzle configured to deposit the melted portion of the feed material onto a substrate to form a melt pool; and an ultrasonic oscillating source operably coupled to the end effector, the ultrasonic oscillating source configured to vibrate a tip of feed material to induce a separation of the melted portion from the tip of the feed material.

22. The system of claim 21, wherein the feed material is a core-wire, the core-wire including a sheath defining a hollow channel, and a core disposed within the hollow channel.

23. The system of claim 22, wherein:

the core is formed from a first material, and the sheath is formed from a second material different from the first material.

24. The system of claim 23, wherein the sheath is configured to at least one of vaporize or pyrolyze in response to exposure to energy from the energy source such that the second material is substantially excluded from the melt pool.

25. The system of claim 24, wherein the melted portion is formed substantially of the first material.

26. A system for additive manufacturing, comprising:

a feed assembly, the feed assembly including:

a drive assembly configured to receive a feed material and displace the feed material along a length thereof; and an annealer configured to heat a portion of the feed material to an annealing temperature to increase workability of the feed material;

an end effector, the end effector including:

a chuck configured to accept the feed material;

an energy source configured to melt at least a portion of the feed material to form a melted portion of the feed material; and a nozzle operably coupled to the chuck, the nozzle configured to deposit the melted portion of the feed material onto a substrate to form a melt pool; and a controller communicably coupled to at least one of the feed assembly or the end effector, the controller configured use an input shaping control algorithm configured to reduce vibrations in the at least one of the feed assembly or the end effector.

27. The system of claim 26, further comprising:

a vibration source operably coupled to the at least one of the feed assembly or the end effector, the vibration source in communication with the controller and configured vibrate at a predetermined vibration parameter based on the input shaping control algorithm.

28. The system of claim 27, wherein the predetermined vibration parameter includes at least one of a predetermined frequency, predetermined amplitude, or predetermined phase.

29. The system of claim 27, wherein the vibration source includes a piezoelectric transmitter.

30. A system for additive manufacturing, comprising:

a feed assembly, the feed assembly including:

a drive assembly configured to receive a feed material and displace the feed material along a length thereof; and an annealer configured to heat a portion of the feed material to an annealing temperature to increase workability of the feed material;

an end effector, the end effector including:

a chuck configured to accept the feed material;

an energy source configured to melt at least a portion of the feed material to form a melted portion of the feed material; and a nozzle operably coupled to the chuck, the nozzle configured to deposit the melted portion of the feed material onto a substrate to form a melt pool; and a bender disposed between the drive assembly and the end effector, the bender configured to selectively bend the feed material from a first direction of travel to a second direction of travel.

31. The system of claim 30, wherein the annealer is disposed between the drive assembly and the bender.

32. The system of claim 30, wherein the annealing temperature is sufficient to facilitate bending of the feed material via the bender.

33. The system of claim 32, wherein the annealing temperature is in a range of about 50° C. to about 1,600° C.

34. A system for additive manufacturing, comprising:

a feed assembly, the feed assembly including:

a drive assembly configured to receive a feed material and displace the feed material along a length thereof; and an annealer configured to heat a portion of the feed material to an annealing temperature to increase workability of the feed material;

an end effector, the end effector including:

a chuck configured to accept the feed material;

an energy source configured to melt at least a portion of the feed material to form a melted portion of the feed material; and a nozzle operably coupled to the chuck, the nozzle configured to deposit the melted portion of the feed material onto a substrate to form a melt pool; and a straightener disposed between the drive assembly and the end effector, the straightener configured to selectively straighten the feed material.

35. The system of claim 34, wherein the straightener includes rollers, at least one of the rollers coupled to an actuator configured to adjust positioning of the at least one of the rollers.

36. The system of claim 34, wherein the straightener includes a die configured to pass the feed material therethrough to selectively straighten the feed material.

* * * * *